US012579773B2

(12) United States Patent
Hashimoto et al.

(10) Patent No.: US 12,579,773 B2
(45) Date of Patent: Mar. 17, 2026

(54) DISPLAY APPARATUS AND DISPLAY METHOD

(71) Applicant: MAXELL, LTD., Kyoto (JP)

(72) Inventors: Yasunobu Hashimoto, Kyoto (JP);
Yoshinori Okada, Kyoto (JP);
Kazuhiko Yoshizawa, Kyoto (JP);
Hitoshi Akiyama, Kyoto (JP); Mayumi Nakade, Kyoto (JP)

(73) Assignee: Maxell, Ltd., Kyoto (JP)

( * ) Notice: Subject to any disclaimer, the term of this patent is extended or adjusted under 35 U.S.C. 154(b) by 341 days.

(21) Appl. No.: 18/256,332

(22) PCT Filed: Dec. 10, 2020

(86) PCT No.: PCT/JP2020/046148
§ 371 (c)(1),
(2) Date: Jun. 7, 2023

(87) PCT Pub. No.: WO2022/123750
PCT Pub. Date: Jun. 16, 2022

(65) Prior Publication Data
US 2024/0104883 A1　　Mar. 28, 2024

(51) Int. Cl.
*G06V 10/26* (2022.01)
*G06F 3/01* (2006.01)
*G06T 19/00* (2011.01)

(52) U.S. Cl.
CPC ............ *G06V 10/273* (2022.01); *G06F 3/013* (2013.01); *G06T 19/006* (2013.01)

(58) Field of Classification Search
CPC ...................................................... G06F 3/011
See application file for complete search history.

(56) References Cited

U.S. PATENT DOCUMENTS 6,972,734 B1　12/2005　Ohshima et al.
9,448,404 B2　9/2016　Pandey et al.
(Continued)

FOREIGN PATENT DOCUMENTS

EP　　2920765 B1　12/2016
EP　　2920766 B1　7/2018
(Continued)

OTHER PUBLICATIONS

International Search Report in the corresponding International Application No. PCT/JP2020/046148 dated Mar. 2, 2021, with English Translation (5 pages).

(Continued)

*Primary Examiner* — Di Xiao
(74) *Attorney, Agent, or Firm* — Rimon P.C.

(57) ABSTRACT

A display apparatus includes a display device and a processor, and the display device displays at least the virtual object among the individual real object cut out from the external real body as an object and the virtual object to be arranged in three dimensions, the object for which the user wants to view is determined as the target object, the object to be interfered when the user views the target object is detected as the interfering object, and when there is an interfering object, the display mode of at least one of the target object and the interfering object is changed so as to eliminate or reduce the interfering caused by the interfering object for viewing the target object.

8 Claims, 34 Drawing Sheets

(56) References Cited

U.S. PATENT DOCUMENTS

| | | | |
|---|---|---|---|
| 9,619,911 B2 | 4/2017 | Pandey et al. | |
| 9,727,996 B2 | 8/2017 | Pandey et al. | |
| 2013/0088516 A1 | 4/2013 | Ota et al. | |
| 2015/0091943 A1* | 4/2015 | Lee | G06F 3/012 |
| | | | 345/633 |
| 2015/0123997 A1 | 5/2015 | Hayasaka et al. | |
| 2017/0076486 A1 | 3/2017 | Aizawa | |
| 2018/0165885 A1* | 6/2018 | Rodriguez, II | H04W 4/023 |
| 2018/0314889 A1 | 11/2018 | Fukazawa et al. | |
| 2021/0038985 A1* | 2/2021 | Stebbins | G06T 19/00 |
| 2021/0287452 A1* | 9/2021 | Maruyama | G06F 3/167 |
| 2022/0343610 A1* | 10/2022 | Heitger | G06F 3/0346 |

FOREIGN PATENT DOCUMENTS

| | | | |
|---|---|---|---|
| JP | 2000-353249 A | 12/2000 | |
| JP | 2011-242934 A | 12/2011 | |
| JP | 2014-071663 A | 4/2014 | |
| JP | 2015-090635 A | 5/2015 | |
| JP | 2016-504615 A | 2/2016 | |
| JP | 2017-055851 A | 3/2017 | |
| WO | 2017/104198 A1 | 6/2017 | |

OTHER PUBLICATIONS

Office Action issued on May 27, 2025 in the corresponding Japanese patent application No. 2024-146593, w/ English Translation.

* cited by examiner (a) BEFORE CHANGE 107
102
SHIELD-
INTERFERENCE
RELATION
103
106
101

Z Y X

DISPLAY
MODE
CHANGE

120

INFORMATION
SERVER

U1
11
1

105
104

(b) AFTER CHANGE 107
103
(103a)
102
101
106

FIG. 2

(A) CLASSIFICATION OF OBJECTS

| DISPLAY METHOD | OBJECT | |
|---|---|---|
| | INDIVIDUAL REAL OBJECT | VIRTUAL OBJECT |
| VIDEO SEE-THROUGH | IMAGES OF INDIVIDUAL REAL BODY CUT FROM THE REAL BODY (REAL IMAGE) | IMAGE OF ANY VIRTUAL OBJECT GENERATED |
| OPTICAL SEE-THROUGH TYPE | INDIVIDUAL (RECOGNIZED) REAL BODY CUT OUT FROM THE REAL BODY (REAL IMAGE) | |

(B) SHIELD-INTERFERENCE RELATION

| PATTERN | OCCLUSION RELATION | |
|---|---|---|
| | OBJECTS PLACED IN FRONT SIDE | OBJECTS PLACED IN REAR SIDE |
| FIRST PATTERN | INDIVIDUAL REAL OBJECT | INDIVIDUAL REAL OBJECT |
| SECOND PATTERN | VIRTUAL OBJECT | INDIVIDUAL REAL OBJECT |
| THIRD PATTERN | INDIVIDUAL REAL OBJECT | VIRTUAL OBJECT |
| FOURTH PATTERN | VIRTUAL OBJECT | VIRTUAL OBJECT |

(C) CATEGORY

| CATEGORY | CLASSIFICATION OF OBJECTS ACCORDING TO THE DEGREE OF LIMITATION AND TOLERANCE FOR CHANGING THE DISPLAY MODE OF OBJECTS |
|---|---|
| FIRST CATEGORY | OBJECT WITH THE HIGHEST LIMITATION (LOWEST TOLERANCE). INDIVIDUAL REAL OBJECT. VIRTUAL OBJECT INTEGRATED WITH INDIVIDUAL REAL OBJECT. |
| SECOND CATEGORY | OBJECTS WITH A LOWER LIMITATION (HIGHER TOLERANCE) FOR THE FIRST CATEGORY. FOR EXAMPLE, VIRTUAL OBJECTS DISPLAYED IN RELATION TO OBJECTS IN THE FIRST CATEGORY. |
| THIRD CATEGORY | OBJECT WITH THE LOWEST LIMITATION (HIGHEST TOLERANCE). FOR EXAMPLE, VIRTUAL OBJECTS WITHOUT LIMITATION OF DISPLAY POSITION ETC.. |

FIG. 5
(a) BEFORE CHANGE
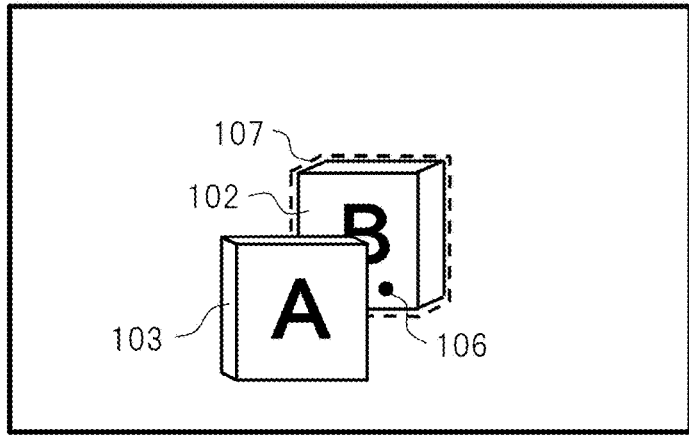
(b) AFTER CHANGE
(REDUCTION AND PERMEABILITY RATE ADJUSTMENT)
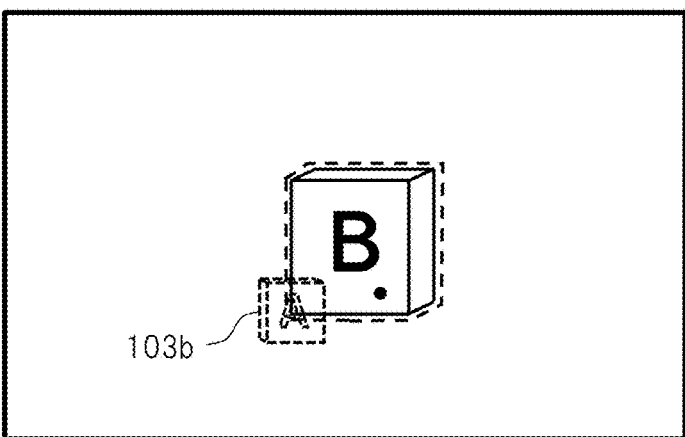
(c) AFTER CHANGE (ENLARGED)
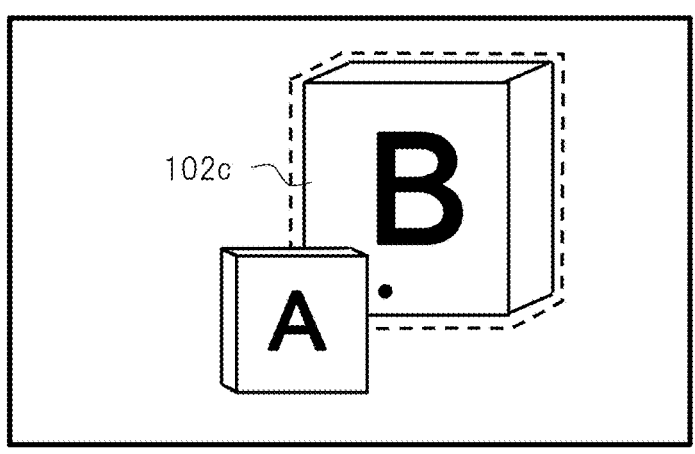

FIG. 6
(a) BEFORE CHANGE
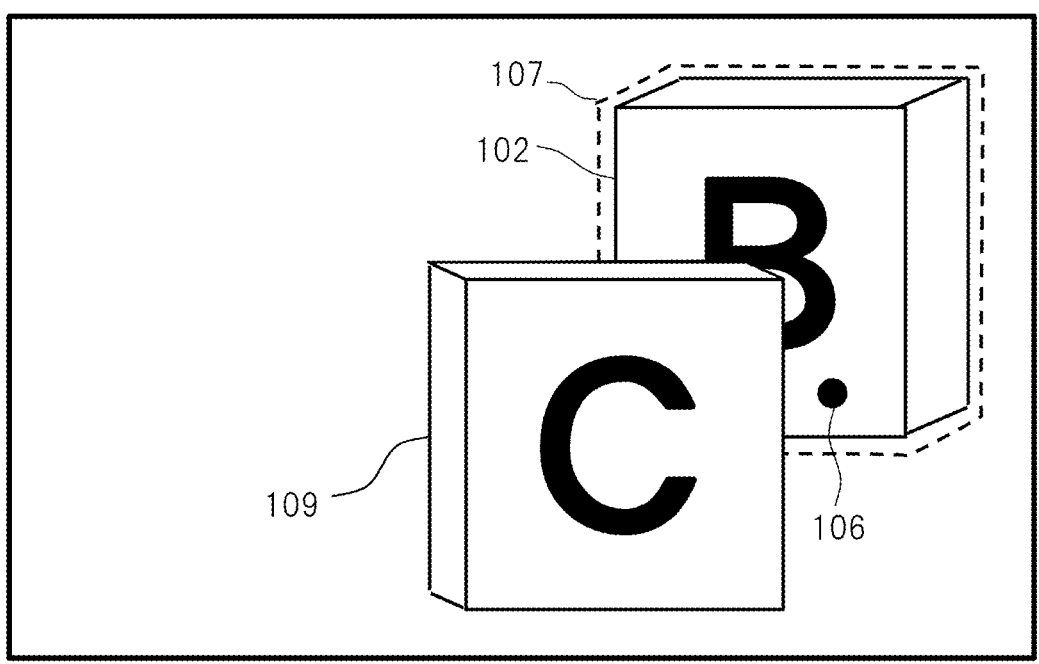
(b) AFTER CHANGE
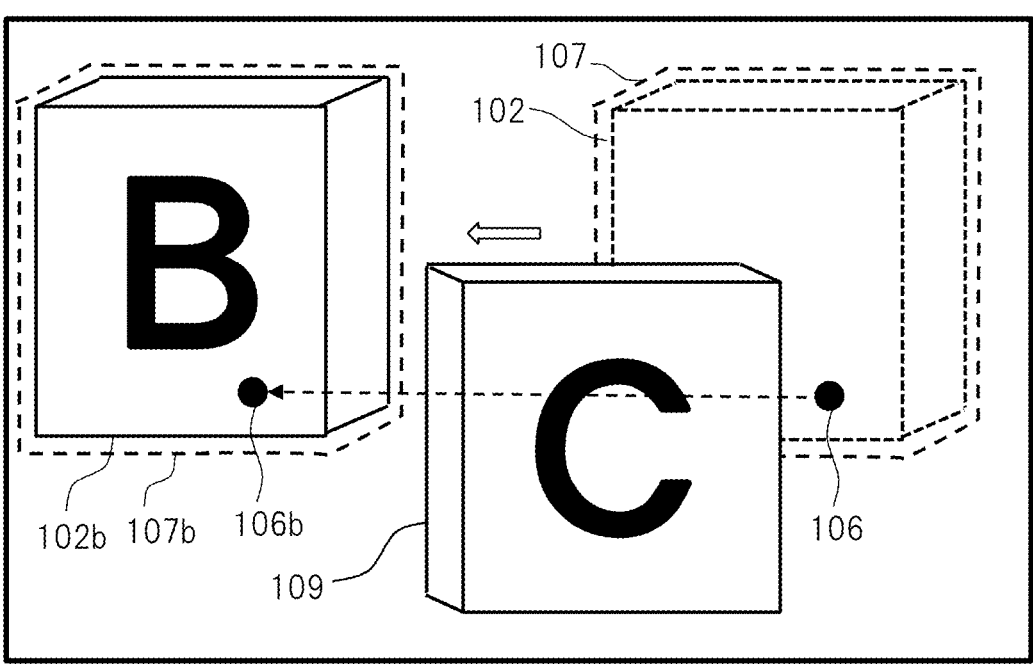

FIG. 7
(a) BEFORE CHANGE
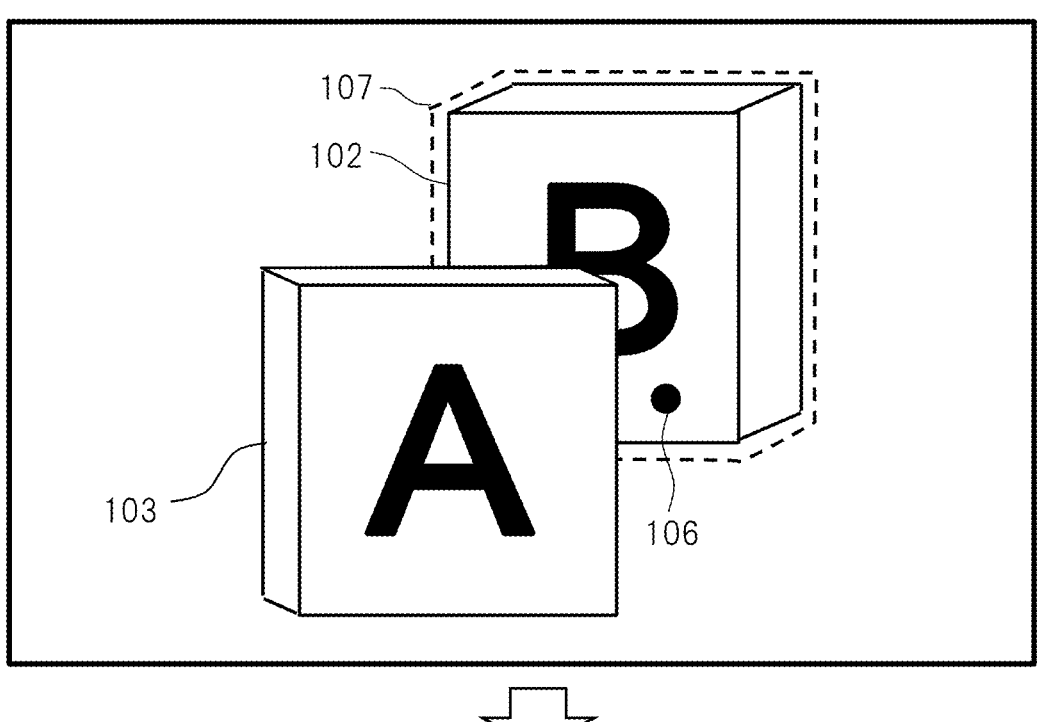
(b) AFTER CHANGE
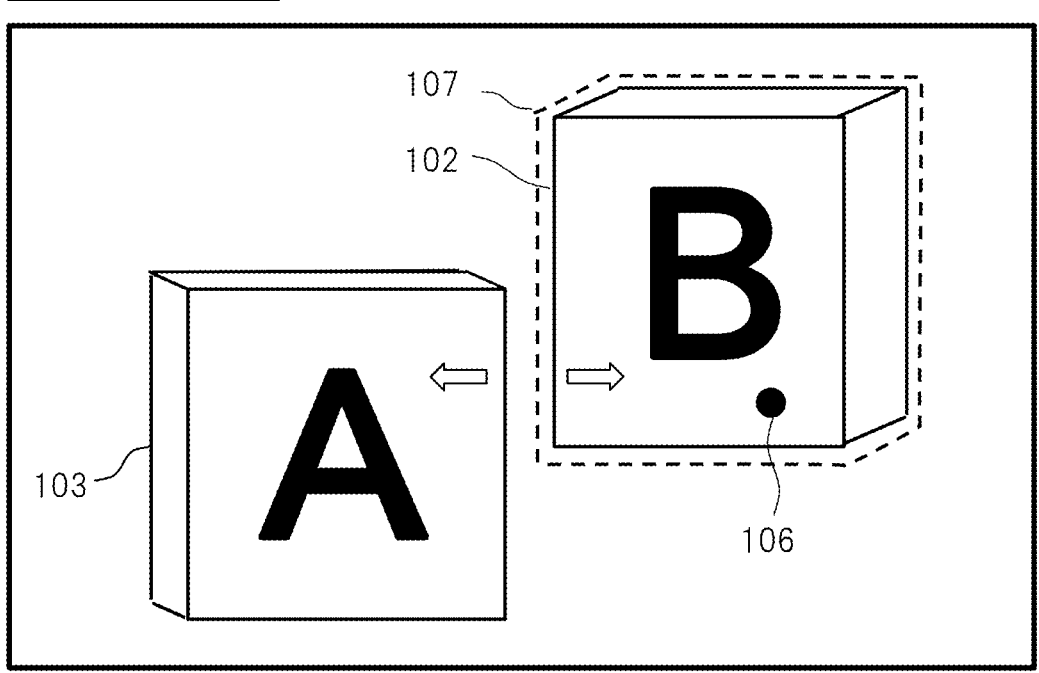

*FIG. 8*
(a) BEFORE CHANGE
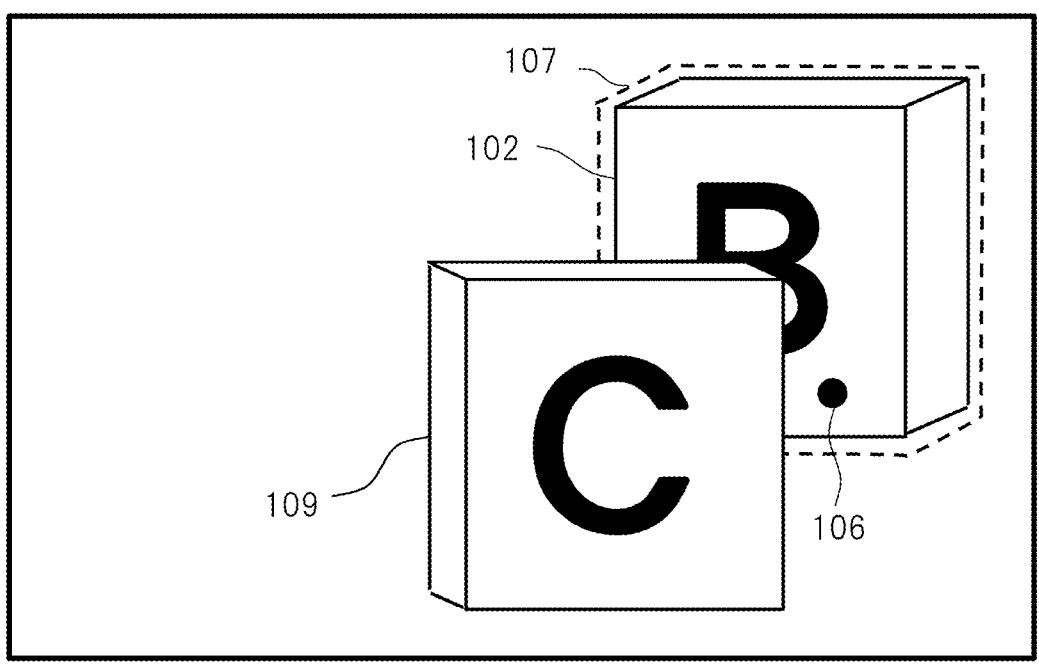
(b) AFTER CHANGE
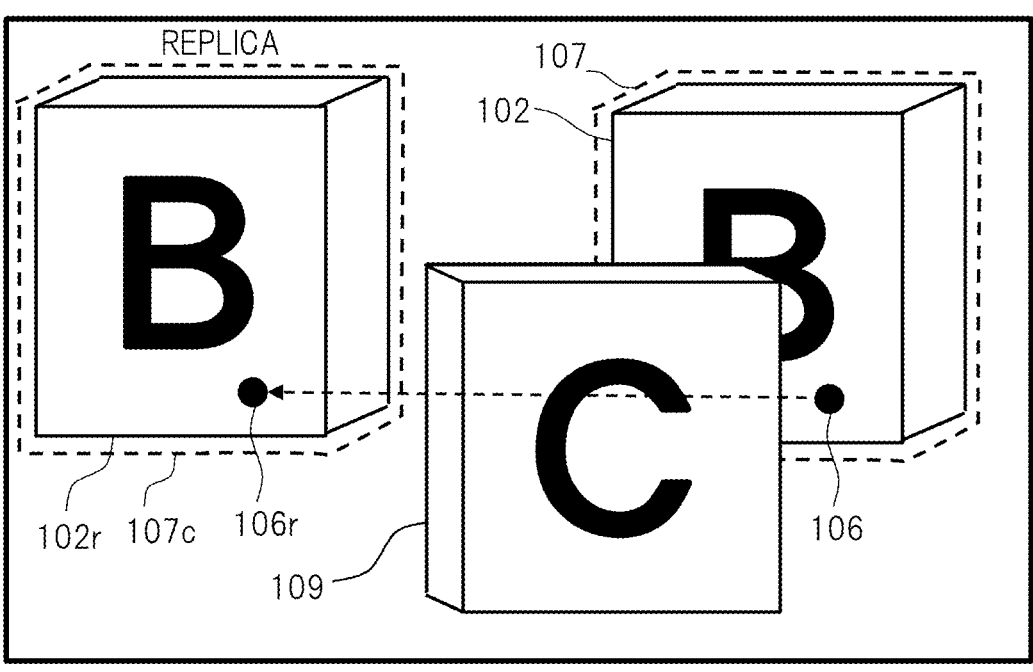

FIG. 14
(a) BEFORE CHANGE
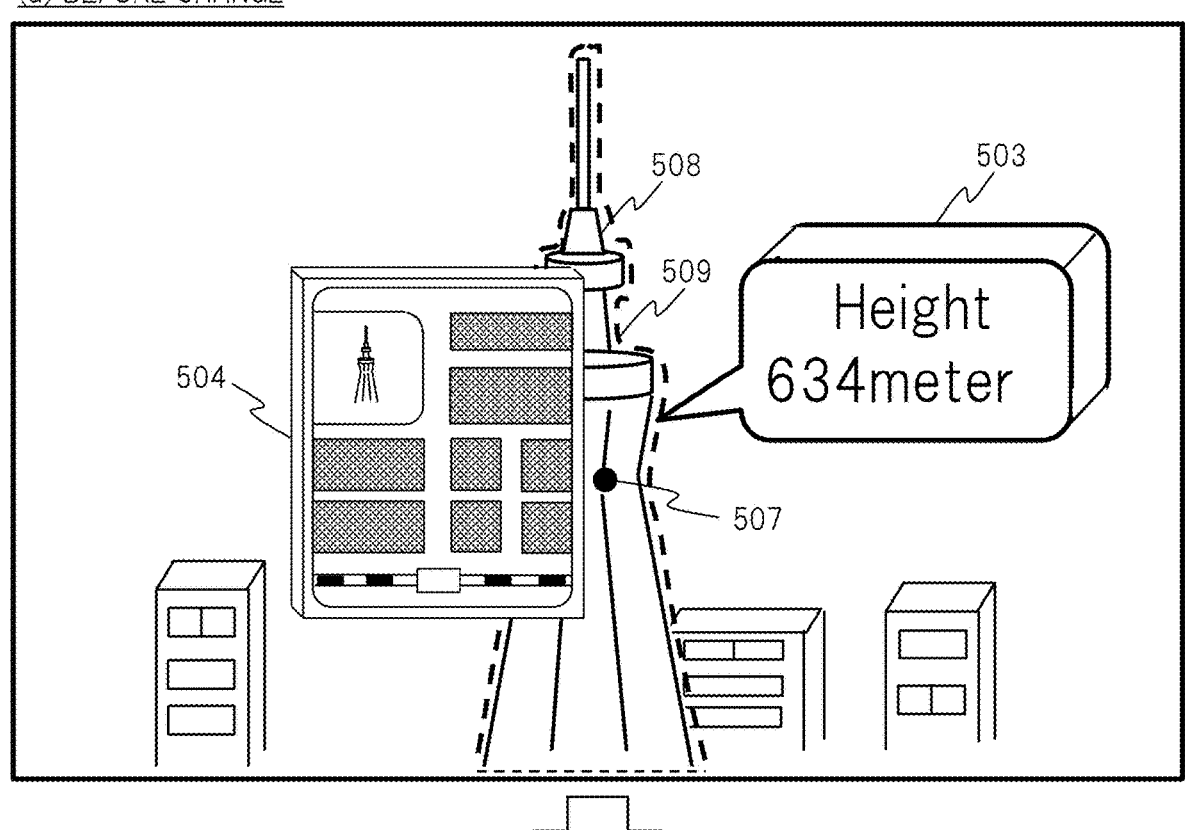
(b) AFTER CHANGE
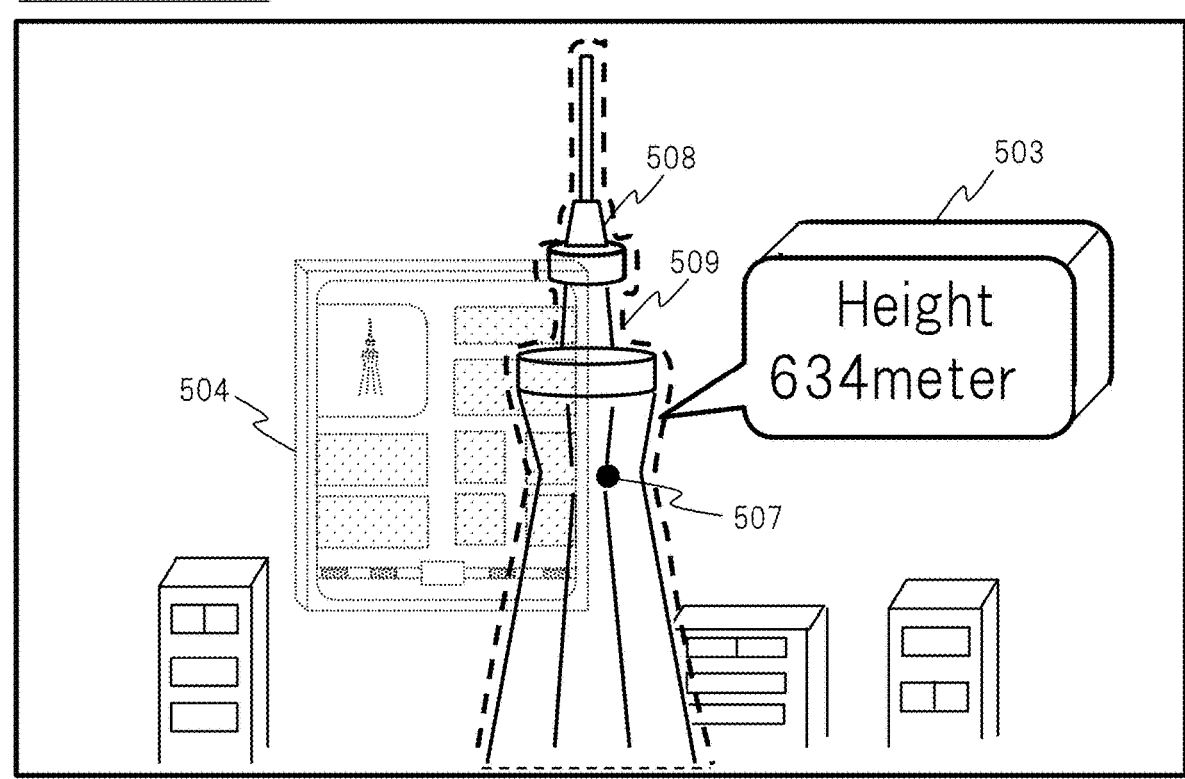

*FIG. 15*

*FIG. 16*
(a) BEFORE CHANGE
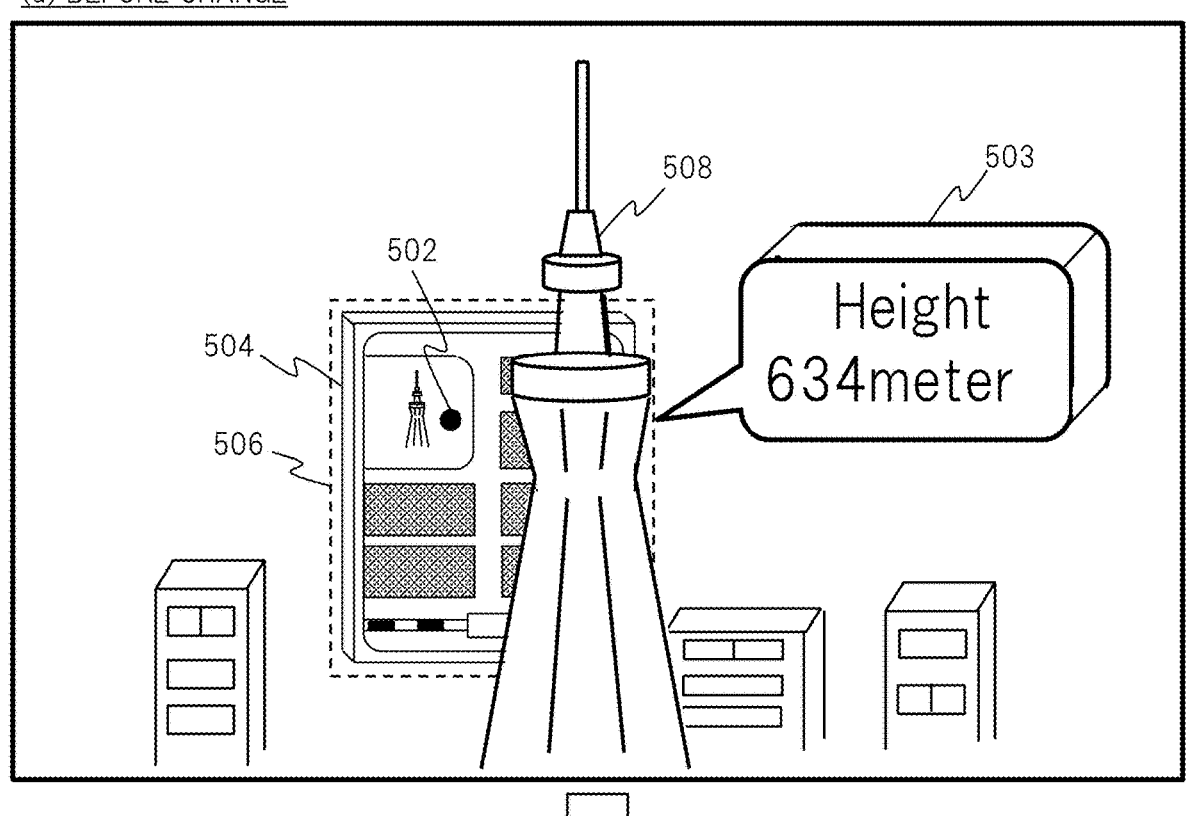
(b) AFTER CHANGE
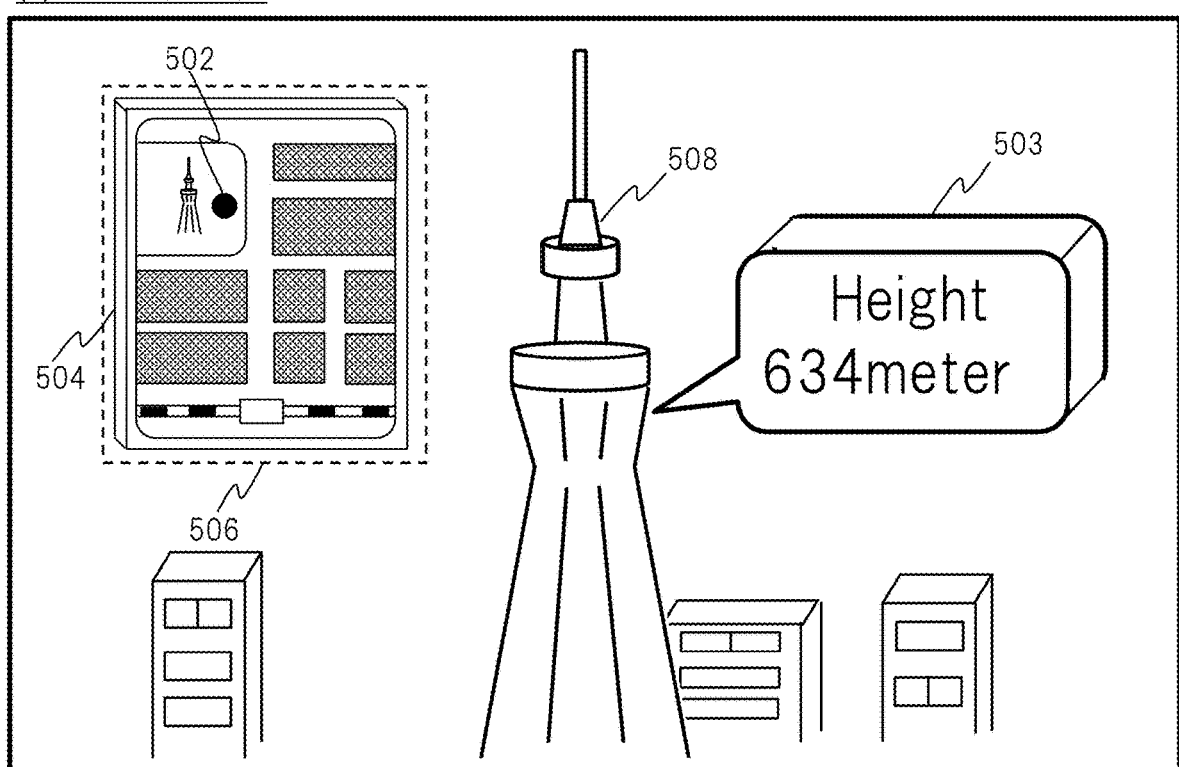

FIG. 17
(a) BEFORE CHANGE
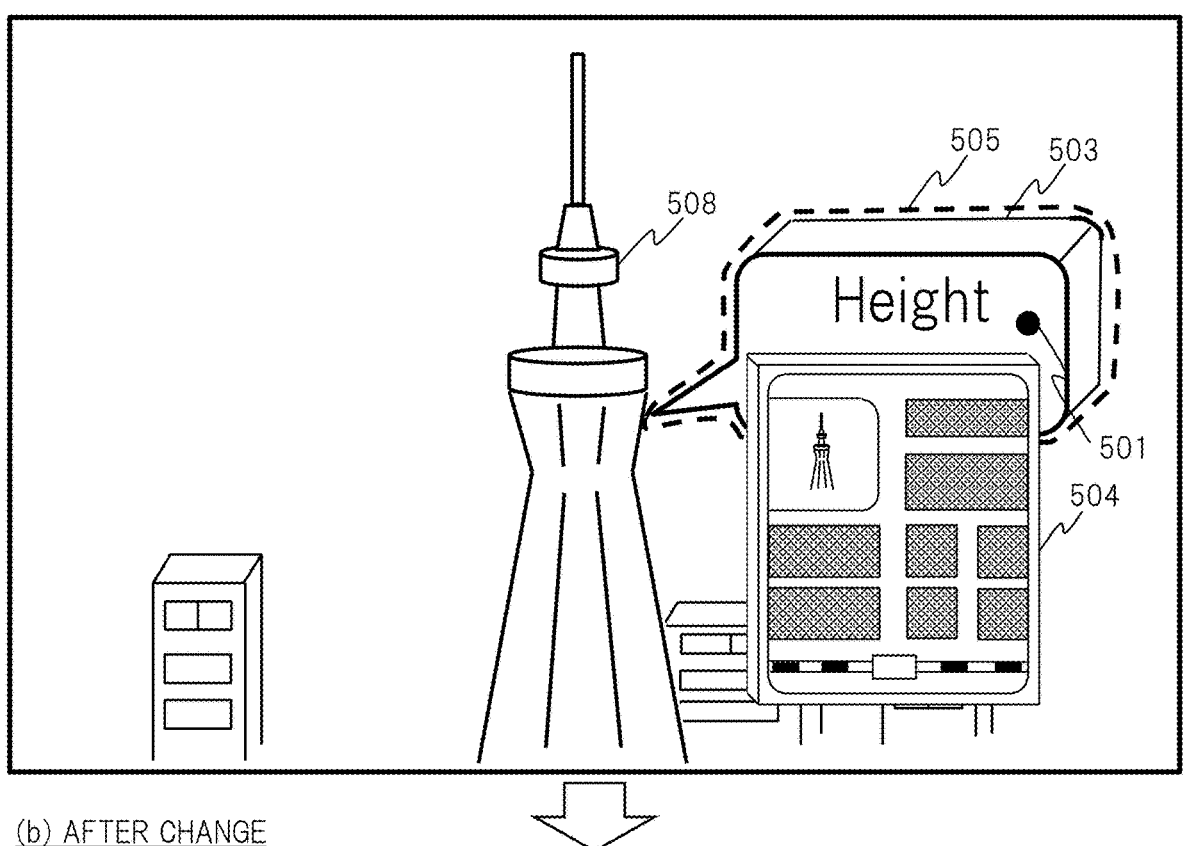
(b) AFTER CHANGE
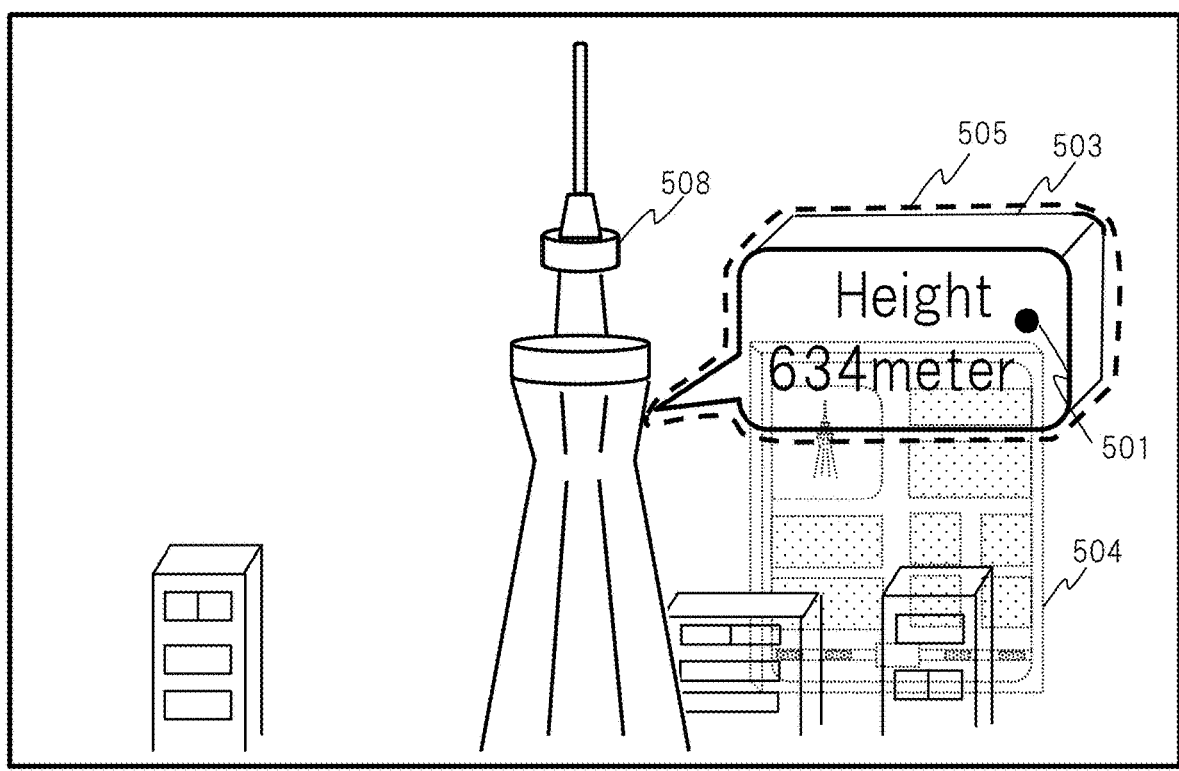

AFTER CHANGE

*FIG. 19*
(a) BEFORE CHANGE
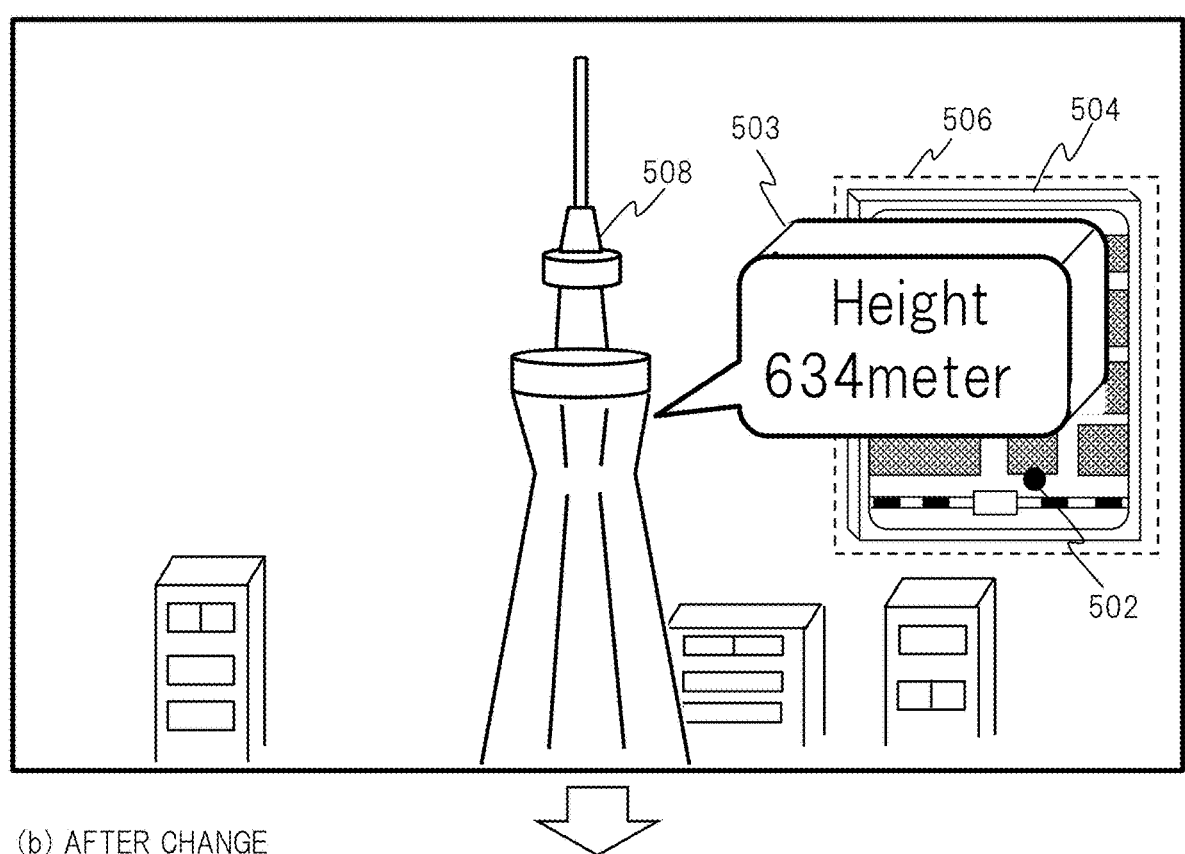
(b) AFTER CHANGE
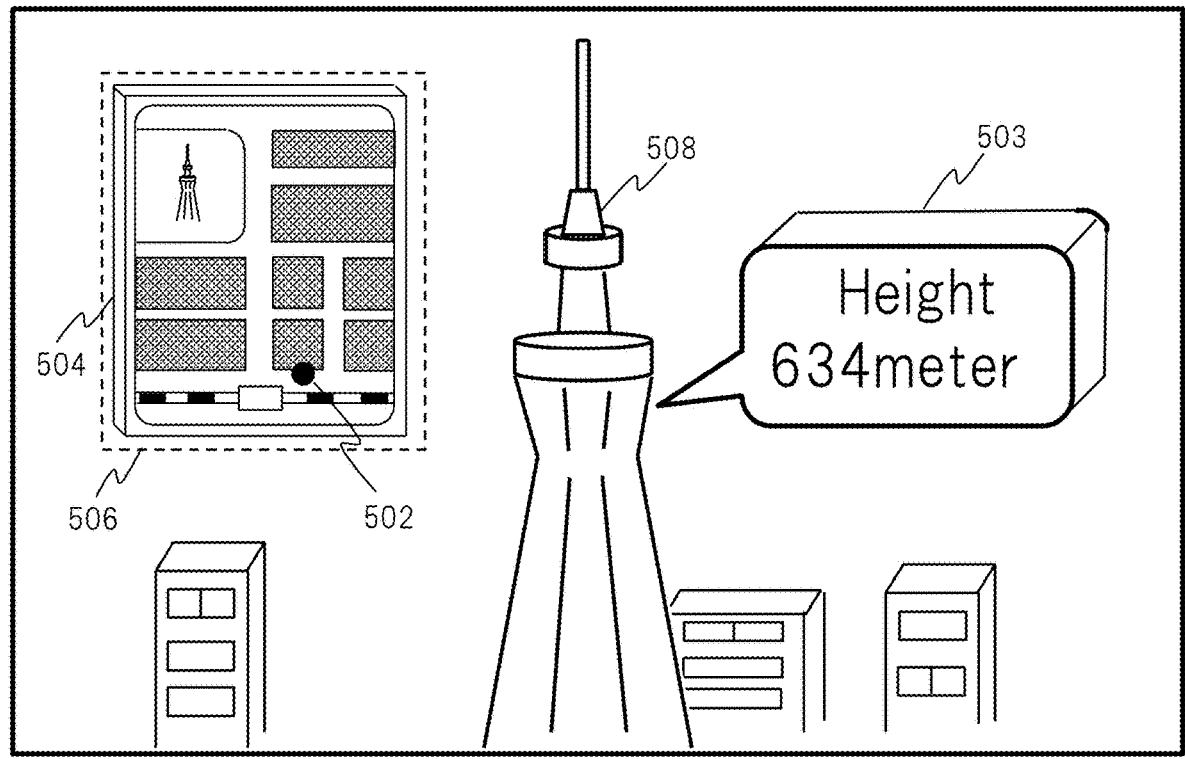

FIG. 20
(a) BEFORE CHANGE
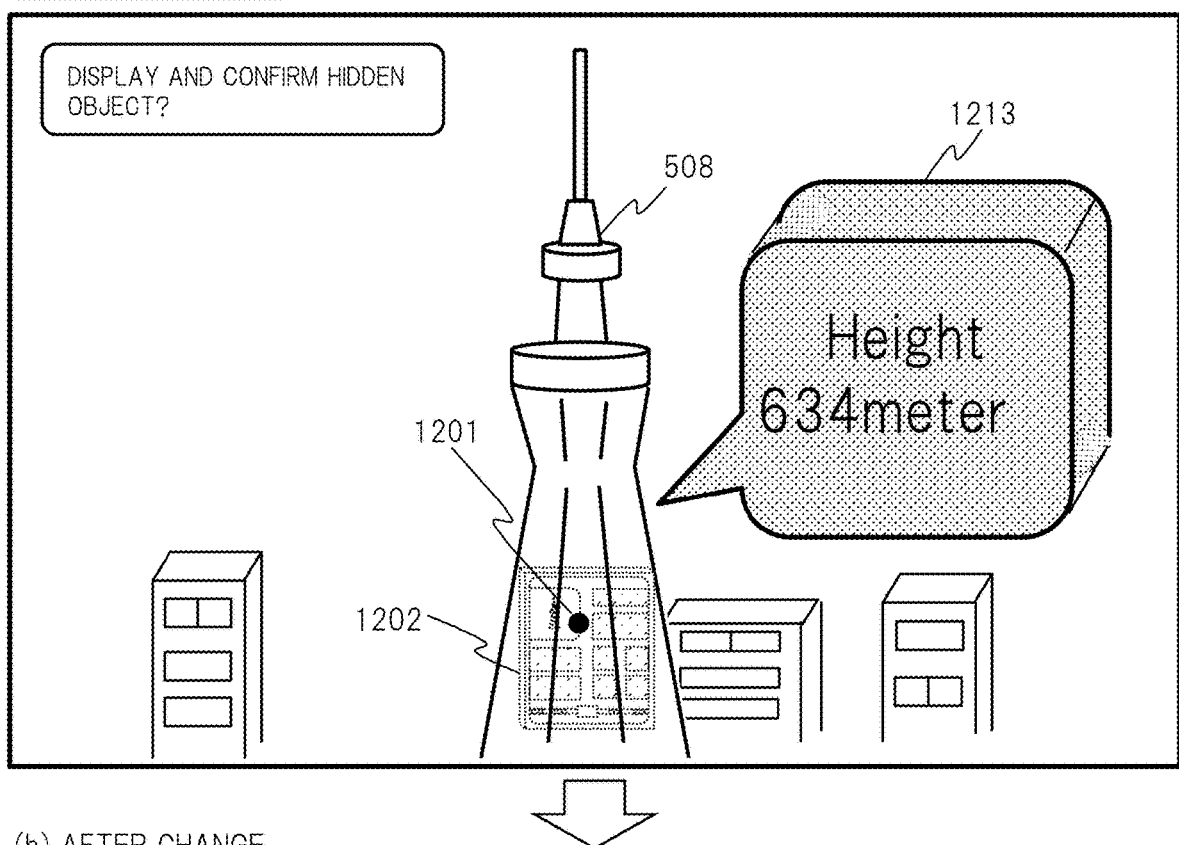
(b) AFTER CHANGE
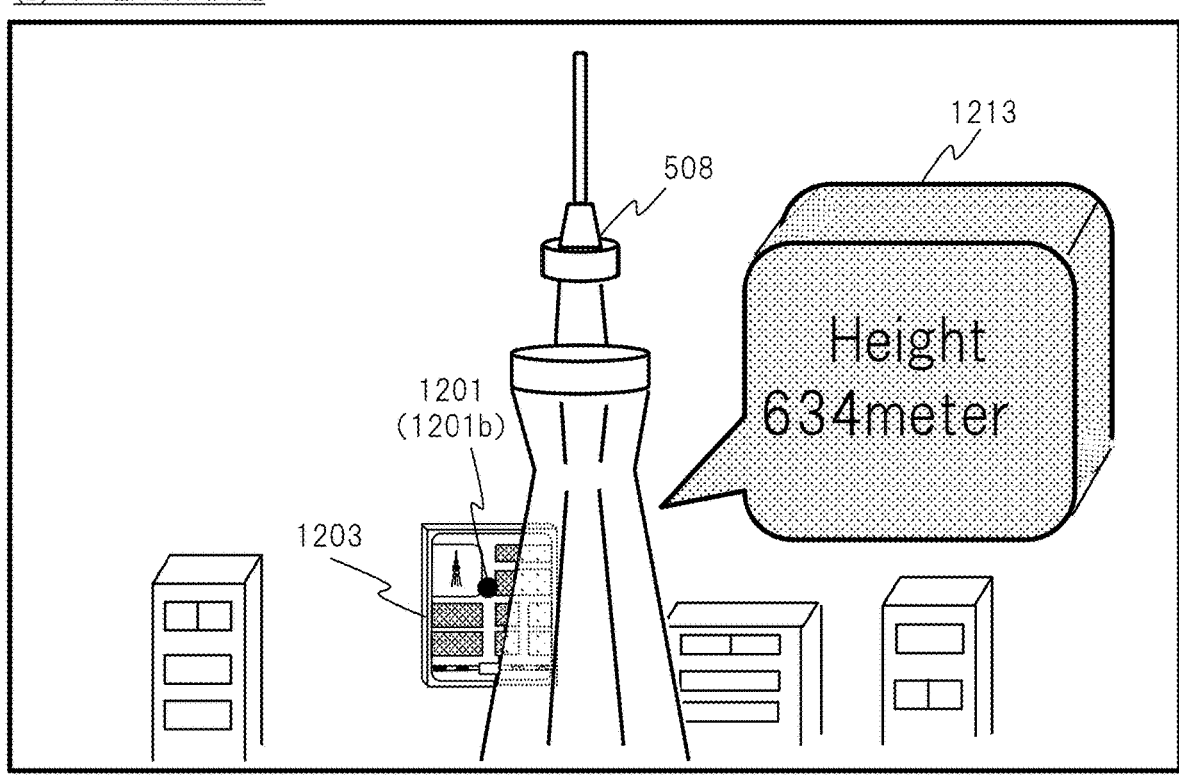

FIG. 24

OBJECT DATA

| ID | OBJECT | TYPE | CATEGORY (DEGREE OF LIMITATION) | VIEWING VALUE (IMPORTANCE) | RELATED OBJECTS | SHARED USERS |
|----|--------|------|--------------------------------|----------------------------|-----------------|--------------|
| 1 | TOWER | A. INDIVIDUAL REAL | 1 (HIGH) | 1 (HIGH) | 2 | — |
| 2 | INTERPRETIVE PANEL | B. VIRTUAL | 2 (MIDDLE) | 2 (MIDDLE) | 1 | — |
| 3 | GUIDE MAP | B. VIRTUAL | 3 (LOW) | 3 (LOW) | — | — |

SHARING EXAMPLE (1)

SHARED USERS {U1, U2}

SHARING EXAMPLE (2)

SHARED USERS {U1, U2}

FIG. 28
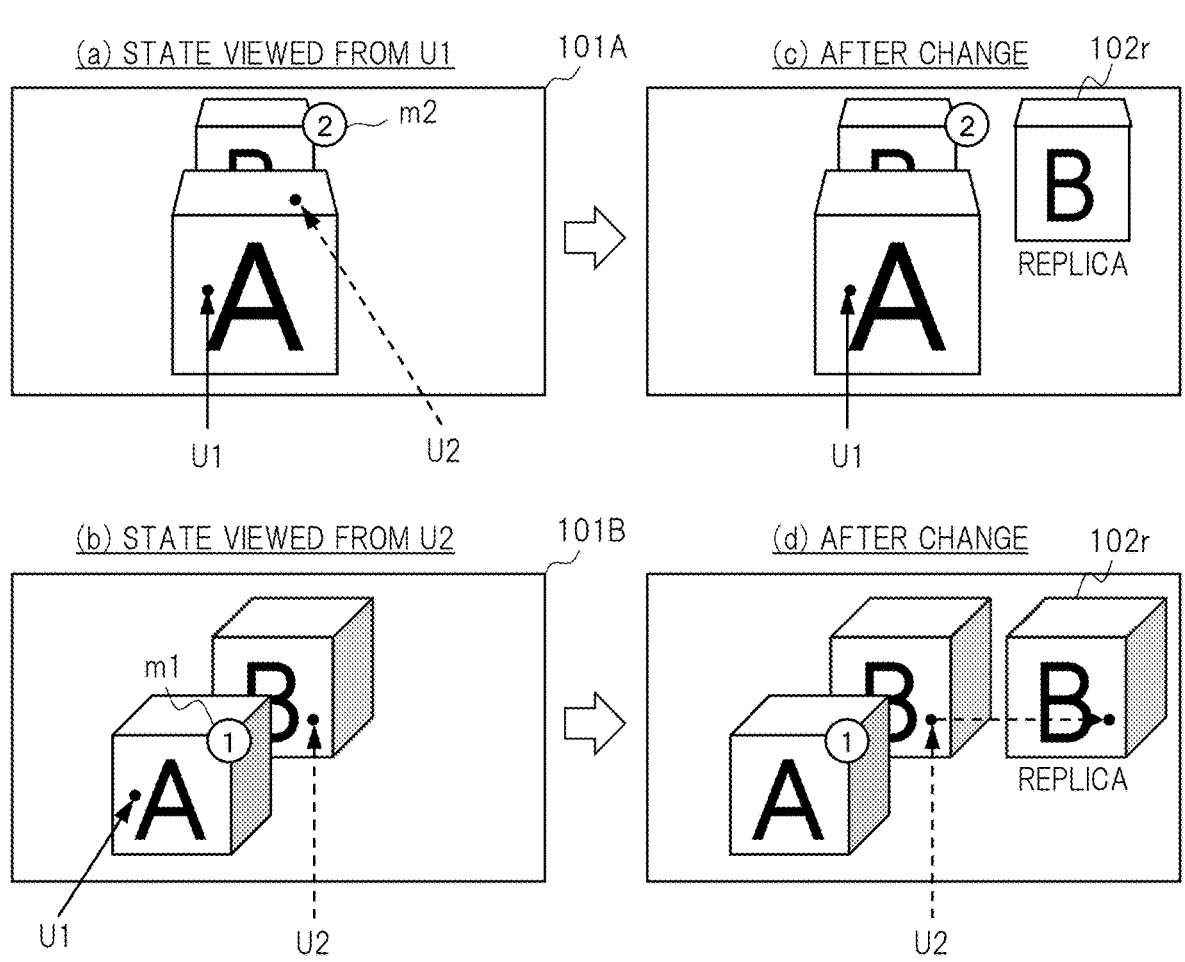
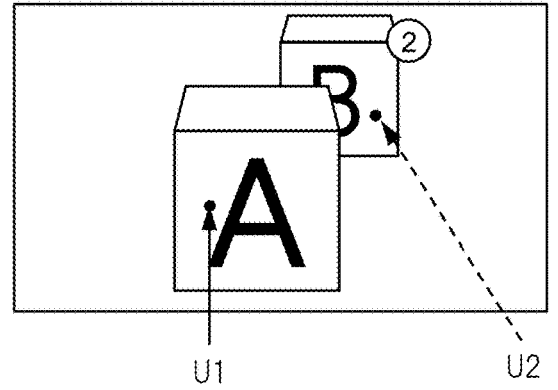
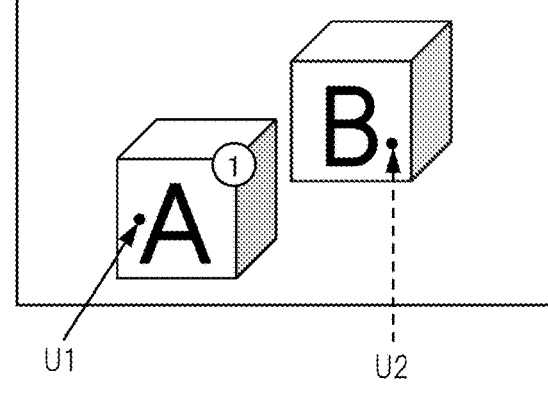

*FIG. 32*
(a) BEFORE CHANGE
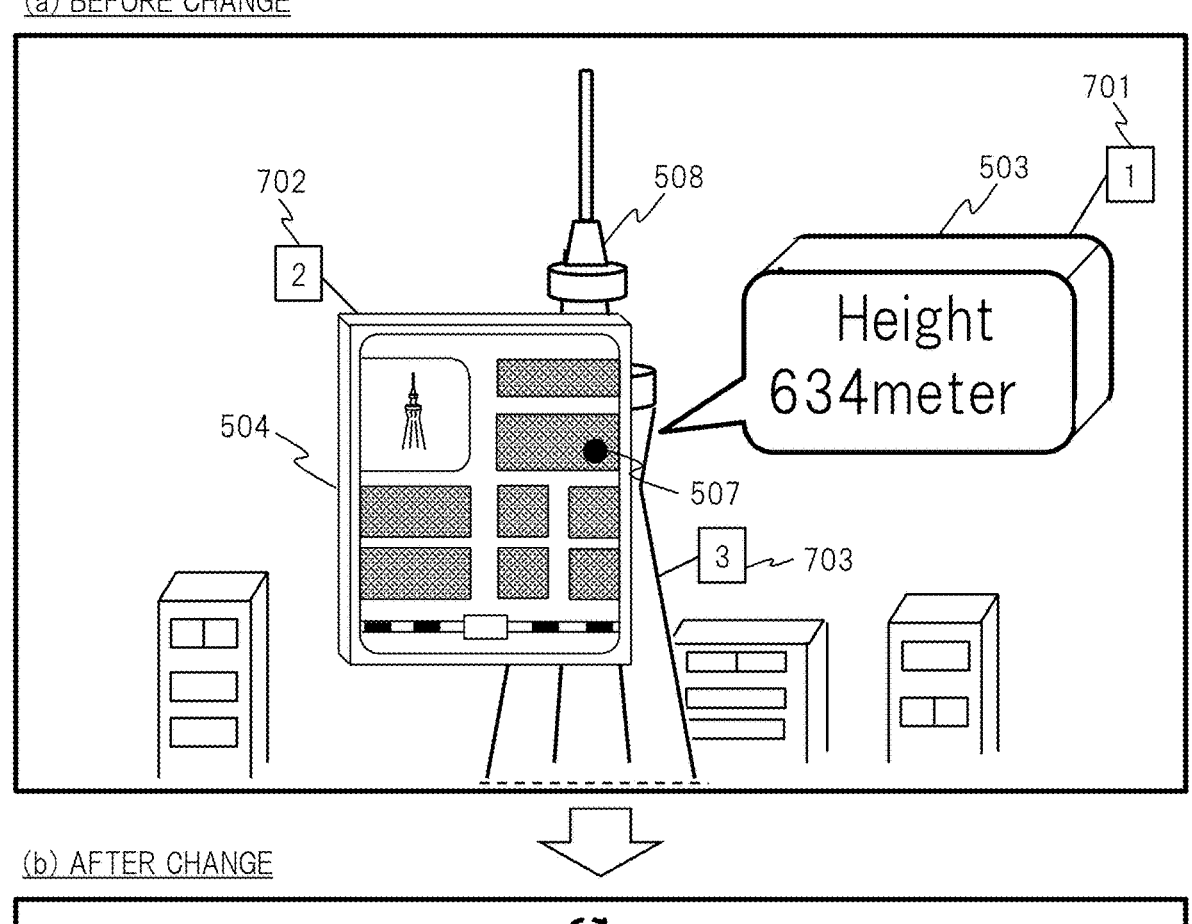
(b) AFTER CHANGE
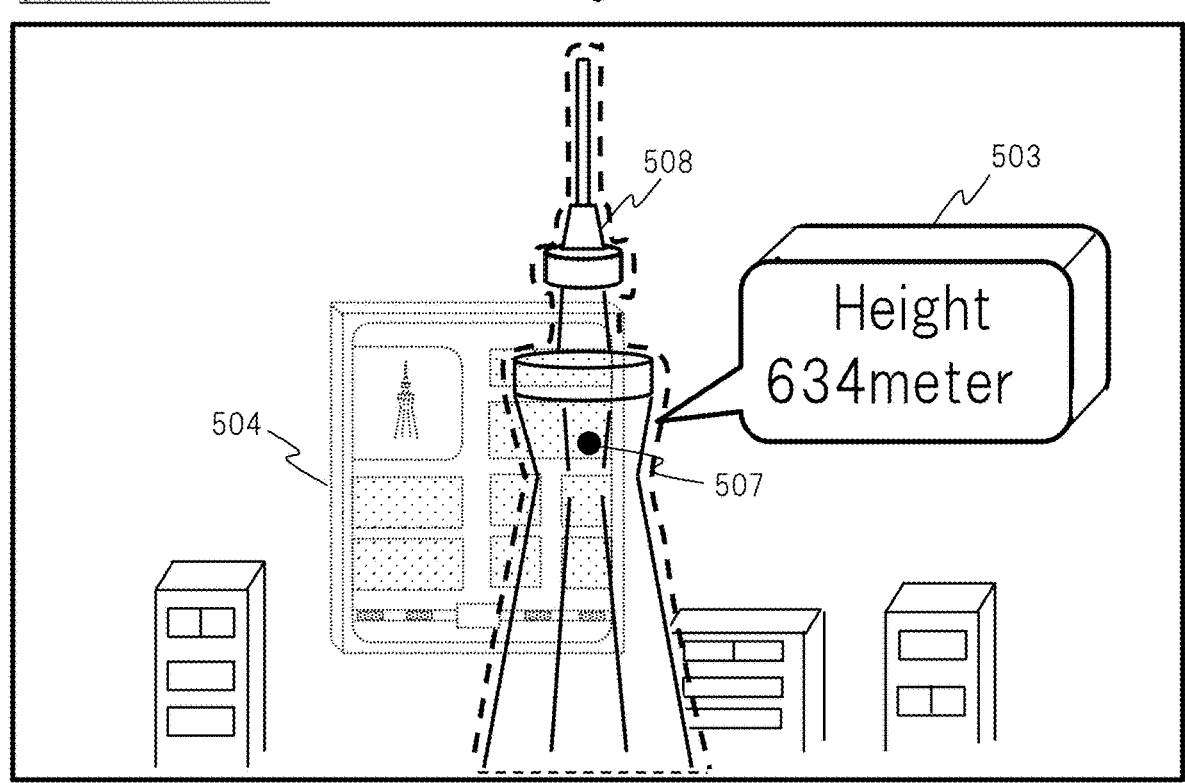

FIG. 34

(a) BEFORE CHANGE                                          101

102
DIFFERENCE OF
BRIGHTNESS
IS LARGE

106

103

B

A

Z  Y
X

U1
1

DISPLAY
MODE
CHANGE (b) AFTER CHANGE

A

B

DISPLAY APPARATUS AND DISPLAY METHOD

CROSS REFERENCE TO RELATED APPLICATIONS

This application is the U.S. National Phase under 35 U.S.C. § 371 of International Application No. PCT/JP2020/046148, filed on Dec. 10, 2020, and the entire contents of each of which Applications are hereby incorporated by reference in their entirety.

TECHNICAL FIELD

The present invention relates to a technology of a display apparatus or an information processing device, and to a technology for displaying an image such as a virtual object.

BACKGROUND ART

Recently, a display apparatus capable of displaying images such as virtual objects has become widely used. One example is a head-mounted information processing device (so called head-mounted display: HMD) which is mounted on a user's head and includes a display unit, a camera unit, or the like. The head-mounted information processing device can display real bodies and virtual objects in the real space, and fuse the real world and the virtual world in real time and seamlessly, and make an experience as if a virtual object exists in the field in the real world. As display methods, there are so-called video see-through type and optical see-through type. In the case of a video see-through type, an image corresponding to a real body and a virtual object is generated and displayed on a display part in front of the head. In the case of an optical see-through type, an image of a virtual object is displayed on the display unit by superimposing it on the real body in front of the eye while making it visible.

As a prior art example related to the display apparatus, Japanese Patent Application Laid-Open Publication No. 2015-090635 (Patent Document 1) is exemplified. In the Patent Document 1, it is described that "while ensuring the visibility of the user, properly displaying the information", and following matters are described. An information display system having a transmissive head-mounted display, wherein the controller detects a user's gaze point based on imaging data of the user's eyes, determines whether the user is gazing on a virtual screen or gazing on a background ahead of a virtual screen based on the gaze point, determines whether the user's gaze area overlaps with a display position of an object on a virtual screen, and changes the display position and/or the display form of the object based on the determination result when the gaze point moves.

RELATED ART DOCUMENT

Patent Document

Patent Document 1: Japanese Patent Application Laid-Open Publication No. 2015-090635

SUMMARY OF THE INVENTION

Problems to be Solved by the Invention

In a display apparatus such as a conventional head-mounted information processing device, when the real body and the virtual object of the real space are displayed as being overlapped, depending on the arrangement relation and the user's line of sight position, the real body or the virtual object which the user wants to view may be shielded by another real body or virtual object, and visualization may be difficult or interfered.

In the Patent Document 1, it is describes that, in the HMD of displaying a virtual object on a virtual screen while realistically see-through the real body, based on the user's attention point, the user is determining whether or not the user is viewing the virtual screen or the background, and determines whether or not the line of sight overlaps the object on the virtual screen, and changes the display position and/or the display form of the virtual object in accordance with the determination results of both. In the Patent Document 1, it is described that when the object being monitored by the user is overlapped by a virtual object, the information display system changes the display position of the virtual object or the display form according to the permeability rate. However, in Patent Document 1, it is considered to eliminate the visual interference on the line of sight, but only, it is not considered at all for interference to the range the user wants to view. Further, in Patent Document 1, it is not suggested anything about the display reflecting the shielding relation when the real body and the virtual object are three-dimensionally (Three-Dimensional: 3D) arranged.

An object of the present invention is to provide, relating to a technology of a display apparatus such as a head-mounted information processing device which can display a virtual object in a three-dimensional arrangement, a technology in which, when there is a visual interference caused by a shield or the like by another object with respect to a visual recognition range of an object such as a real body or a virtual object which the user wants to view, the visual recognition interference can be eliminated or reduced, and the user can suitably recognize the full picture of the object, and thereby, capable of realizing such a function with less labor of the user and with good usability. Problems and effects other than the above are shown in [Best mode for carrying out the invention].

Means for Solving the Problems

Representative embodiments of the present invention have the following configuration. The display apparatus of the embodiment includes: a display apparatus for displaying an image; and a processor for controlling display of the image, wherein the display apparatus displays, as an object, at least the virtual object among the individual real objects cut out from an external real body and the virtual object to be three-dimensionally arranged, the object to which the user wants to gaze is determined as a target object, the object to be obstructed when the user views the target object is detected as an interfering object, and when there is the interfering object, the display mode of at least one of the target object and the interfering object is changed so as to eliminate or reduce the interference caused by the interfering object with the visual recognition of the target object.

Effects of the Invention

According to a typical embodiment of the present invention, with regard to a technology of a display apparatus such as a head-mounted information processing device which can display a virtual object in a three-dimensional arrangement, when there is a visual interfering caused by a shield or the like by another object with respect to a viewing recognition range of an object such as a real body or a virtual object which the user wants to view, the visual interfering can be eliminated or reduced, and the user can suitably visually recognize the full picture of the object, and thereby, capable of realize such a function with less labor of the user and with good usability.

BRIEF DESCRIPTIONS OF THE DRAWINGS

FIG. 2 shows a first embodiment illustrating an object classification, shield-interference relations, and categories;

FIG. 5 shows a display example in the case of reduction/enlargement in the first embodiment;

FIG. 6 shows a display example in the case of display position movement in the first embodiment;

FIG. 7 shows a display example in the case of display position movement in the first embodiment;

FIG. 8 shows a display example in the case of duplicate display is shown in the first embodiment;

FIG. 14 shows a display example in the first embodiment;

FIG. 15 shows a display example in the first embodiment;

FIG. 16 shows a display example in the first embodiment;

FIG. 17 shows a display example in the first embodiment;

FIG. 19 shows a display example in the first embodiment;

FIG. 20 shows a display example in a display apparatus of a second embodiment of the present invention;

FIG. 24 shows an example of the object data in each embodiment;

FIG. 28 shows a display example in the third embodiment;

FIG. 32 shows a display example in a display apparatus of a fourth embodiment of the present invention;

FIG. 34 shows a display example in a display apparatus of a fifth embodiment of the present invention.

BEST MODE FOR CARRYING OUT THE INVENTION

Figure 1:
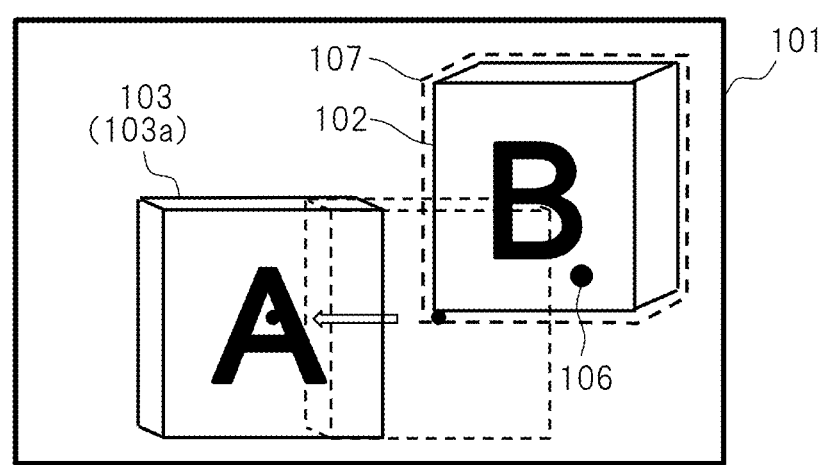
FIG. 1 shows a configuration outline and display example of a head-mounted information processing apparatus (HMD) which is a display apparatus of a first embodiment of the present invention.

Hereinafter, embodiments of the present invention will be described in detail with reference to the drawings. In the drawings, the same parts are denoted by the same reference numerals in principle, and repeated description will be omitted. In the drawings, representations of each component may not represent actual positions, sizes, shapes, ranges, and the like in order to facilitate understanding of the invention, and the present invention is not necessarily limited to positions, sizes, shapes, ranges, and the like disclosed in the drawings. Without any particular limitation, each of the components may be singular or plural. For the purpose of description, when describing processing by a program, there is a case where the description mainly includes programs, functions, processing unit, etc., the main as a hardware for them is, a processor, or a controller, device, a computer, a system, etc. composed of the processor or the like. The computer executes the processing according to the program read in the memory while using resources such as memory and communication interface as appropriate by the processor. Thus, a predetermined function or processing unit or the like is realized. The processor is composed of, for example, a semiconductor-device such as a CPU or a GPU. The processor is composed of devices and circuits which can perform predetermined operations. The processing is not limited to the software program processing, but can be implemented by a dedicated circuit. FPGA, ASIC and the like can be applied to the dedicated circuitry. The program may be previously installed as data on the target computer, or it may be distributed and installed as data from the program source to the target computer. The program source may be a program distribution server on a communications network or a non-transient computer-readable storage medium. The program may consist of a plurality of program modules. Explanatory explanations of various types of data and information may be made by, for example, expressions of tables and lists, but are not limited to such structures and formats. Data and information for identifying various elements may be described in terms of expressions of identifiers, identifiers, ID, names, numbers, etc., but these expressions can be replaced with each other.

First Embodiment

A display apparatus and a display method of a first embodiment of the present invention will be described with reference to FIG. 1, etc. The display apparatus of the first embodiment is a virtual object display apparatus, and shows a case where it is applied to a head-mounted information processing device (described as HMD). The display method of the first embodiment is a method having steps performed by the display apparatus of the first embodiment.

The display apparatus of the first embodiment includes a display device capable of displaying a virtual object (in other words, a display) and a processor for controlling the display of the virtual object of the display device, and as an object, displays on the display plane of the display device, at least the virtual object in the external real body including the individual real object cut out or recognized from the external real body as a part in the virtual object and the three-dimensional arrangement. In the case of the video see-through type, individual real object and virtual object can be displayed as an image which is an object. In the case of the optical see-through type, as an object, the virtual object can be displayed so as to be aligned with the real body.

The display apparatus of the first embodiment judges and determines an individual real object or a virtual object which is an object to which the user wants to observe as a target object, and detects an individual real object or a virtual object which is an object which interferes when the user views the target object as an interfering object. The display apparatus of the embodiment changes the display mode of at least one of the target object and the interfering object so as to eliminate or reduce the interfering of the interfering object to the visual recognition of the target object when the existence of the interfering object is detected.

[1. Display Apparatus (HMD)]

FIG. 1 shows a configuration and a display example of a head-mounted information processing device (HMD) 1 which is a display apparatus according to a first embodiment. In FIG. 1, a schematic configuration of an external view is shown where a user U1 wears an HMD 1 on the head. Also shown in FIG. 1 is a view in which the user U1 views the image of a three-dimensional object displayed in the viewing range 101 by the HMD 1. Also shown in FIG. 1 is an example of a change in the display mode of an object in the viewing range 101. (a) shows the display example before the change and shows the case where there is a shield-interference relation in the objects of "A" and "B". (b) shows the display example after the change and shows the state in which the shield-interference relation is temporarily eliminated in the objects of "A" and "B".

The HMD 1 is mounted on the head of the user U1 and displays images, such as objects, within the user U1's viewing range 101. The viewing range 101 is associated with the display plane 11 of the display device provided in the HMD 1. An object is a individual real object which is part of a real body or a virtual object which is arranged in three dimensions. The user U1 can view, for example, the objects 102, 103 within the viewing range 101. For example, the object 102 is a virtual object described as "B" in a cuboid shape. The object 103 is a virtual object described as "A" in a cuboid shape. From the viewpoint of the user U1, the object 102 is disposed on the rear side with respect to the object 103 disposed on the front side. Since the front object 103 shields at least a portion of the rear object 102, viewing of the object 102 is interfered or obstructed, in other words, is made difficult to view. Such objects 102, 103 (a set of two objects) are described as object, etc., in "shield-interference relation" for the purpose of description.

As the line of sight of both eyes of the user U1, there are a line of sight 104 of the left eye and a line of sight 105 of the right eye. Depending on the orientation of the line of sights 104, 105 of both eyes of the user U1, the gaze point 106 which is the position at which the user U1 is gazing in the three-dimensional space can be calculated. The object located near a gaze point 106, e.g., the object 102 of "B", is corresponded to a desired object which the user U1 views as an object and a target. The HMD 1 judges and decides such an object as a target object based on the line of sight and gaze point of both eyes. In this example, in (a), the object 102 of "B" in which the gaze point 106 is located is determined as the target object. The HMD 1 sets a target viewing range 107 for the target object. The target viewing range 107 is a range which the user U1 wants to view, which is related to the target object.

On the other hand, the object 103 of the front "A" shields a portion (e.g., the lower left portion) of the target viewing range 107 of the object 102 of "B", which is the target object the user U1 is intended to view. In this instance, the user U1 is prevented from viewing the full picture of the target viewing range 107 of the object 102 of the target object "B" by the shielding of the object 103 of "A". The HMD 1 determines and detects objects which interfere with such visibility as interfering objects. The HMD 1 grasps the relation between objects such as "A" and "B" as "shield-interference relation".

The HMD 1 changes the representation of these objects if there is such a shield-interference relation. The HMD 1, for example, changes the representation of an "A" object 103, which is an interfering object shielding inside of the target viewing range 107. Specifically, in this example, the HMD 1 changes the display position of the object 103 of "A" to a position outside of the target viewing range 107 within the viewing range 101. In other words, the HMD 1 moves the object 103 to an empty location outside of the target viewing range 107 to replace the status of the object 103a after the movement. This change causes the HMD 1 to leave all of the target viewing range 107 unshielded. Thus, the user U1 can view the full picture of the target viewing range 107 of the object 102 of "B" which is the target object. The HMD 1 may determine the display position after the movement, not to be separated from the original display position of the object 103 and the target object as far as possible, when moving the object 103 of "A", which is the interfering object. An example of changing the display mode of the object related to the shield-interference relation is an example of changing the display position of the interfering object side, but is not limited to this, and various types of changes described later can be performed.

The information/data of the virtual object, etc. may be generated in the HMD 1 or generated outside the HMD 1, for example, by the information server 120, and supplied to HMD 1 through the external network, either case may be possible. In the information server 120, large-capacity of information can be handled, and, for example, high-quality and high-definition virtual objects can be generated and retained. The external device may also be a user's portable information terminal or a home device or the like.

[Target Object]

In the first embodiment, the gaze point 106 in the three-dimensional space which can be calculated from the two gaze directions 104, 105 of FIG. 1 is used as a means for specifying, determining, and confirming the target object which is the object which the user U1 wants to gaze. The HMD 1 may determine, for example, the object which is closest to the position of the gaze point 106 as the target object. This means is not limited thereto, various means can be applied. Other means may include pointers by a remote controller or the like, voice input, recognition of gestures by a hand, or the like. When a pointer is used, the user U1 operates the pointer displayed on the display plane by a remote controller or the like. The HMD 1 may determine as the target object the object in which the pointer is located, or an object specified by an on-operation of the pointer, within the viewing range 101. For the voice input, the user U1 inputs by voice the information which identifies the displayed object. The HMD 1 may recognize the entered voice and, if it recognizes, for example, "B", determine the object 102 of "B" as the target object.

[Object]

With reference to FIG. 2, supplementary description will be given of terms and the like. (A) in FIG. 2 shows the classification of "objects". In the first embodiment, two types of objects are roughly classified as objects displayed on the display plane 11 by the HMD 1. The two types of objects are described as "individual real objects" and "virtual objects". These objects are elements which may constitute a shield-interference relation. In the HMD 1 of the first embodiment, these objects are objects which can be arranged in three dimensions in a viewing range 101 corresponding to the display plane 11. That is, these objects are objects which can be placed in the front or rear in the depth direction viewed from the viewpoint of the user U1 to the viewing range 101. Objects placed in the front and rear may overlap each other, resulting in a shield-interference relation.

This object is not necessarily an image (referring to the image generated by the display apparatus). An "individual real object" is an object based on a real body (in other words, a real image). The "individual real object" is an image of an individual real body cut out from the real body in the case of a video see-through type. The "individual real object" is an individual real body cut out (in other words, recognized) from the real body in the case of an optical see-through type, and is not an image. A "virtual object" is an image of any virtual object generated by a display apparatus in relation to or independent of the real body.

(B) in FIG. 2 shows the pattern of the shield-interference relation of the object in the first embodiment. There are four types of patterns in which the above two types of objects are arranged in front and rear. In the first pattern, the individual real objects are placed on the front side of the individual real objects on the rear side. In the second pattern, a virtual object is placed on the front side with respect to the individual real object on the rear side. In the third pattern, an individual real object is placed on the front side relative to the virtual object on the rear side. In the fourth pattern, a virtual object is placed on the front side of the virtual object on the rear side. The HMD 1 of the first embodiment, except for some exceptions, in each case of these patterns, the display mode change is applicable.

[Display Example]

FIGS. 3 to 8 show various examples of display mode changes as display examples in the viewing range 101 corresponding to the display plane 11 of the HMD 1.

[Display Example (1)]

Figure 3A:
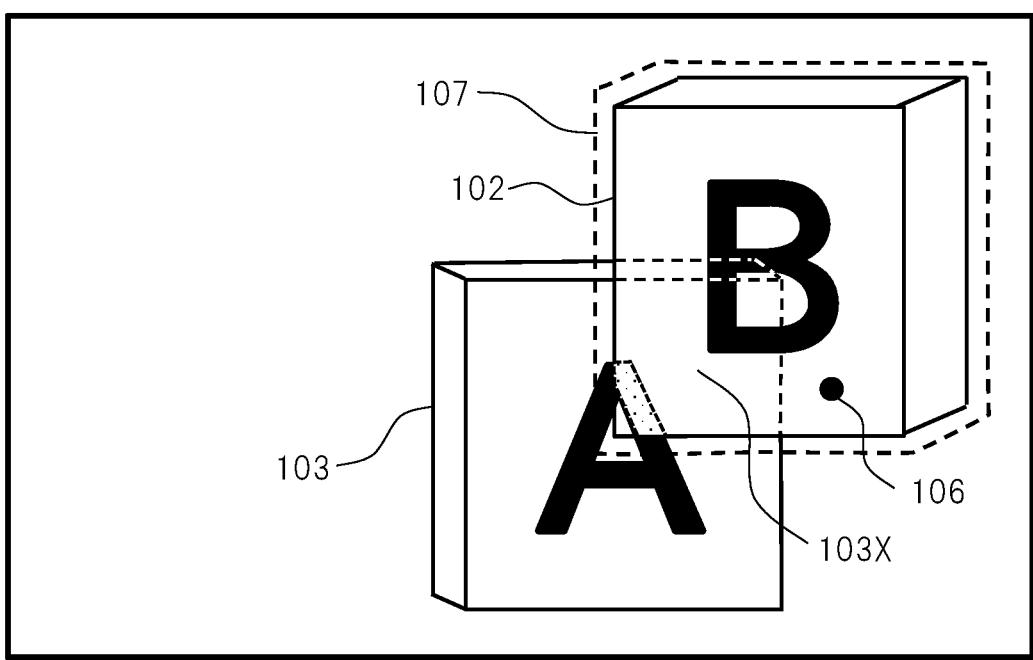
FIGS. 3A-3B show a display example in the case of permeability rate adjustment in the first embodiment.

FIG. 3A is an example in which, when there is a shield-interference relation of objects of "A" and "B" as (a) in FIG. 1, adjustment is performed to increase the permeability rate (in other words, transparency rate) of the object 103 of "A" which is the interfering object on the front side as the display mode change. Thereby, since the interfering object becomes transparent, this makes it easier to view in the target viewing range 107 of the object 102 of the target object "B" which is a partially shielded object. Thus, the user U1 is visually acceptable to the target viewing range 107 of the target object. In this example, there is shown the case where the HMD 1 adjusts the permeability rate up to close to the permeability rate by the portion 103X of the image area of the object 103 shielding the target viewing range 107 on the rear side among the image area of the object 103 which is the target viewing range on the front side. The degree of visual interference can be reduced by this permeability rate up-adjustment.

Figure 3B:
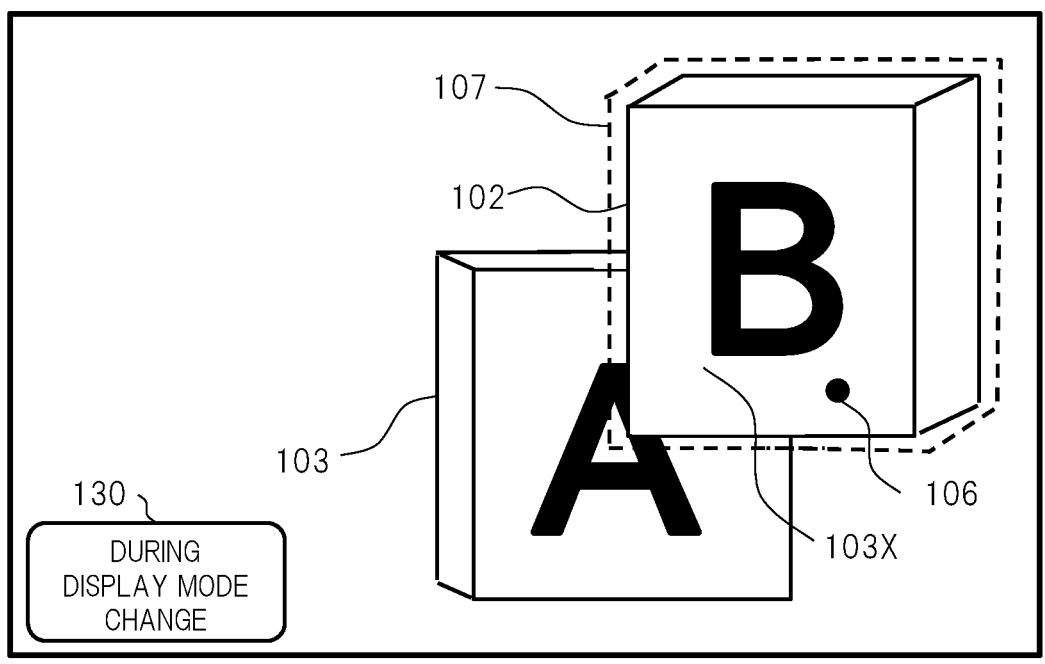

FIG. 3B is another example in which the HMD 1 adjusts the permeability rate to the greatest level by a portion 103X of the front interfering object shielding the target viewing range 107. In other words, the portion 103X whose permeability rate is maximized is hidden in the non-displayed state. As a way of view, the target viewing range 107 of the object 102 of "B" on the rear side is temporarily in a state such that it temporarily comes to the front of the object 103 of the "A". Thus, the target viewing range 107 is not shielded at all, it is possible to eliminate the visual interference.

Figure 4A:
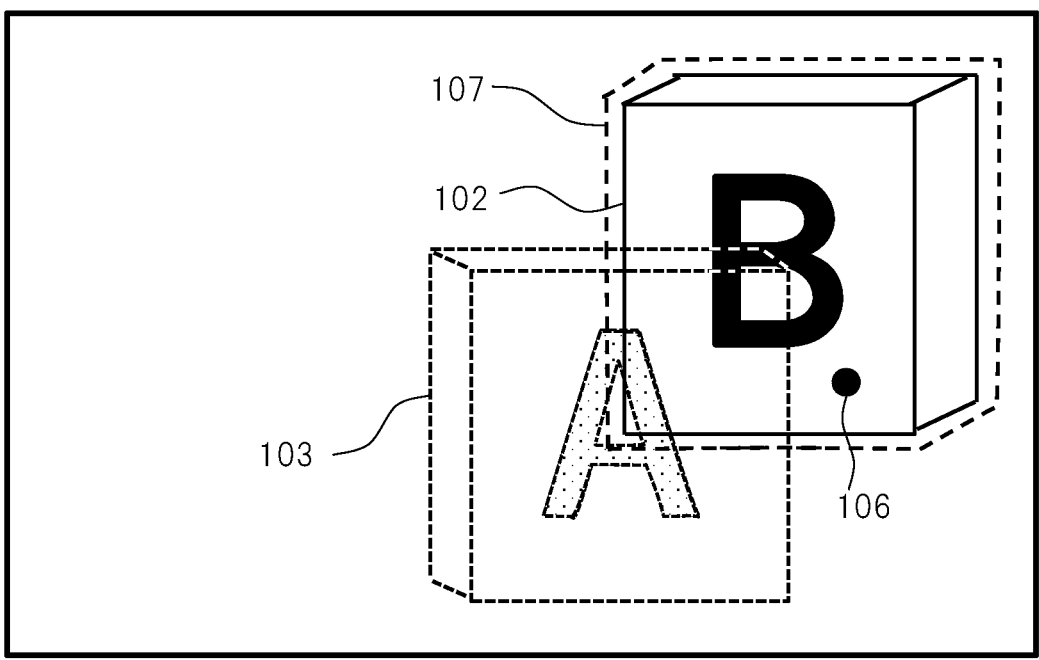
FIGS. 4A-4B show a display example in the case of permeability rate adjustment in the first embodiment.

FIG. 4A shows another example in which the same permeability rate up-adjustment is performed for all of the objects 103 of "A" which are interfering objects. This makes the target viewing range 107 easier to view through all of the interfering objects. At the same time, the interfering object is displayed with the same permeability rate, so it is easy to confirm the interfering object.

Figure 4B:
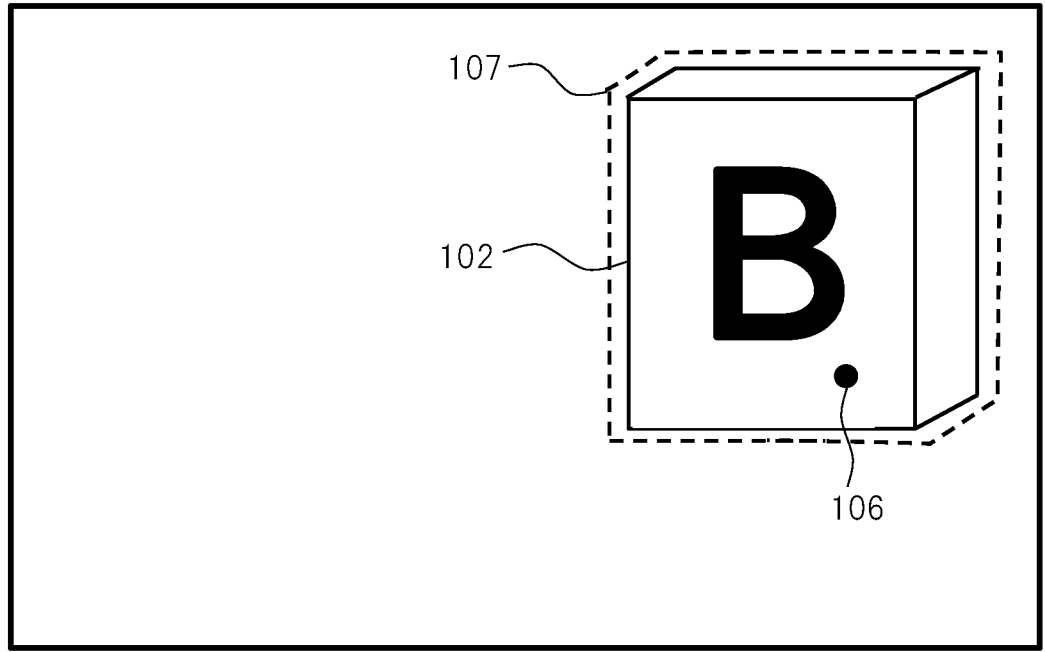

FIG. 4B is another example, showing a case in which all of the objects 103 of "A" which are interfering objects which are shielded are in a non-display state of the permeability rate maximum. In this case, the interfering object is completely invisible, so that the full picture of the target viewing range 107 is easily confirmed. As shown in the examples of FIGS. 1-4, the visual interference of the target object's target visual range by the interfering object can be resolved by changing the display mode, or the degree of the visual interference can be reduced.

[Display Example (2)]

FIG. 5 shows an example of another display mode change. The change from (a) to (b) in FIG. 5 shows a case in which the object 103 of the interfering object "A" is reduced and the permeability rate is adjusted. The object 103 of "A" has been replaced with an object 103b after change. In this way, the HMD 1 is resized to make the interfering object smaller for the target object. This can further reduce the degree of visual interference caused by interfering objects. Further, it may be only the reduction of the interfering object, the effect of easily confirming the target viewing range can be obtained. Similarly, as another method, a change from (a) to (c) in FIG. indicates a case of making a change to expand the target object of "B" to the interfering object of "A". The object 102 of "B" has been replaced with an enlarged object 102c after the change. Even in this case, the effect of easily confirming the target viewing range is obtained.

[Display Example (3)]

FIG. 6 illustrates an example of changing the display mode of the target object rather than the interfering object. For example, the target object is a virtual object, and the interfering object is a virtual object or an individual real object which is not suitable for up-adjusting the permeability rate or changing the display position from the viewpoint of inconsistency of the user U1 rather than the target object. In this case, it is useful to change the display mode of the target object as shown in FIG. 6 or the like.

FIG. 6 shows the case where the display position of the target object is changed. In the state before the change in (a), an object 109 of "C" is placed on the front side and an object 102 of "B" which is a virtual object on the rear side. The target object is an object 102 of "B". A portion of the target viewing range 107 of the target object of "B" is shielded by the object 109 of "C". The object 109 of "C" on the front side is a virtual object or individual real object which is not suitable for permeability rate up-adjustment, display position change, etc. (b) shows the state after change. The HMD 1 moves the display position of the object 102 of the target object "B" out of the shield of the object 109 of the interfering object "C". Object 102 and target viewing range 107 of "B" have been replaced with the object 102*b* and target viewing range 107*b* after moving. Thus, the full picture of the target viewing range 107*b* is visible. With this movement, the gaze point of the user U1, for example, moves from the gaze point 106 to the gaze point 106*b*. Thus, the user U1 can view the full picture of the target viewing range 107*b* of the object 102*b* after moving to the gaze point 106*b*. This is equal to the full picture of the target viewing range 107 of the original object 102.

The HMD 1 moves the target object to a position which does not interfere with the visibility of other objects, i.e. a position which is vacant within the viewing range 101. In this example, the object "B" and "C" are moved to the left side because the left side is empty.

FIG. 7 shows an example of another display mode change. The HMD 1 may move both the target object and the interfering object for the interfering-related objects "A" and "B" in the shield-interference relation. Movements of both objects are effective when the angle of view of the display is small or the like. In the change from (a) to (b), the object 102 of the target object "B" and the object 103 of the interfering object "A" are moved away from each other (in this example, in the left-right direction). This results in a state in which the full picture of the target viewing range 107 is visible.

[Display Example (4)]

FIG. 8 further illustrates, as an alternative method of display mode change, a method of display of a replicated object rather than moving the object. In the change from (a) to (b), the HMD 1 displays as is the object 102 of "B", which is the target object partially shielded by the object 103 of "A", which is the interfering object. In addition, the HMD 1 generates a duplicate object 102*r* of object 102 of "B" and displays it at a free position (e.g., the left position). The HMD 1 may also display the duplicate object 102*r* as well as display information which shows the user U1 that it is a duplicate. The HMD 1 makes such that the full view of the target coverage 107*r* of the replicated object 102*r* is visible. Thus, the user U1 can view the full picture of the target viewing range 107*r* of the replicate object 102*r* in the gaze point 106*r* after moving. This is equal to the full picture of the target viewing range 107 of the original object 102. In this scheme, the user U1 can grasp the placement relation between the original "B" object 102 and the "C" object 103 as well as the full visibility of the target object using the replicated object.

As described above, the HMD 1 according to the first embodiment changes a display mode such as a display position, permeability rate, a size, or a duplicate of at least one object when at least a part of a target viewing range of the target object is shielded by the interfering object. Each change method can also be applied in combination. This can eliminate the visual interference of the target object by the interfering object or reduce the degree of the visual interference. The HMD 1 also considers the details of the shield-interference relation and determines the details of the display mode change. For example, the HMD 1 changes the display mode of the target object when the display mode change of the interfering object is not appropriate.

[Transmission of Display Mode Change State]

The HMD 1 temporarily changes the display mode of the object, as in the above example, when there is a shield-interference relation between objects. At this time, the HMD 1 may output at a GUI or the like so as to convey clearly to the user U1 that the status is temporarily display mode change is being performed. For example, the HMD 1 may display an image to the effect that the display mode is being changed on the display plane. Image 130 in FIG. 3B is an example. For example, when the display position of the object is changed, the HMD 1 may use animations, effects, etc., to express the state of being changed, or may display the changed object in a particular color, etc.

Further, the HMD 1, during the process of the above-described display mode change may temporarily locked the determination process of the gaze point. Thus, for example, in the case of changing the object display position of FIG. 6, when the movement of the gaze point 106 occurs along with it, it is possible to prevent accidental determination of the target object.

[Processing Flow]

Figure 9:
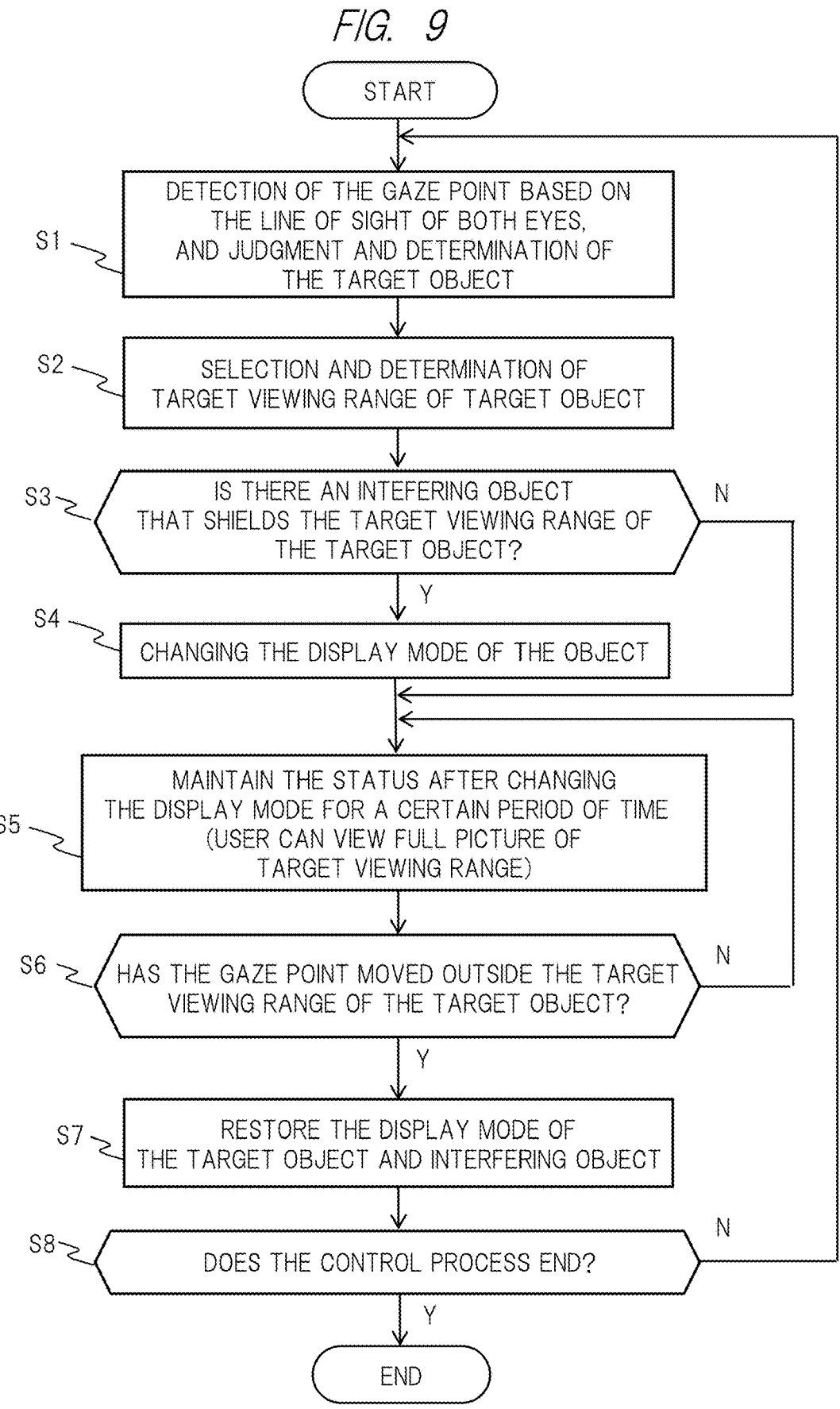
FIG. 9 show a main processing flow in the first embodiment.

FIG. 9 shows the main process flowchart for explaining the basic operation of the HMD 1 according to the first embodiment.

The flow of FIG. 9 has steps S1~S8. In the step S1, the HMD 1 detects a gaze point 106 at which the user U1 is gazing in space based on detecting a line of sight (104,105) of both eyes of the user U1 of FIG. 1. The HMD 1 judges and determines a target object which is estimated to be a desired object that the user U1 intends to view based on the detected position of the gaze point 106. Since the HMD 1 grasps the position of each object and the position of the gaze point 106 in the three-dimensional space, it is possible to compare their positions, for example, to judge and determine the object at the position closest to the position of the gaze point 106 as the target object. Here, the target object is decided by using the gaze point 106, and a modification will be described later.

Next, at the step S2, the HMD 1 selects and determines the target viewing range that the user U1 is supposed to want to view for the above confirmed target object. For example, in the example of FIG. 1 or the like, the target viewing range is selected as the same image area as the visual display range of the target object (the image area in which there are pixels along the shape). Without being limited thereto, the target viewing range may be selected as an image area (for example, a circumscribed rectangle, a circumscribed ellipse, or the like) that encompasses the target object. Alternatively, the target viewing range may be an area such as a rectangle or ellipse of a predetermined size centered on the gaze point.

In the step S3, the HMD 1 determines whether there are interfering objects which obstruct the target viewing range of the defined target object. For example, the HMD 1 may determine that an interfering object is present when a range of a predetermined percentage or more of the target viewing range is shielded by an object on the front side. If an interfering object is present (Y), proceed to the step S4; if not (N), skip the step S4.

In the step S4, the HMD 1 changes the display mode of the object so as not to shield the target viewing range of the target object. The method of changing the display mode can select a suitable method from the methods including display position, permeability rate, size, and duplication for at least one object of the interfering object and the target object as in the above-described example. In particular, the HMD 1 selects a method for changing the display mode of the target object, such as when the interfering object is less suitable for changing the display mode than the target object.

In the step S5, the HMD 1 maintains the state after the display mode change for a certain period when the display mode change is performed. Thus, the user U1 can view the full picture of the target viewing range of the target object in that state. In the absence of an interfering object (S3-N), the user U1 can view the full picture of the target viewing range of the target object even without a display mode change.

In the step S6, the HMD 1 determines whether the gaze point of the user U1 has moved outside the target viewing range of the target object. If the gaze point remains unchanged and is within the target viewing zone (S6-N), returns to the step S5. Thus, the state of the display mode change is maintained as it is, a state in which it is possible to visually recognize the target viewing range is maintained.

On the other hand, if the gaze point moves out of the target viewing range (S6-Y), the process proceeds to S7 of steps. In the step S7, the HMD 1 restores the display mode change state for the target object and the interfering virtual object in the shield-interference relation to the original state prior to the change.

Thereafter, in the step S8, the HMD 1, for example, based on the status of gaze or the like, confirms whether to continue or terminate the control process. If the case of continuing (N), it returns to the step S1, and repeats similarly detecting a new gaze point or the like. In the case of terminate end (Y). This flow ends.

Based on the above-described processing flow, in the first embodiment, when the target object is shielded by the interfering object, the degree of the interfering in the visibility of the target viewing range can be eliminated or the degree of the interfering in the visibility can be reduced by changing the display mode of the object.

In the above example, although it has been assumed to maintain the display mode change state for a certain period of time in accordance with the state of the gaze point, not limited to this, when the user U1 inputs a predetermined operation, or when it detects that the line of sight or gaze point becomes a predetermined state, it may be made the end of the display mode change.

[Function Block]

Figure 10:
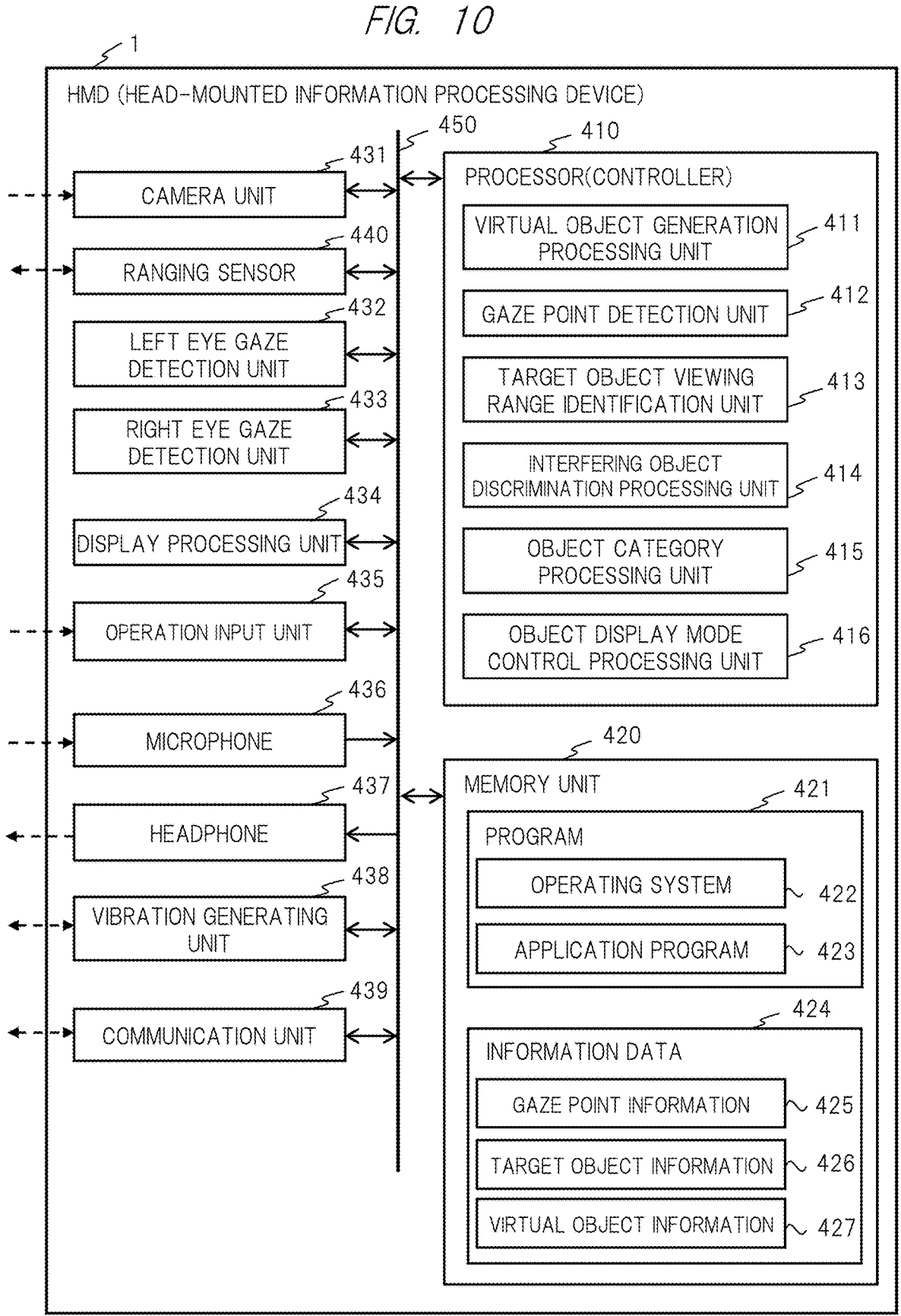
FIG. 10 shows a functional block configuration example in the first embodiment.

FIG. 10 shows a functional block configuration of a HMD 1 which is a display apparatus according to the first embodiment. The configuration is basically the same in the case of other types of display apparatuses. In this configuration example, although the components are implemented in one device, not limited thereto, some components may be implemented separately to another apparatus.

In FIG. 10, the HMD 1 is configured with a processor 410, a memory unit 420, a camera unit 431, a ranging sensor 440, a left eye gaze detection unit 432, a right eye gaze detection unit 433, a display processing unit 434, an operation input unit 435, a microphone 436, a headphone 437, a vibration generating unit 438, and a communication unit 439 as appropriate, and each component is connected to each other through a bus 450.

The processor 410 is composed of a CPU, ROM, RAM or the like and configures the controllers of the HMD 1. The processor 410 executes a process according to an operating system (OS) 422 or an application program 423 for operation control stored in the memory unit 420 as a program 421 for control. Thus, the processor 410 controls each of the components and implements functions and other functions such as OS, middleware, and applications.

The memory unit 420 is composed of a nonvolatile storage device or the like, and stores various programs 421 and information data 424 handled by the processor 410 or the like. As the information data 424, the gaze point information 425 indicating the position, etc. of the gaze point to be observed by the user U1, the target object information 426 representing the shape and position, etc. of the target object to be viewed by the user U1, and the virtual object information 427 representing the shape and position, etc. of the virtual object are stored.

The camera unit 431 photographs the view and viewing range around the front of the HMD 1 and acquires an image by converting light incident from the lens into an electric signal by the image pickup device. In the optical see-through HMD, the user U1 directly views the objects in the forward surrounding viewable range and field of view. In the video see-through type HMD, the camera unit 431 photographs the real body in the forward surrounding view and field of view, and the captured image of the real body is displayed by the display device of the display processing unit 434.

The ranging sensor 440 is a sensor for measuring the distance between the HMD 1 and the real body of the outside world. The ranging sensor 440 may be a TOF (Time Of Flight) type sensor or a stereo-camera or other type sensor. The HMD 1 grasps the three-dimensional arrangement information of the real body of the outside world using the ranging sensor 440 or the arrangement data, and displays the object reflecting the shielding relation between the individual real object and the virtual object. The HMD 1 may refer to arrangement data of real body in the outside world, including those that are shielded, with reference to several characteristic points of the real body in the outside world. The arrangement data may be created or retained by the HMD 1, or may be acquired from an external information server 120 or the like.

The left eye gaze detection unit 432 and right eye gaze detection unit 433, respectively, detect the line of sight (104, 105) by capturing the movement and orientation of the left eye and right eye. Incidentally, line of sight detection process can utilize a well-known technique which is generally used as an eye tracking process. For example, as a method using corneal reflection, a technique is known in which infrared rays are irradiated from an infrared LED (Light Emitting Diode) to a face and photographed by an infrared camera, the position on the cornea of the reflected light generated by the irradiation is used as a reference point, and the line of sight is detected based on the position of the pupil with respect to the position of the corneal reflection. There is also known a method for detecting a line of sight based on the position of the iris with respect to the eye head by making the eye as the reference point and the movement point as the iris by taking the eye with the visible light camera. The intersection of the line of sight 104 of the left eye detected by the left eye gaze detection unit 432 and the line of sight 105 of the right eye detected by the right eye gaze detection unit 433 is detected as the gaze point 106 that the user U1 gazes at.

The display processing unit 434 is constituted by a display device and a portion for performing display processing. When the optical see-through type HMD is used, the display processing unit 434 includes, for example, a projection unit for projecting light corresponding to notification to a virtual object or a user, and a transparent half-mirror for imaging and displaying the projected light in front of the eye. In this case, the display plane 11 of FIG. 1 corresponds to the half mirror. Thus, the user U1 can visually recognize both images of the imaged virtual object, etc. as if floating in real space, together with the real body with the field of view and eyesight range in front of the eye. In addition, in the case of the video see-through type, the display processing unit 434 has a display device such as a liquid crystal display panel for displaying the image of the real body in front of the eye (including the cut-out individual real body) captured by the camera unit 431 together with the image of the generated virtual object or the like. In this case, the display plane 11 corresponds to a screen such as a liquid crystal display panel. Thus, the user U1 can visually view by overlapping state oftΥa real body and a virtual object, etc. in the viewing range in front of the eye using the HMD 1.

The operation input unit 435 is, for example, an input means by a keyboard, a key button, a touch key, or the like, and allows the user U1 to set and input the information to be input. The operation input unit 435 is provided at a position or a form in which a user U1 can easily perform an input operation in the HMD 1. Alternatively, the operation input unit 435 may be provided in the form of being separated from the main body of the HMD 1 and connected by wire or wirelessly, like a remote controller. The HMD 1 may display a graphical user interface (GUI) such as an input operation screen on the display plane 11 of the display processing unit 434 and capture input operation information according to the position on the input operation screen where the line of sight detected by the left eye gaze detection unit 431 and the right eye gaze detection unit 432 is facing. The HMD 1 may display a pointer on the input operation screen and the user U1 operates the pointer by the operation input unit 435 to acquire the input operation information. The HMD 1 may collect the sound representing the input operation pronounced by the user U1 by the microphone 436 to capture the input operation information.

The microphone 436 collects voice from the outside or user's own voice. The HMD 1 can take in the instruction information by the pronounced voice from the user U1 and execute the operation for the instruction information conveniently. The headphone 437 is mounted on the ears of the user U1 and provide audio signals, such as notification information to the user U1. The vibration generating unit 438 generates vibration by control from the processor 410 and converts the notification information to the user U1 transmitted by Tor the like into vibration. The vibration generating unit 438, for example, by generating a vibration at the head of the user U1 on which the HMD 1 is closely worn, can transmit reliably a notification to the user U1. Examples of the notification information to the user U1 include a notification when an interfering object occurs, a notification to notify a display mode change, a notification of a display mode change method, and a presence notification of shared users which will be described later. By such notification, the usability can be further improved.

The communication unit 439 is a part having a communication interface for performing wireless communication with an information processing terminal such as a neighboring HMD or a smart phone, or an external device such as the information server 120 of FIG. 1, through a short-range wireless communication, a radio LAN, or a base station communication, and includes a communication processing circuit and an antenna corresponding to a predetermined variety of communication interfaces. As the short-range wireless communication, for example, communication using an electronic tag is exemplified, but not limited thereto, it may be any communication by which the HMD 1 is capable of wireless communication with other information processing terminals in the vicinity. Examples of such communication interfaces include radio LAN such as Bluetooth (registered trademark), IrDA (Infrared Data Association: registered trademark), Zigbee (registered trademark), HomeRF (Home Radio Frequency: registered trademark), or Wi-Fi (registered trademark). Further, as the base station communication, long-distance radio communication such as W-CDMA (Wideband Code Division Multiple Access, registered trademark) or GSM (Global System for Mobile Communications) may be used.

The communication unit 439, as a wireless communication means, may be applied other means such as optical communication or acoustic wave communication. In that case, instead of the transmitting and receiving antennas, light emitting/receiving units and sound wave output/sound wave input units are used, respectively. In addition, in the case of handling high-definition images, etc., the amount of data is dramatically large. In this case, the usability can be dramatically improved by using high-speed large-capacity communication networks such as 5G (5th Generation: 5th generation mobile communication system) and local 5G for the radio communication.

[Arrangement Data]

The HMD 1 of the first embodiment may be utilized by acquiring the arrangement data (in other words, spatial data) of the real body of the outside world through communication from an external device such as the information server 120 of FIG. 1. This arrangement data is the data by which the arrangement (including the position and shape, etc.) of the individual real object in the three-dimensional space is known. This arrangement data is, for example, data in a space on a map, including various facilities as individual real objects. Further, the arrangement data may have attribute information and related information (for example, a name and a description of a facility) for each individual real object. In another example, the arrangement data includes individual real objects, such as walls and arranged objects, within a building space. When there is such arrangement data, generally, it is easy to grasp the relation such as overlap between each object in the three-dimensional space. Therefore, in the HMD 1, it becomes easier to judge the boundary of the real body in the viewing range using the arrangement data, and it becomes easier to cut out and recognize the individual real object.

[Configuration Unit]

Each configuration unit realized on the basis of processing by the processor 410 of FIG. 10 includes a virtual object generation processing unit 411, a gaze point detection processing unit 412, a target object target viewing range identification processing unit 413, an interfering object identification processing unit 414, an object category processing unit 415, and an object display mode control processing unit 416.

The virtual object generation processing unit 411 generates a virtual object which is an object in a virtual space different from the real space. The HMD 1 may use the data of the virtual object generated by an external device such as the information server 120 by capturing the data by wireless communication.

The gaze point detection processing unit 412 three-dimensionally calculates and detects the gaze point 106, which is the intersection of line of sight directions of both eyes in FIG. 1 and is the user U1 gaze destination, from the line of sight of the left eye 104 detected by the left eye gaze detection unit 432 and the line of sight of the right eye detected by the right eye gaze detection unit 433.

The target object target viewing range identification processing unit 413 judges a target object which is the object at which the gaze point is located, in other words, the target object closest to the gaze point, and identifies and determines the target viewing range 107 (FIG. 1) that is a range in which the user U1 intends to view the target object.

The interfering object discrimination processing unit 414 discriminates an interfering object which obstructs the target visual recognition range by shielding overlapping with the target visual recognition range of the target object in the depth direction as viewed from the user U1.

The object category processing unit 415 classifies the objects into predetermined categories (in other words, types) according to limits or tolerances for changing the display mode of the objects. The HMD 1 decides the method of changing the display mode and the detailed content according to the category of the object. The number and details of categories are not limited.

The object display mode control processing unit 416 performs control processing for changing the display mode of an object in a shield-interference relation. The display mode change is at least one of movement of a display position, adjustment of permeability rate, size change (reduction/enlargement), replicated object display, and the like. When the interfering object determined by the interfering object determination processing unit 414 shields at least a portion of the target visual recognition range of the target object identified by the target object target visual recognition range identification processing unit 413, the HMD 1 performs control of the display mode change of the object which is in the shield-interference relation by the object display mode control processing unit 416. The object display mode control processing unit 416 changes the display mode of at least one of the interfering object or the target object so as to eliminate or reduce the interfering of the target object caused by the interfering object. The object display mode control processing unit 416 determines the object to be changed, the display mode change method, and the like in consideration of the category of the previous and subsequent objects which are in the shield-interference relation.

The object display mode control processing unit 416, for example, when the interfering object is a virtual object (the second pattern/the fourth pattern in FIG. 2) and the interfering object has a lower degree of limitation than the target object, performs display position change or permeability rate up-adjustment or the like of the interfering object so as to eliminate or reduce the interfering of the target object by the interfering object. In addition, when the target object to be obstructed is a virtual object (the third pattern/the fourth pattern) and the target object has a lower degree of limitation than the interfering object, the object display mode control processing unit 416 changes the display position of the target object or the like so as to eliminate or reduce the interfering of the target object by the interfering object. These can eliminate or reduce the degree of visibility interfering of the target object's target viewing range by the interfering object.

[Details]

Figure 11A:
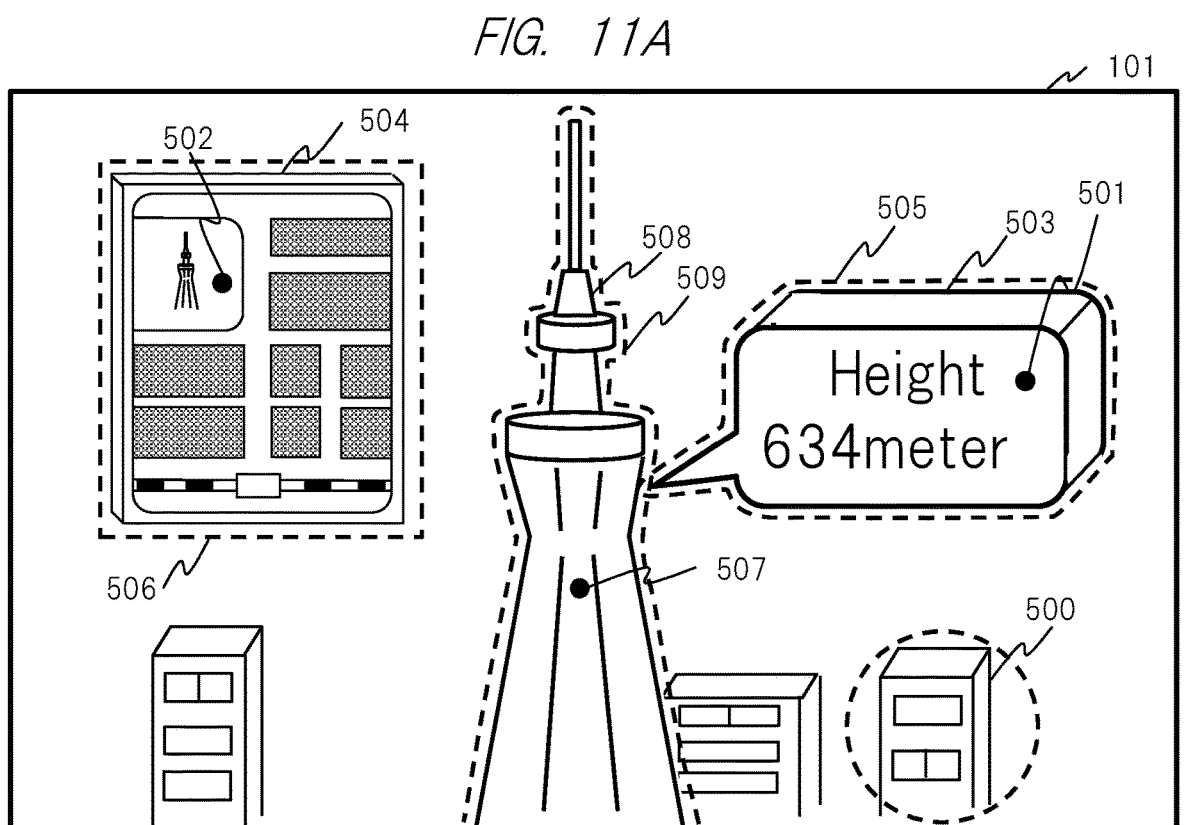
FIGS. 11A-11B show a display example in the first embodiment.
Figure 11B:
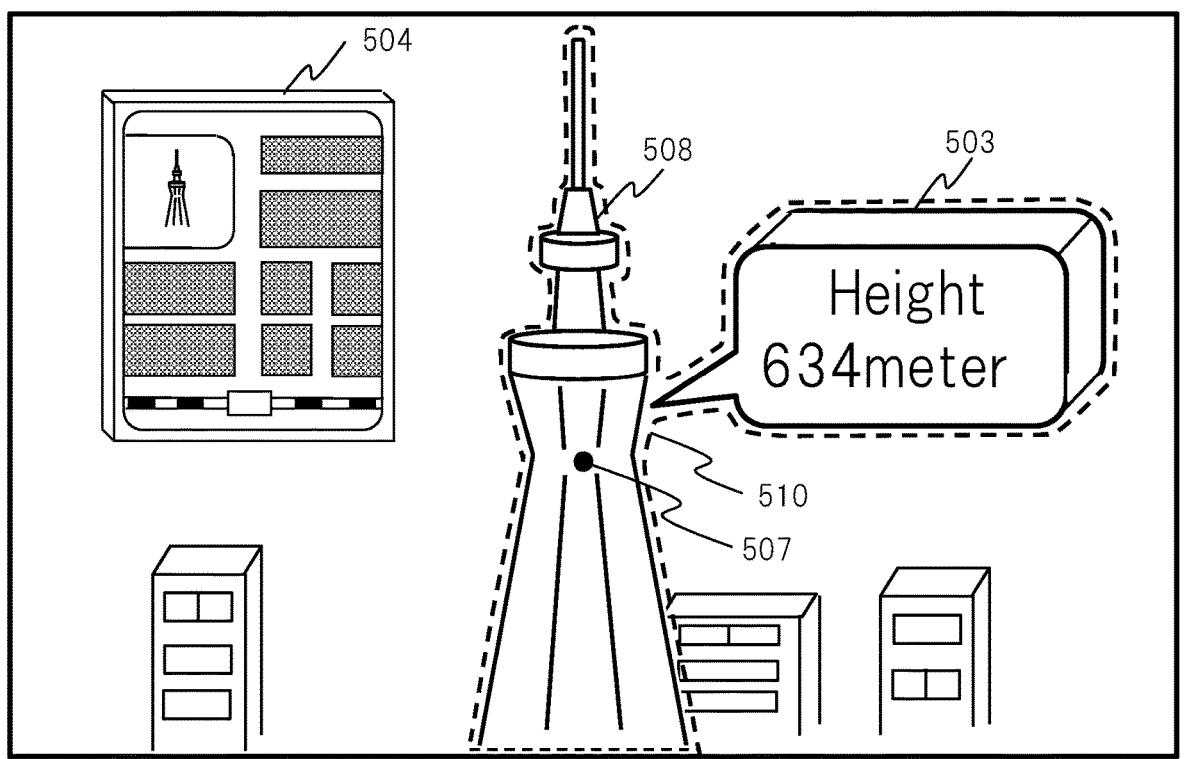

Details of the processing and display in the first embodiment will be described with reference to FIGS. 11A-11B and later. FIGS. 11A-11B show an example of a display of the HMD 1 in the viewing range 101 and a schematic example of an individual real object, a virtual object, and a target viewing range. In FIG. 11A, there is a landscape in which a user U1 views, for example, from a high place as a real body, and towers 508, buildings 500, and the like are included therein. The HMD 1 recognizes, for example, towers 508 or the like as individual real objects from the landscape. For the video see-through type, the HMD 1 cuts out a portion of the tower 508 as an individual real object from the view of the landscape. For the optical see-through type, the HMD 1 recognizes from the landscape a part of the towers 508 as an individual real object. The aforementioned placement data may be utilized for recognition of the tower 508 or the like.

The HMD 1, for example, focuses on a tower 508, which is an individual real object, generates an interpretive panel 503 and a guide map 504 as an exemplary virtual object associated with the tower 508 and displays it as shown to be superimposed on a landscape including the tower 508. The interpretive panel 503 is a virtual object which displays explanatory information (e.g., height 634m) about the towers 508 as, for example, a blow-out-shaped panel. The interpretive panel 503 is disposed on the right side so that the starting point of the blowout is in contact with the tower 508. Guide map 504 is a virtual object which guides the position of the tower 508 on the map. A guide map 504 is located at the top left within the viewing range 101.

The gaze points 501, 502, 507 are exemplary gaze points of the user U1 with respect to the landscape. Gaze point 507 is the case of gazing at tower 508, which is an individual real object. The HMD 1 may display the interpretive panel 503 or the like, which is a virtual object, in response to gaze to the towers 508. When the gaze point is located at a real body such as the tower 508 as the gaze point 507, the HMD 1 cuts out or recognizes a part of the tower 508 which is the real body from the landscape as an individual real object based on analysis and arrangement data. Then, the HMD 1 determines the display range indicated by a broken line of the individual real object which is the tower 508 as the target visual recognition range 509.

The gaze point 501 is the case of gazing the interpretive panel 503, and the gaze point 502 is the case of gazing the guide map 504. The HMD 1 sets the target viewing range of the target object as the target object of the object in which the viewing point of the user U1 is located. The HMD 1 determines the display area of the virtual object (the corresponding image area) as the target viewing range when the gaze point is located in the virtual object. For example, if there is the gaze point 501 in the interpretive panel 503, the display range indicated by a broken line in the interpretive panel 503 is the target viewing range 505. If there is the gaze point 502 in the guide map 504, the display range indicated by a broken line of the guide map 504 is the target viewing range 506.

In this example, each target viewing range indicated by a broken line is the same range according to the shape and area of the object on the display, but it is possible not limited thereto. The target viewing range may be a larger range than the object or a smaller range than the object. The target viewing range may be a predetermined size and shape (e.g., rectangular or elliptical). For example, the target viewing range 511, when the building 500 is a target object, shows a case of setting an ellipse that roughly encompasses the building 500 as a target viewing range.

FIG. 11B shows another setting example of the target viewing range. The HMD 1 may control the objects (virtual objects or individual real object) associated with the object (virtual objects or individual real object) at which the gaze point is located to be included together in one target viewing range. In this example, for an individual real object, the tower 508 in which gaze point 507 is located, the interpretive panel 503 is an associated virtual object which is preferably displayed with tower 508. In this instance, the HMD 1 sets a display range, indicated by the broken lines shown in the figure, which combines the target viewing range 509 of the tower 508 in (A) with the target viewing range 505 of the interpretive panel 503 in one, as one target viewing range 510 for two associated objects (508,503).

Figure 12:
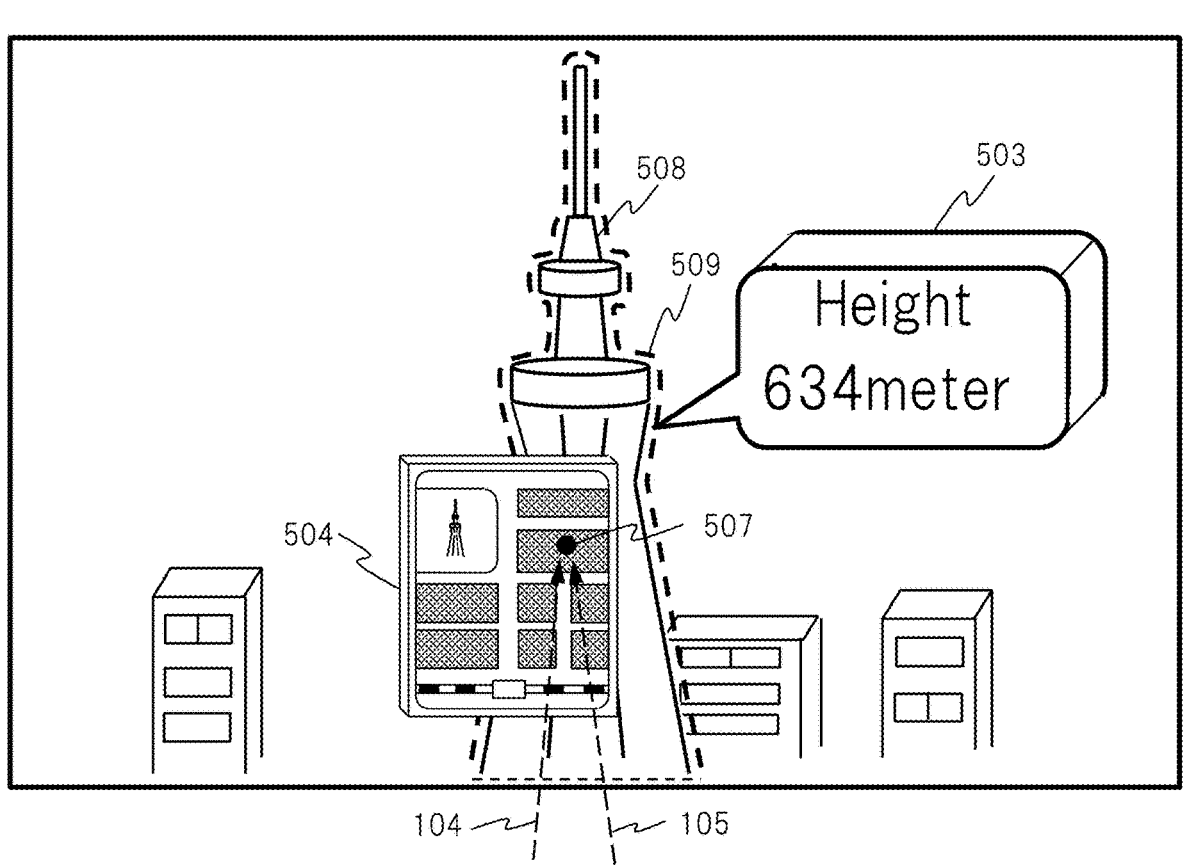
FIG. 12 shows a display example in the first embodiment.

FIG. 12 shows another display example. Of the objects (virtual object and individual real object) overlapping in the line of sight direction of the user U1, the relation between the position of the object in the depth direction of the gaze point and the position of the object is not clear, and the target object (object close to the gaze point, etc.) in which the gaze point is located may be difficult to determine or impossible to determine. In the example of FIG. 12, with respect to the gaze direction corresponding to the gaze point 507, the individual real object which is the tower 508 overlaps with the virtual object which is the guide map 504, and the guide map 504 shields a part of the tower 508. For example, in the depth direction of the gaze point 507, it is assumed that there is a gaze point 507 in the vicinity of the middle between the position of the tower 508 and the position of the guide map 504. For this reason, assume that the HMD 1 cannot determine which object is the target object. In this situation, the HMD 1 selects and determines the target object based on the viewing value (in other words, the importance) of the object to the user U1. For example, the HMD 1 compares a plurality of objects (508, 504) and decides the priority order in a view point of the viewing value and importance, determines the object having the highest priority as the target object, and sets the display range of the target object as the target viewing range.

In this example, an individual real object takes precedence over a virtual object as a criterion for determining prioritization based on the viewing value. It is also compared between individual real objects by applying the general viewing value (e.g., the prominence of facilities on a map). Consequently, in this example, the HMD 1 judges that the priority of the tower 508 is higher than the guide map 504, determines the individual real object which is the tower 508 to be the target object, and sets the target viewing range 509. Thereby, it is possible to optimally select and determine the target viewing range of the target object that the user U1 wants to view.

Incidentally, in FIG. 1 or the like, the gaze point 106 is the information shown for explanation, not actually displayed on the display plane 11. As a modification, the HMD 1, in accordance with the position of the gaze point 106, may display an image such as a mark representing the gaze point on the display plane 11. The image, such as the gaze point mark, may be a separate image from the manipulation pointer or may be an image having the same function. The pointer is, for example, information for positioning by OS or applications. The selection of the target object may use an image, such as a gaze point mark, or a pointer.

[Category of Object]

In the first embodiment, the objects are classified into three categories as attributes of the object used for controlling the display mode change. (C) in FIG. 2 shows three categories. The first category is an object which has the highest degree of limitation on the display mode change, and has a discomfort due to the display mode change, or an individual real object. Objects which may cause discomfort due to display form changes include, for example, those in which a virtual object is fixed to a real body, or those in which a virtual object is integrated and modified by incorporating a virtual object into a real body. Further, in the case of the optical see-through type, the real body or the individual real object is considered to be the first category because it is difficult to change the display mode. An example in which a virtual object is fixed or integrated in an individual real object is a case in which, in an AR (extended reality) or video game, a hole is fixed or integrated in a part of a real wall (corresponding individual real object) as a virtual object. Since this wall and hole should be treated as one body without separation, they are united as related objects, and are regarded as the first category with the highest degree of limitation.

The second category is an object which is constrained to some extent with respect to the display mode change, but has a lower degree of limitation and higher tolerance than the first category. The second category is a virtual object such as the interpretive panel 503 (FIGS. 11A-11B) which is displayed in relation to a virtual object of the first category or an individual real object.

The third category is an object with a lower limitation and higher tolerance than the second category, in other words the object with the lowest limitation among the three. The third category includes a virtual object such as the guide map 504 (FIGS. 11A-11B) or the like, for example, with no or low limitation on the relation such as display position with respect to a real body or other virtual object. The third category is an independent virtual object, or an object such as an object which can be moved to a viewable position in which the user U1 can view the object to which the user U1 wants to view.

In the example of (A) in FIGS. 11A-11B, the tower 508, which is an individual real object, is the first category. The interpretive panel 503, which is a virtual object, is a second category because it describes the tower 508 and there is a constraint on the display position to some extent that display to a position close to the tower 508 is appropriate. The guide map 504, which is a virtual object, is a third category because it is an object which is not unnatural to move.

The HMD 1 may perform the display mode change processing according to the category classification of the objects in the object category processing unit 415. The HMD 1 compares the categories of target objects and the categories of interfering objects in the objects involved in the shield-interference relation according to the degree of limitation on the display mode change. The HMD 1 determines an object as a target to be changed, and a method and details of changing a display mode based on the comparison result.

For example, the object display mode control processing unit 416 changes the display mode of the interfering object when the target object is in the category in which the degree of limitation is not lower than that of the interfering object (i.e., the same or higher). On the other hand, the object display mode control processing unit 416 changes the display mode of the target object when the target object is in the category in which the degree of limitation is lower than that of the interfering object. These allow the HMD 1 to resolve or mitigate the interfering of the target viewing range of the target object in an optimal manner depending on the degree of limitation for each object. In addition, the HMD 1 can minimize visual discomfort associated with changing the display mode for both the target object and the interfering object.

In the above-described method and criteria, when the degree of limitation is the same between the target object and the interfering object, the display mode of the interfering object is changed. In other method and criteria, when the degree of limitation is the same between the target object and the interfering object, the display mode of the target object may be changed. This provides a way of prioritizing the maintenance of the display mode of the front side interfering object which is close in view from the user U1.

[First Pattern]

Here, a processing example when the real body shields the real body (the first pattern in FIG. 2) will be described. The HMD 1 is first treated as being unshielded if there is no visual information of the part of the rear side real body being shielded. In this case, since the shield-interference relation does not exist, there does not occur display mode change. In the flow of FIG. 9, as an exceptional treatment, it is treated as being no-shielding (N) in the step S3. Further, the HMD 1, when there is the appearance information of the part of the rear side real body being shielded, for example, when the appearance information is obtained from the aforementioned arrangement data, is treated as there is shielding. In the flowchart of FIG. 9, the step S3 is treated as having a shield (Y). That is, the HMD 1 sets the individual real object corresponding to the portion of the real body on the rear as the target object. In this instance, as a display mode change, the HMD 1 creates a replicate object in which the appearance of the individual real object which is the target object is replicated, for example, as in FIG. 8, and displays the replicated object at an empty position. This allows the user U1 to view the portion of the object being shielded by viewing the replicated object.

When prioritizing the display of the target object being shielded, the HMD 1 may use a system in which the replicated object is displayed as it is in the shielded position. In this system, the replicated object is displayed on the front side of the real body which is the interfering object. This is similar to the method used to increase and adjust the permeability rate of the interfering object which is shielding (FIGS. 3A-3B).

On the other hand, when the HMD 1 prioritizes the maintenance of the display of the interfering object near the user U1, it is not possible to move the individual real object which is the target object of the rear side, so that a method (FIG. 8) is used to display the replicated object at another empty position.

In any case, when the real body is displayed as a video image in the video see-through type, the HMD 1 may change the display mode of the individual real object by processing the individual real object cut out from the video image and treating it as a virtual object.

[Operation Example (1)]

Figure 13:
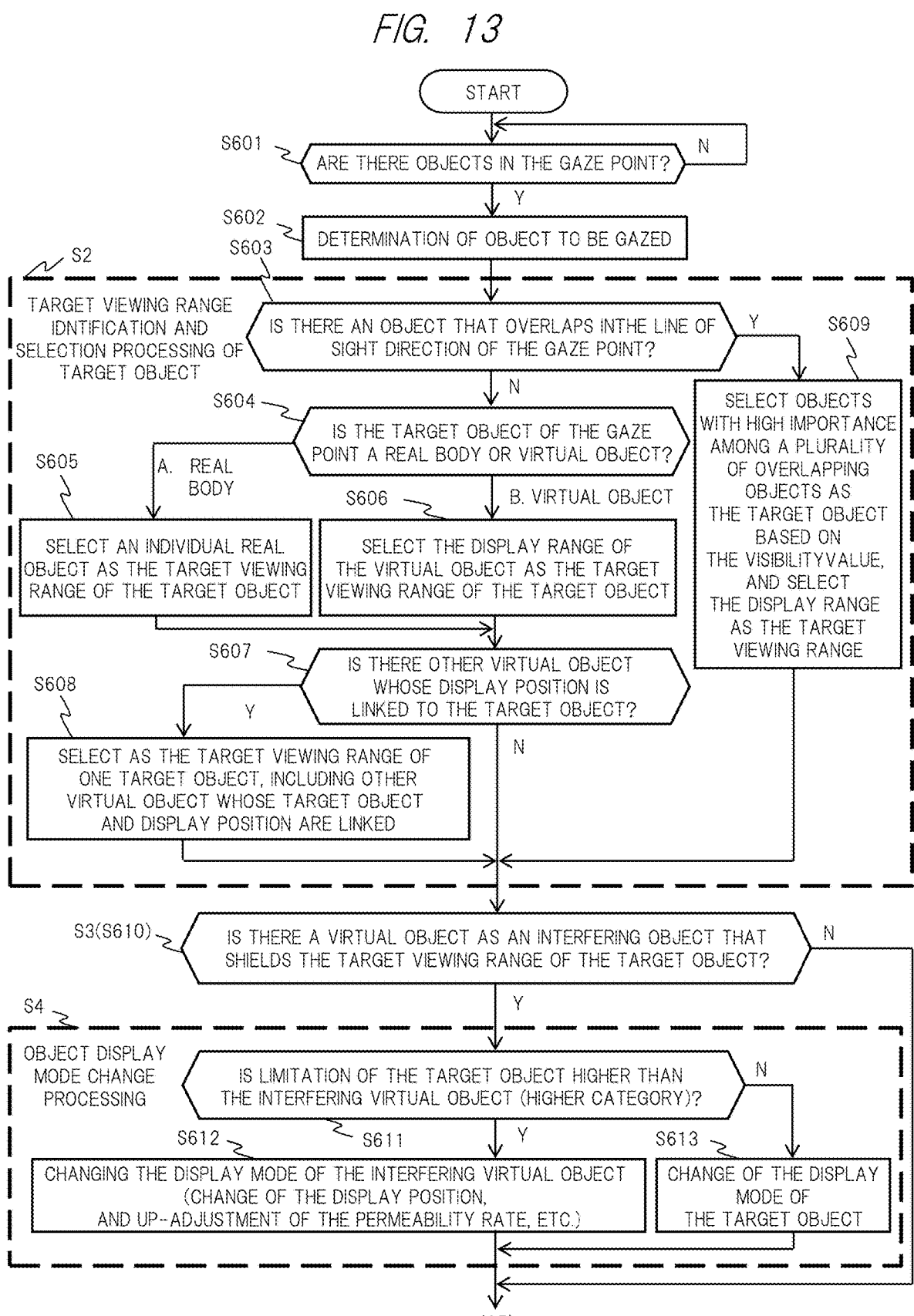
FIG. 13 shows the processing flow of the operation example in the first embodiment.

Referring to FIG. 13 and the like, an exemplary operation of the HMD 1 of the first embodiment will be described. FIG. 13 shows a processing flow for the operation example of FIGS. 11A-11B and the like. FIG. 13 is a more detailed process sample with respect to FIG. 9, and has steps S601 to S613. FIG. 13 shows a detailed view of the steps S2, S4 of FIG. 9, in particular. In the step S601, the HMD 1 detects the gaze point of the user U1 by the caution point detection processing unit 412 and determines whether there is real body located at the gaze point. If there is an object within a predetermined distance range is decided (Y), in the step S602, the HMD 1 determines the object as the target object.

Next, a target visual recognition range selection process of the target object is performed by the target object viewing recognition range identification processing unit 413 in the step S2. This process consists of steps S603 to S609. In the step S603, the HMD 1 judges whether or not there is an object which overlaps the line of sight of the gaze point, and moves to the step S604 if there is no overlapped object (N), and to the step S609 if there is an overlapped object (Y). At the step S604, the HMD 1 considers an object which overlaps the line of sight of the gaze point as a target object, and discriminates whether the target object to be gazed is a real body (the corresponding individual real object) or a virtual object. If the target object is a real body (A), it moves to the step S605; if the target object is a virtual object (B), it moves to the step S606.

In the step S605, the HMD 1 identifies and selects the individual real object which is cut out or recognized individually from a real body as the target viewing range of the target object. In the step S606, the HMD 1 identifies and selects the display area of the virtual object as the target viewing range of the target object.

Here, at the step S607, the HMD 1 determines whether there is an object associated with a target object which is a real body (S605) or a virtual object (S606). The related object is a virtual object or the like whose display position is to be coordinated as described above. If there is a related object (Y), at the step S608, the HMD 1 identifies and selects as the target viewing range of one target object, including the target object and the related object (FIG. 11B).

On the other hand, in the step S609, the HMD 1 selects one object at a predetermined criterion among the plurality of objects which overlap in the line of sight of the gaze point as the target object, and identifies and selects the target viewing range of the target object. At this time, in the first embodiment, the above-described viewing value and importance degree are used. The HMD 1 identifies and selects the object with the highest viewing value and importance among the plurality of overlapping objects as the target object and the display range of the target object as the target viewing range. As a consequence of the above-mentioned step S2, the target viewing range of the target object is determined.

Thereafter, in the step S3, the HMD 1 determines whether or not there is a virtual object (sometimes referred to as "obstructed virtual object") as an interfering object which shields the target viewing range of the target object by the interfering object determination processing unit 414. If there is an interfering virtual object (Y), go to the step S4; if there is no interfering virtual object (N), skip the step S4. In the first embodiment, the HMD 1 proceeds to the step S4 as a disturbing virtual object if there is a virtual object shielding at least a portion of the target viewing range.

The step S4 has steps S611 to S613. In the step S611, the HMD 1 discriminates whether the target object is more limited than the interfering virtual object, that is, whether the target object is higher in category than the interfering virtual object, by the object category processing unit 415. For example, if the target object is in the first category and the disturbing virtual object is in the second category, the former is higher. If the target object is a category higher than the interfering virtual object (Y), go to the step S612, if the otherwise case (N), go to the step S613. In the step S612, the HMD 1 performs the above-described display position movement or permeability rate adjustment or the like as the display mode change of the interfering virtual object by the object display mode control processing unit 416. In the step S613, the HMD 1 performs the display position move or the like as the display mode change of the target object by the object display mode control processing unit 416. These allow the full picture of the target viewing range to be visible. After that, it leads to the aforementioned step S5.

[Operation Example (2)]

FIG. 14 shows an operation example in the case of the second pattern. In the pre-change state of (a), as a shield-interference relation, the target object is the tower 508 which is an individual real object of the first category, and the interfering object is the guide map 504 which is a virtual object of the third category. The target viewing range 509 of the tower 508 where the gaze point 507 is located is partially shielded by the guide map 504. In this instance, the HMD 1 makes as an object for a change, the guide map 504 of which the degree of limitation is low and the category is low, and performs, for example, permeability rate up-adjustment. Thus, in the state after the change of (b), the guide map 504 becomes transparent, the full picture of the target viewing range 509 of the tower 508 being a target object becomes to a visible state.

Figure 15:
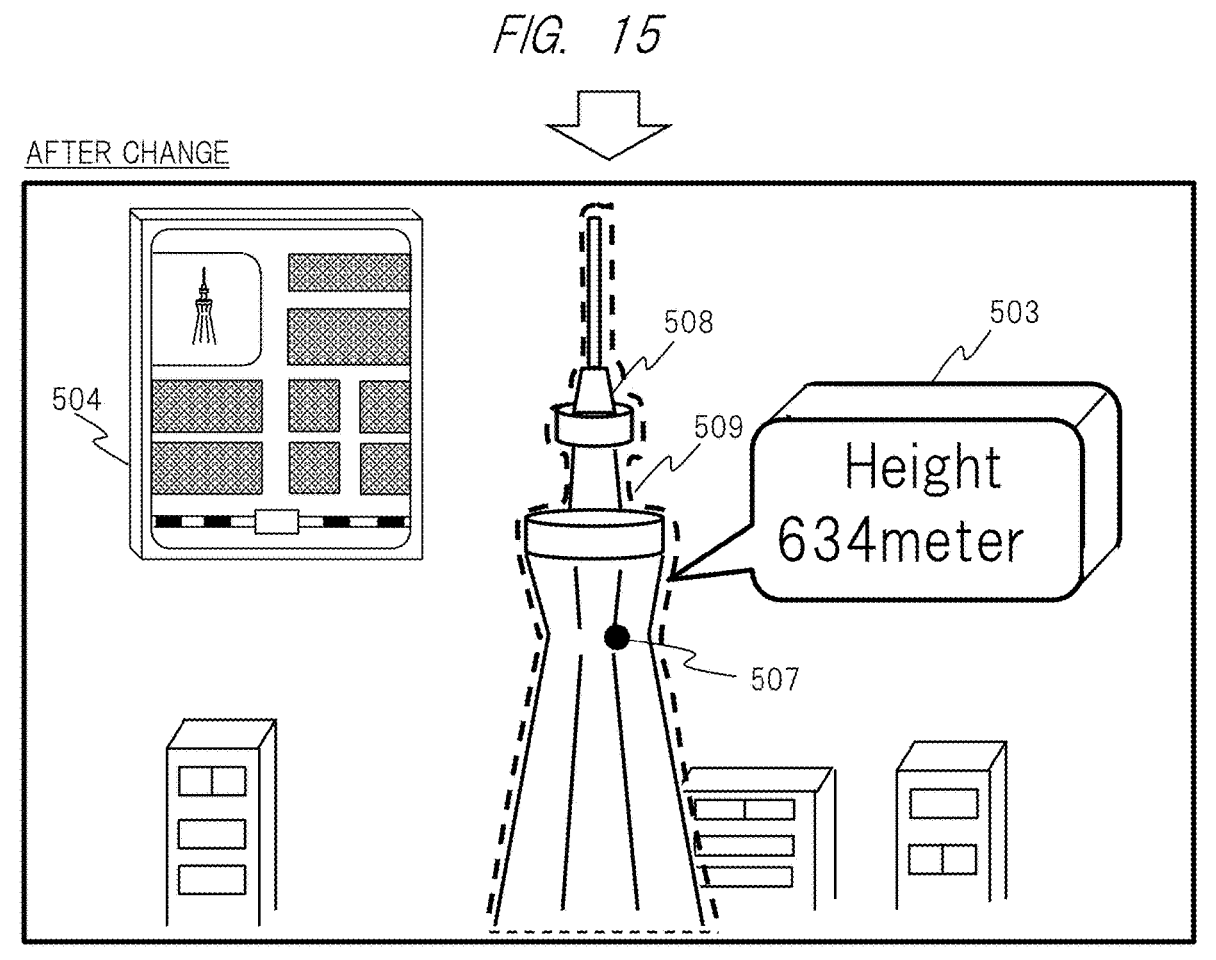

FIG. 15 shows, as another operation example, the case of the display position movement as a display mode change. In the same manner as (a) in FIG. 14, the HMD 1 moves the display position of the guide map 504 of which the category is low, toward a position outside the target viewing range 509 of the tower 508. This results in a state in which the full picture of the target viewing range 509 of the tower 508 being the target object, is visible without any shielding.

[Operation Example (3)]

FIG. 16 shows an operation example in the case of the third pattern. FIG. 16 is the opposite case of FIG. 14 and the like, where the target object is the guide map 504 which is a virtual object of the third category, and the interfering object is the tower 508 which is an individual real object of the first category. In (a), the target viewing range 506 of the guide map 504 having the point of view 502 is partially shielded by the tower 508. In this instance, the HMD 1 moves the guide map 504 of which the category is low, toward to a position outside the tower 508 so that the tower 508 does not overlap within the target viewing range 506 as shown in (b). This results in a state in which the full picture of the target viewing range 506 of the guide map 504 which is the target object is visually recognizable in a state in which there is no shielding at all.

[Operation Example (4)]

FIG. 17 shows an operation example in the case of the fourth pattern. The target object is a interpretive panel 503, which is a virtual object of the second category, and the interfering object is a guide map 504, which is a virtual object of the third category. In (a), the target viewing range 505 of the interpretive panel 503 is partially shielded by the guide map 504. In this instance, the HMD 1 performs the permeability rate up-adjustment of the guide map 504 of which the category is a lower order, as shown in (b). This makes the guide map 504 transparent, so that the full picture of the target viewing range 505 of the interpretive panel 503, which is the target object, is visible.

Figure 18:
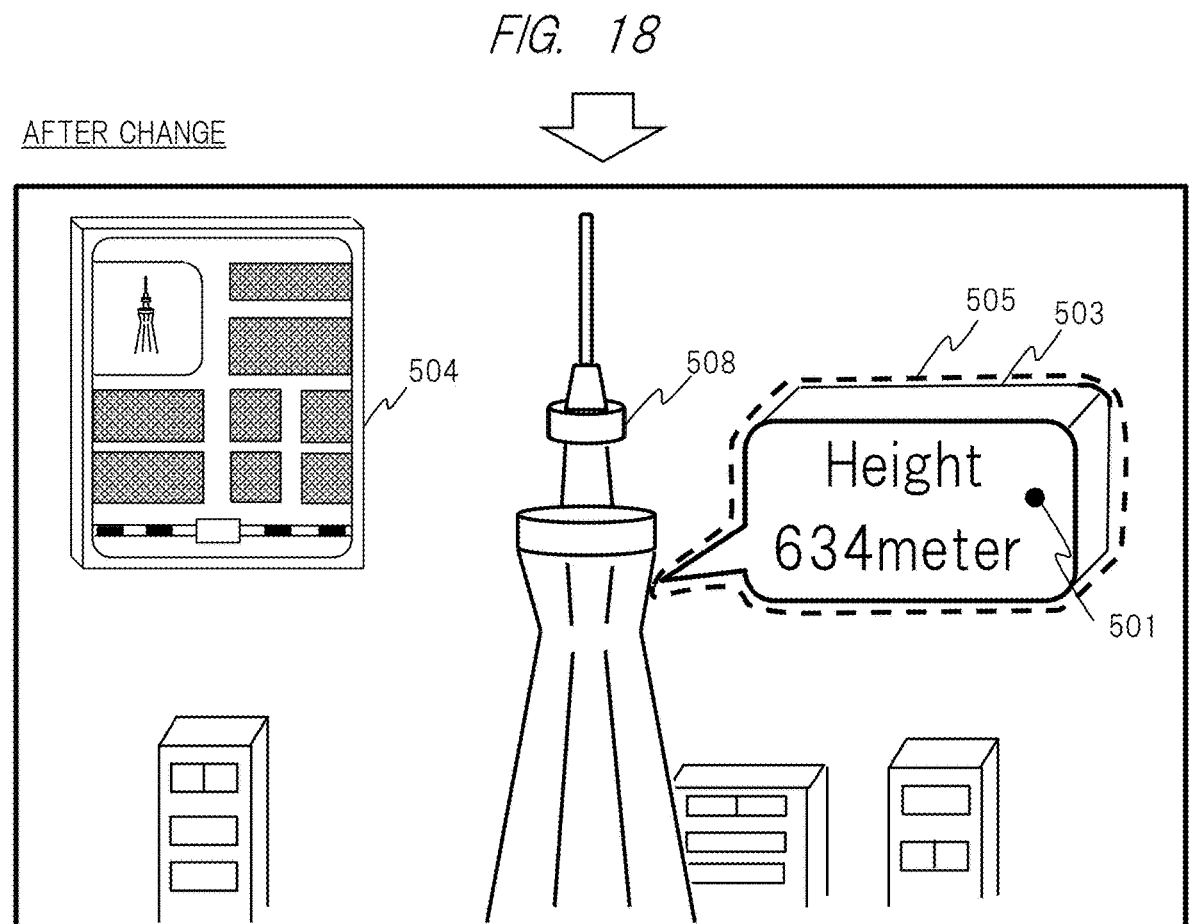
FIG. 18 shows a display example in the first embodiment.

FIG. 18 shows the case of the display position movement as another operation example. The HMD 1, when the same as (a) in FIG. 17, moves the display position of the guide map 504 of which the category is lower to a position outside the target viewing range 505. This results in a state in which the full picture of the target viewing range 505 of the interpretive panel 503 being the target object is visible without any shielding.

[Operation Example (5)]

FIG. 19 shows another example of operation. FIG. 19 is the opposite case of FIG. 17 where the target object is the guide map 504 which is a virtual object of the third category, and the interfering object is the interpretive panel 503 being a virtual object of the second category. In (a), the target viewing range 506 of the guide map 504 is partially shielded by the interpretive panel 503. In this instance, the guide map 504 of which the category is low order is moved to change to a position where the interpretive panels 503 and other objects do not overlap in the target viewing range 506. This results in a state in which the full picture of the target viewing range 506 of the guide map 504 which is the target object is visually recognizable in a state in which there is no shielding at all.

If the target object is the first category and the interfering object is the second category, the same control as if the target object is the first category and the interfering object is the third category can be applied.

[Effect, etc. (1)]

As described above, according to the first embodiment, in the HMD 1 by which the virtual object having the three-dimensional arrangement can be displayed, when there is a visual interference caused by shielding or the like by another object with respect to the visual recognition range of the object such as the real body or the virtual object which the user U1 wants to view, the display mode change can eliminate or reduce the visual interference, and the user U1 can suitably visually recognize the full picture of the object. And, such function can be realized with ease of use and less labor of the user. According to the first embodiment, even when there is a shield-interference relation between the objects, the user can suitably visually recognize the full picture of the target viewing range of the target object desired to be gazed. According to the first embodiment, since the user's visual recognition can be supported by automatically changing the display mode in accordance with the shield-interference relation, it is possible to realize such functions with ease of use and less labor of the user.

Incidentally, in the Patent Document 1, when there is an object which interferes with the viewing of the background with respect to the line of sight direction, the display mode of the object is changed. In contrast, the first embodiment changes the display mode for the interfering object or the target object so that the full picture of the target viewing range is visible when there is an interfering object which interferes with the visibility of the target viewing range of the target object in the shield-interference relation between the objects arranged in three dimensions.

[Modification]

Following one is also possible as a modification of the first embodiment. In judging the target object based on the line of sight, the HMD 1 may judge that there is a target object which the user U1 wants to gaze at if the movement of the line of sight is less than or equal to a predetermined threshold. This allows the target object to be more accurately identified, eliminating mishandling due to unintended rapid eye movement. Mishandlings include accidentally making the object as the target object when the gaze point is positioned on the object for a short time.

In addition, the HMD 1 may judge the size and area of the image area of the object when setting the target viewing range and set the upper limit. When the target viewing range is larger or wider than a predetermined threshold value, the HMD 1 may set the upper limit range corresponding to the predetermined threshold value, as the target viewing range. For example, when the target object is too large in the viewing range, it is difficult to display the interfering object outside the target viewing range as a display mode change. In such a case, the upper limit setting of the target visual recognition range is effective.

Second Embodiment

Referring to FIG. 20 and the like, a description will be given of a second embodiment. The second embodiment has the following additional functions for the first embodiment. In the viewing range, there may be cases where the candidate object of the target object (which may be described as a target candidate object) is shielded by a virtual object or an individual real object which is another object and the existence is not known by the user. This function can confirm the existence of the target candidate object in such a case.

[Existence Confirmation of Target Candidate Object (1)]

FIG. 20 is an explanatory diagram of an operation example of the second embodiment. In FIG. 20, an example of a display mode change when an object (target candidate object) is shielded by a real body is shown. (a) shows the state before the change. In the viewing range 101, a tower 508 which is an individual real object and an interpretive panel 1213 which is a virtual object are displayed. Further, as an object located in the direction of the gaze point 1201, there are a tower 508, and a guide map 1202 (indicated by a dotted line) which is a virtual object hidden and invisible by being shielded by the tower 508. That is, there is a guide map 1202 as an invisible target candidate object. In this instance, the HMD 1 changes the display mode regarding the object (508,1202) in the line of sight as shown in (b). In the present example, the HMD 1 moves the displayed position of the guide map 1202 such that at least a portion of the guide map 1202, which is a target candidate object, is visible by being off-shield by the towers 508. In (b), the changed guide map 1203 is in a state in which at least a portion is visible to the user U1. The HMD 1 may be changed to a state in which all of the displayed areas corresponding to target candidate objects are visible. In addition, the HMD 1 may be such that a part of a predetermined ratio of the display area corresponding to the target candidate object is visible. Thus, the user U1 can recognize and confirm the presence of the guide maps 1202. Thus, the user U1 can select the guide map 1202 as a target object by using the gaze point (1201b of the gaze point after moving).

Figure 21:
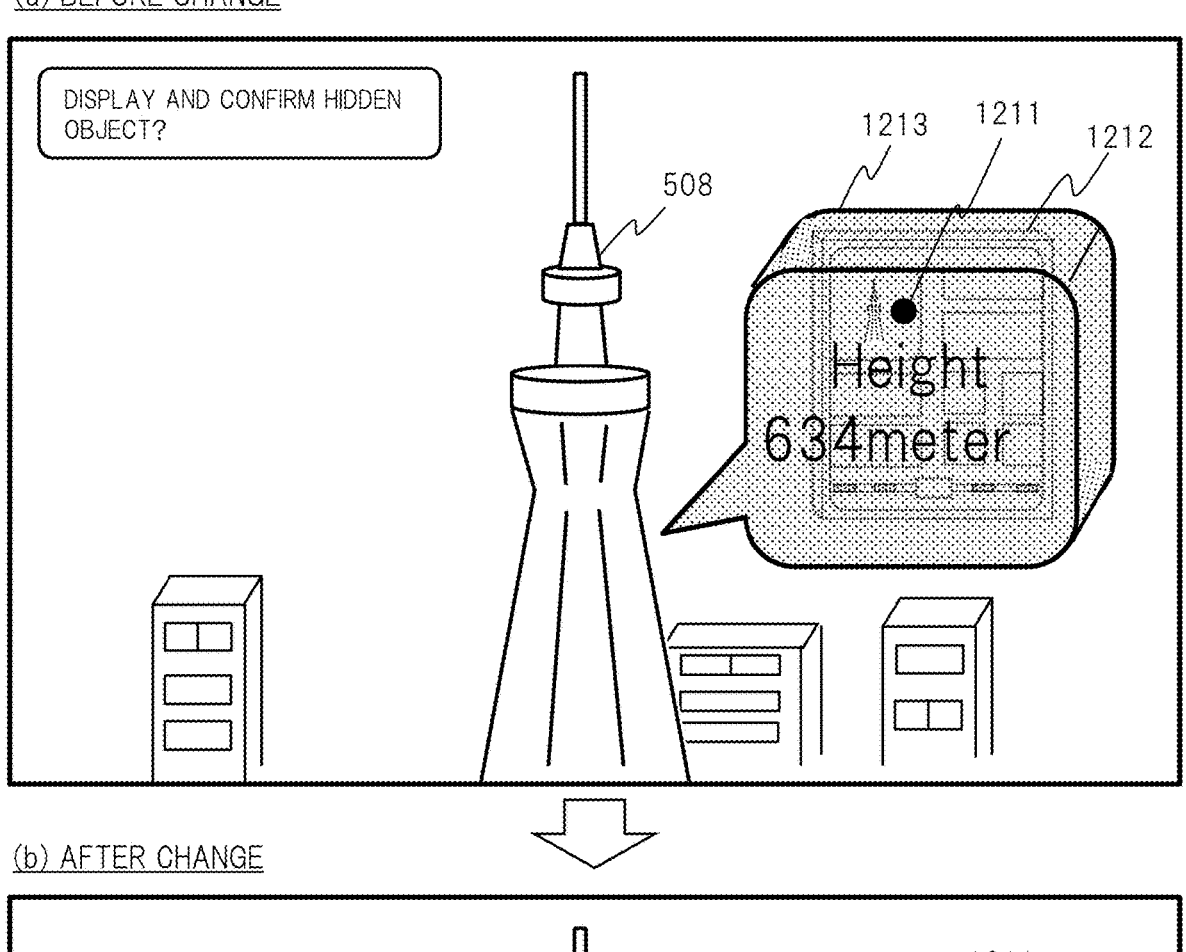
FIG. 21 shows a display example in the second embodiment.

FIG. 21 shows another display example. In a state before the change of (a), as an object located in the direction of the gaze point 1211, there are an interpretive panel 1213 which is a virtual object related to the tower 508 and a guide map 1212 which is a virtual object hidden and invisible by being shielded by the explanation panel 1213. That is, as an invisible target candidate object, there is a guide map 1212. In this instance, the HMD 1 changes display mode relating to the objects 1212, 1213 in the direction of line of sight. In the present example, as shown in (b), the HMD 1 changes the display mode of the front side of the interpretive panel 1213 shielding the guide map 1212 which is a target candidate object, for example, performs permeability rate up-adjustment. This results in a state in which the interpretive panel 1213 becomes transparent and the guide map 1212 behind the interpretive panel 1213 becomes visible. Thus, the user U1 can confirm the presence of the guide map 1212 which is the target candidate object and can select as the target object using the gaze point 1211.

Figure 22:
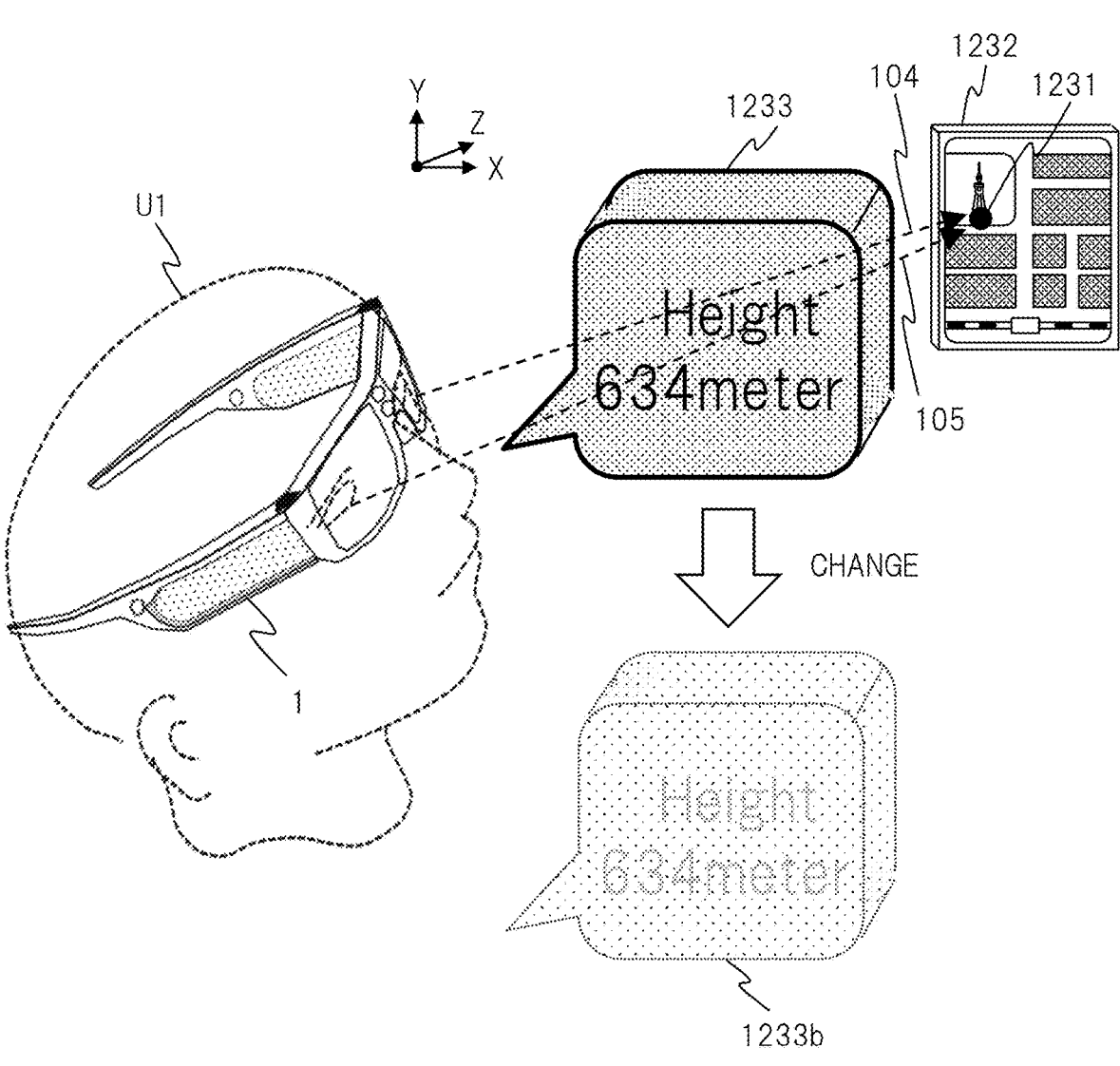
FIG. 22 shows a supplemental explanatory view in the second embodiment.

FIG. 22 is a supplementary explanatory view illustrating a case where it is difficult to judge a target object in which a plurality of objects overlap and a gaze point is located to be determined in a gaze direction as in an example of FIG. 21 or the like. FIG. 22 schematically shows the overlap of the objects in the depth direction (Z direction) where the viewing range 101 is viewed from the user U1. An interpretive panel 1233 is arranged close to the front from the viewpoint of the user U1, and a guide map 1232 is arranged on the rear side. The guide map 1232 corresponds to the guide map 1212 which is a target candidate object in FIG. 21. The interpretive panel 1233 corresponds to an interfering object in a shield-interference relation. In FIG. 22, the guide map 1212, which is a target candidate object in which the gaze point 1231 is located, is shielded by the explanation panel 1233, which is an out of focus interfering virtual object, and is not visible from the user U1 as in FIG. 21. An object which is out of focus is an object which does not have a gaze point and an object which is far from the gaze point.

The gaze point 1231 is an example of a gaze point calculated from the lines of sight (104, 105) of both eyes. In this example, in the depth direction (Z direction), the gaze point 1231 is located near the guide map 1232. As the distance from the gaze point 1231 to the object, the distance to the guide map 1232 is smallest, and within a predetermined distance range. Therefore, the guide map 1232 becomes a target candidate object.

The HMD 1 then detects that the interpretive panel 1233 is out of focus, depending on the orientation and gaze point of the line of sight. The HMD 1 performs, for example, permeability rate up-adjustment as a display mode change toward the out of focus interpretive panel 1233 in order to confirm the presence of the target candidate object (similar to FIG. 21). Thus, the changed interpretive panel 1233b becomes transparent (high permeability rate state) so that the guide map 1232 behind it can be viewed, and the user U1 can confirm the presence of the guide map 1233 which is a target candidate object.

[Existence Confirmation of Target Candidate Objects (2)]

Figure 23:
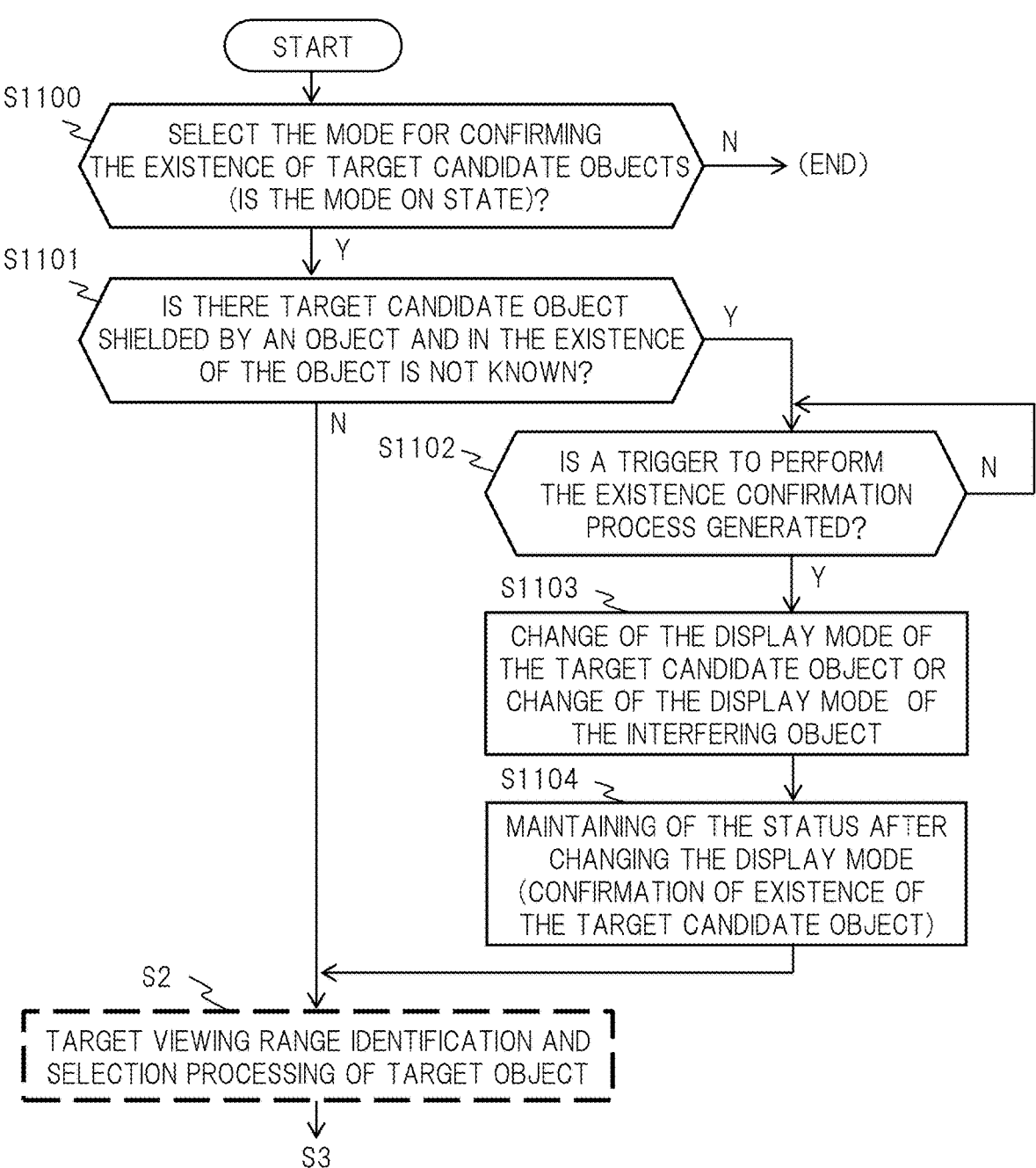
FIG. 23 shows the processing flow of the operation example in the second embodiment.

FIG. 23 shows a process flowchart according to the function of confirming the presence of the target candidate object of the HMD 1 according to the second embodiment. The flow of FIG. 23 has steps S1100 to S1104 as a different part of the previously described flow. This part is done as a pre-process for the step S2 of FIG. 9.

In the step S1100, the HMD 1 confirms whether the mode corresponding to this function is on (enable) state, and if it is the on state, it performs subsequent processes. For example, the user U1 can set or instruct through the operation input unit 435.

At a step S1101, the HMD 1 judges whether there is a target candidate object which is an object which is shielded by an object (virtual object or individual real object) in the entire display plane 11 and is in a state where the existence is not known from the user U1. This target candidate object is an object which cannot be recognized because it is not visible from the user U1 and cannot be selected by the gaze point. If there is such a target candidate object (Y), it moves to the step S1102; otherwise, if not, it moves to the step S2.

In the step S1102, the HMD 1 confirms and waits for a trigger to perform the presence confirmation process. This trigger is a trigger that the user U1 can instruct whether or not to perform the presence confirmation process. The trigger may be, for example, when an instruction input is received through an operation input section 435 or a microphone 436, or when a line of sight of the detected user U1 is gone near the target candidate object. For example, as shown in FIG. 20, the HMD 1 may display a guide or a button or the like such as "There are hidden objects. Do you want to display and confirm?" in the viewing range 101, and may use a button press down or the like as a trigger. In addition, the step S1102 of the trigger input can be omitted, and the presence confirmation of the object can be automatically performed.

If the above-described trigger is generated, in the step S1103, the HMD 1 performs the change of the display mode of the target candidate object (such as the display position moving or the replicated display) or the change of the display mode of the shielding interfering object (such as adjusting permeability rate) by the object display mode control unit 416. In the step S1104, the HMD 1 maintains the status after the display mode change for a certain period. This allows the user U1 to confirm the presence of the target candidate object. The user U1 can easily confirm the existence of target candidate objects without requiring any special manipulation. After the step S1104, it leads to the aforementioned step S2.

As described above, in the function of the second embodiment, when there is an object which is shielded by the object and does not know the existence, at least one display mode change of the target candidate object or the interfering object so that at least a part of the target candidate object can be viewed. This makes it possible for the user U1 to reliably confirm the target candidate object and select it as the target object. If there is an individual real object which is not visible, and there is appearance information of the individual real object, the individual real object may also be treated as a target candidate object, and the existence confirmation may be performed in the same manner.

[Effect, etc. (2)]

As described above, according to the second embodiment, even when there is a target candidate object which is hidden and cannot be seen, the presence can be confirmed by a kind of display mode change, and the user U1 can select as the target object. Incidentally, when only one gaze direction of the user U1 can be detected as a function of the HMD 1, it is difficult to judge the gaze point in the depth direction. In this case, in the second embodiment, the display mode is changed so that the object hidden in the display plane is visible, that is, the state in which there is only one object in the depth direction in the display plane, even if there is only one line of sight direction, it is possible to confirm the object in the line of sight direction as the target object.

[Object Data and Attribute Information]

In the above description, it is described the case where the HMD 1 determines the control content by referring to parameters such as categories relating to the degree of limitation (in other words, tolerance) and the viewing value (in other words, the degree of importance) with respect to the display mode change of the respective object. The limitation and tolerance in the above categories are one of the attribute information representing the limitation and tolerance associated with the display mode change for each object. In the data of respective object, such limitation or tolerance, category, or other information may be set as one of the attribute information. As an example of other information of the attribute information of each object, the visibility value, importance, or priority of each object may be set. These parameters may be managed and held as the data by the HMD 1 or by an external device.

FIG. 24 illustrates an example of object data managed and held by the HMD 1. This object data is management data including attribute information for each object. The object data may be, for example, different management information for each application, or may be different management information or user setting information for each user. The HMD 1 may generate and set each information of the object data itself, or refer to the information from an external device (e.g., the information server 120 of FIG. 1).

The table of object data in FIG. 24 have ID, object, type, category, viewing value, related objects, and shared users as columns. "ID" is an identifier for each "object". Examples of "object" are the aforementioned tower and the interpretive panel. There are two types of the "type" here including A. individual real object, and B. virtual object. There are three categories (corresponding degree of limitation), for example, 1 (high), 2 (middle), and 3 (low), as mentioned above. There are three types of viewing values (corresponding importance), for example, 1 (high), 2 (middle), and 3 (low). The "related objects" represent the relation with another object, for example, an object of ID=1 has an object of ID=2 as a related object, and an object of ID=2 has an object of ID=1 as a related object. The "shared users" will be described later, and it indicates the identifier of the shared users in the case where the object is shared by multiple users as shared users.

In this example, relating to the "viewing value", the smaller the number, the higher the "viewing value". The setting of "category" or "viewing value" may be performed by the HMD 1 or may be performed by the user setting. For example, the HMD 1 may set a "viewing value" based on the generic notability of the object. Alternatively, the HMD 1 may set a "viewing value" depending on the degree of interest in the user U1's object. For example, in the afore-mentioned FIG. 11A-11B or the like, for each individual real object such as a facility on a map, a "viewing value" is set on the basis of general prominence. The "category" may be determined by integrating "degree of limitation" and "viewing value".

Further, the HMD 1 processes and stores the object information appropriately at each time during the control process, separately from the object data. The object information includes information such as the display position on the display plane 11, the orientation of the three-dimensional arrangement of the three-dimensional object, the display range (image area), the target viewing range, and the display mode change state for each object. The display mode change state includes the presence or absence of change, and the method of change or the like. The HMD 1 controls the object display using information such as the above-mentioned object data, object information, line of sights, and gaze points.

Third Embodiment

Figure 25:
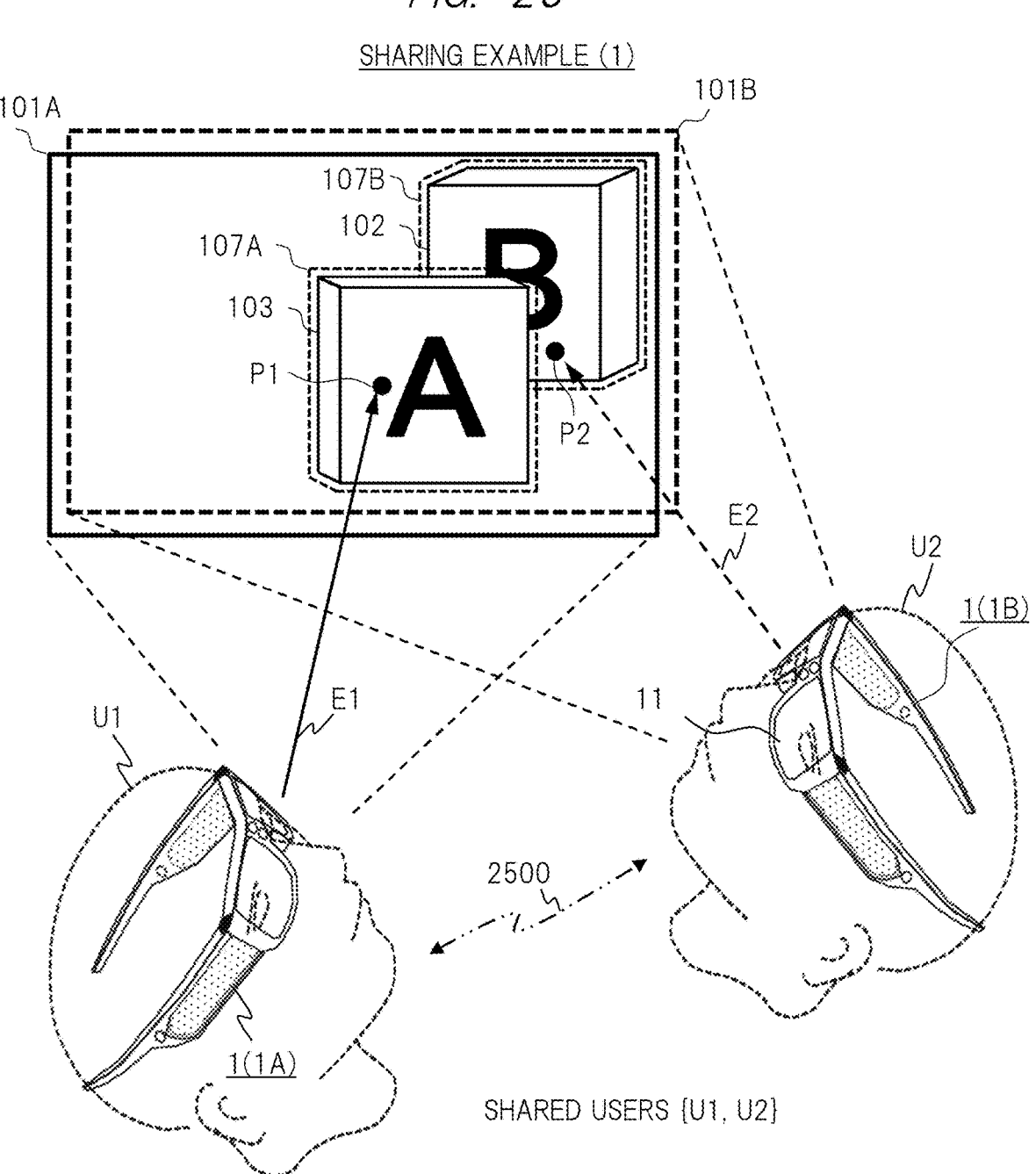
FIG. 25 shows a first example of sharing in a display apparatus of a third embodiment of the present invention.

Referring to FIG. 25 and the like, a description will be given of the third embodiment. The third embodiment has a function for changing the display mode related to the shared object between the shared users.

[Shared Users and Objects]

FIG. 25 is an explanatory diagram illustrating an exem-plary operation of the HMD 1 according to the third embodi-ment. In FIG. 25, there are a plurality of (e.g., two) users (U1, U2), each wearing an HMD 1. The first user U1 uses the HMD 1A and the second user U2 uses the HMD 1B. Among these users (U1, U2), the object 103 of the virtual object "A" and the object 102 of "B" are shared. Users U1, U2 are those who share those virtual objects. The objects of "A" and "B" are shared objects that are shared by shared users (U1, U2). Communication 2500 for sharing is per-formed between the HMD 1 (1A. 1B) of the shared users (U1, U2) by the short-range radio communication described above.

In FIG. 25, it is shown a first example related to the state of the display and visual recognition. The shared users (U1, U2) are viewing shared objects (A, B). In particular, at some point, the first user U1 views as a target object the object 103 of "A" in which the gaze point P1 by the line of sight E1 is located in the viewing range 101A. The HMD 1A sets the target viewing range 107A of the object 103 of "A". Further, the second user U2 views the object 102 of "B" in which the gaze point P2 by the line of sight E2 is located as the target object in the viewing range 101B. The HMD 1B sets the target viewing range 107B of the object 102 of the "B". In the first example, there is a shield-interference relation viewed from the second user U2, the object 103 of the rear side "B" that the second user U2 views is the target object, and the object 102 of the front side "A" that the first user U1 views is the interfering object.

The line of sight E1, E2 indicates the respective line of sight (104, 105) of the both eyes combined into one. FIG. 25 illustrates the display content of the viewing range 101A viewed by the user U1 and the display content of the viewing range 101B viewed by the user U2 as the same, but since the view point positions of the respective user are different, the actual display content, that is, the view of the object is also different.

Figure 26:
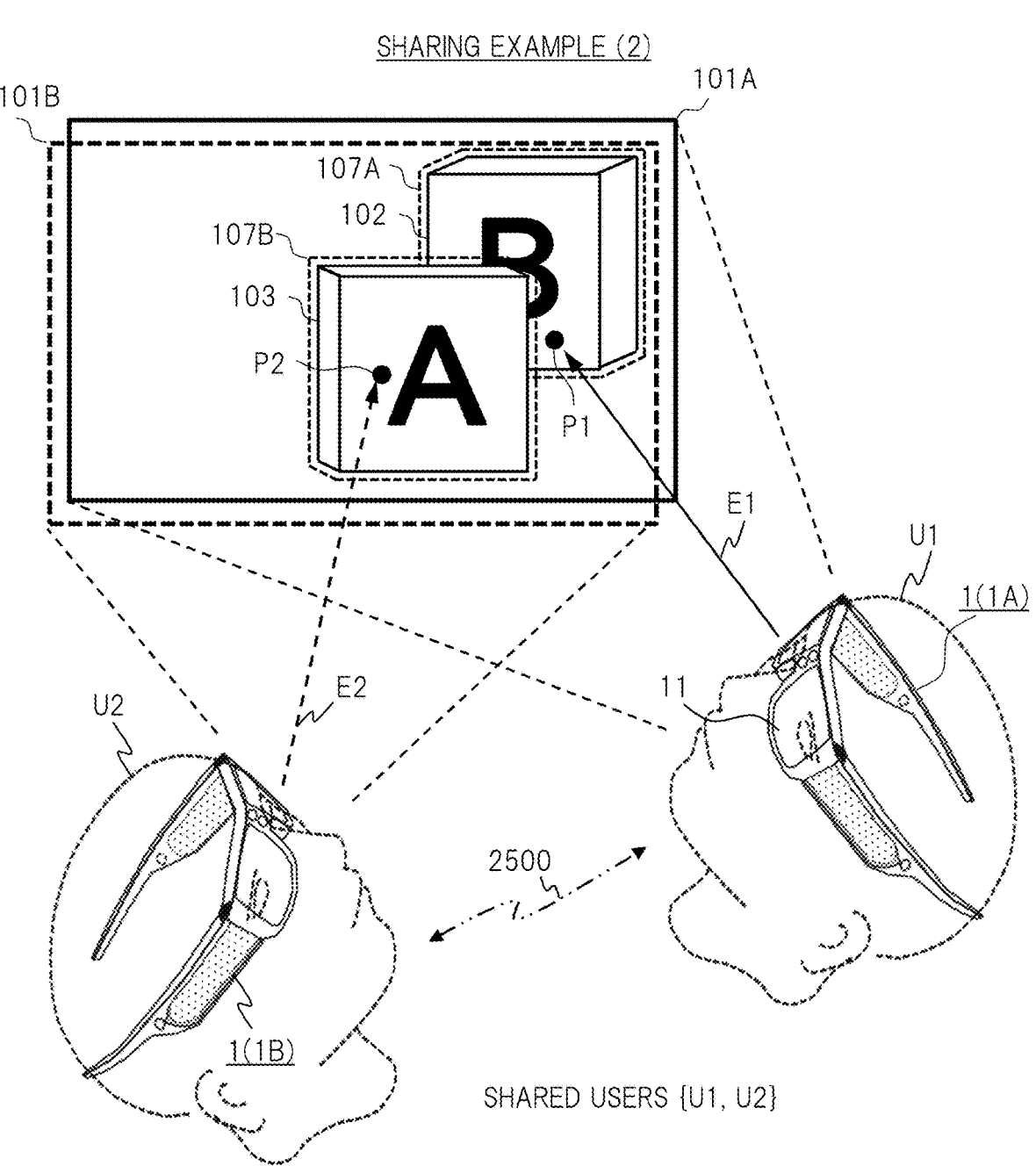
FIG. 26 shows a second example of sharing in the display apparatus of the third embodiment of the present invention.

Further, the following FIG. 26 shows a second example. FIG. 26 illustrates a case in which, in contrast to the first example of FIG. 25, the first user U1 views the object 102 of the rear side "B", and the second user U2 views the object 103 of the front side "A". In the second example, there is a shield-interference relation from the first user U1, the object 103 of the rear side "B" that the first user U1 views is the target object, and the object 102 of the front side "A" that the second user U2 views is the interfering object.

[Display Example (3-1)]

Figure 27:
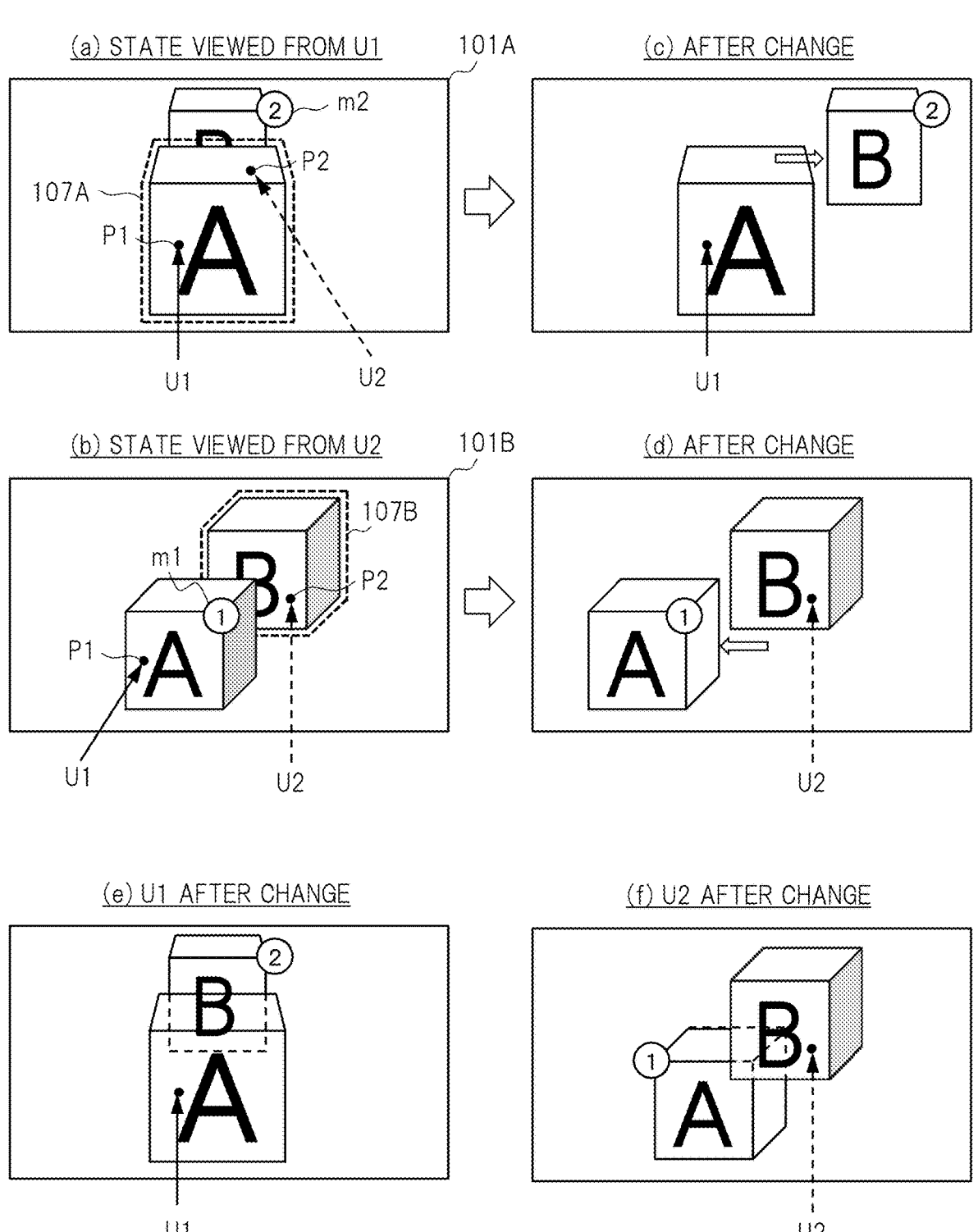
FIG. 27 shows a display example in the third embodiment.

In the cases mentioned above, the HMD 1 performs change of the display mode relating to the shared object of the shared users. First, FIG. 27 shows a modification corresponding to the first example of FIG. 25. (a) shows the state prior to the change of the display mode as the state of viewing the images of the viewing range 101A from the first user U1, and (c) shows the state after the change. (b) shows the state prior to the change of the display mode as a state of viewing the images of the viewing range 101B from the second user U2, and (d) shows the state after the change. In (a), the HMD 1A of the first user U1 generates and displays the mark-information m2 in the viewing range 101A based on the communication 2500 with the HMD 1B of the second user U2. The mark information m2 is an image representing which object the second user U2 is viewing, i.e., which target object is the gaze point P2 of the second user U2 is located. For example, the second user U2's HMD 1B transmits information transferring that the target object is "B" to the HMD 1A, and the HMD 1A of the first user U1 transmits information transferring that the target object is "A" to the HMD 1B. The HMD 1A, in response to information from the HMD 1B, generates a mark of the number "2" representing, for example, the second user U2 as a mark information m2, and displays it near the object of "B" which is the target object of the second user U2. Thus, the first user U1 can recognize which shared object the second user U2 being a shared user is viewing.

On the other hand, in (b), similarly, the HMD 1B of the second user U2, based on the communication 2500 with the HMD 1A of the first user U1, in the viewing range 101B, the first user U1 generates and displays the mark-information m1 representing which object the first user U1 is viewing. The HMD 1B, in accordance with information from the HMD 1A, generates a mark having a number "1" representing, for example, the first user U1 as a mark information m1, and displays the mark near the object of "A" which is the target object of the first user U1. Thus, the second user U2 can recognize which shared object the first user U1 is viewing.

Furthermore, the HMD 1 (1A, 1B) of the shared users (U1, U2) may change the display mode of the objects according to the relation of the visual recognition of the shared objects among the shared users as described above and the shield-interference relation. Examples are shown in (c) and (d). First, an example of a change from (a) to (c) is as follows. In the state of (a), the object of "B" that the second user U2 views is shielded behind the target viewing range 107A of the target object of "A" that the first user U1 is viewing. Since the HMD 1A is able to view the target object of the first user U1 "A" without interfering, the display of the object of "A" is left unchanged. The "B" object viewed by the second user U2 may be displayed as it is, but it is partially shielded from the first user U1. Therefore, in the present example, the HMD 1A changes the display mode of the target object of the shared user's "B", so that the point where the second user U2 is viewing the object of "B" is easily viewed by the first user U1. (c) shows an example of moving the display position of the object "B" to make the full picture visible. This display-mode change may be performed in accordance with a predetermined input-operation by the first user U1 rather than automatically. For example, the HMD 1A displays "whether to confirm the object viewed by the shared user (2)" or the like on the display plane 11, and changes may be made as shown in (c) in response to a button-pressing operation or the like by the user U1.

Next, an example of a change from (b) to (d) is as follows. In the state of (b), a part of the target object of "B" that the second user U2 views is shielded and interfered by the object of "A" that the first user U1 views. Therefore, in the present example, the HMD 1B changes the display mode for the target object of "A" of the first user U1 which is the interfering object so that the full picture of the target object of "B" can be viewed. (d) shows an example of moving the display position of the object of "A". Thus, the second user U2 can confirm the target object of "B".

As for the method of changing the display mode with respect to the shared object, various methods such as the permeability rate up-adjustment (FIG. 3) and the duplicate display (FIG. 8) can be applied in the same manner as described above. (e), as another display example, from a state viewed from the first user U1 of (a), shows a state after changing the other display mode. In the case of (a), the HMD 1A changes to view the full picture of the object of "B" by up-adjusting the permeability rate of the object of "A" as in (e). This change, as same with the case of (c), may be performed in accordance with a predetermined operation. Thus, the first user U1 can confirm not only the target object of "A" but also the target object of "B" of the second user U2.

As another display example, (f) indicates the state after the other display mode change from the state viewed from the second user U2 of (b). In the case of (b), the HMD 1B changes so that the full picture of the target object of "B" can be viewed by up-adjusting the permeability rate of the object of "A" as in (f).

As described above, in the third embodiment, when the visual status of the gaze on the shared object is different for each shared user, the mark information representing the visual status is displayed. This allows the shared users to view the shared objects that each shared user is viewing and viewing. This makes it easier to communicate and work between shared users. Even in the case of the second example of FIG. 26, the same control as in the case of the first example is applicable.

[Display Example (3-2)]

FIG. 28 shows another display example. (a) shows a state where the first user U1 views an object of "A" on the front side, similar to the first example of FIG. 25 and (a) of FIG. 27. (b) shows a state in which the second user U2 views the object of "B" at the rear side, similar to (b) of FIG. 27. In the case of (a), the HMD 1A, as in (c), changes the display mode. The HMD 1A generates a duplicate object 102r of the object of the "B" and displays it at an unshielded empty location so that the display of the target object of the "A" of the first user U1 and the display of the target object of the "B" of the second user U2 remains intact and the full picture of the object of the "B" being shielded can be confirmed. The position at which the replicated object 102r is displayed is particularly preferably determined to correspond to the direction in which the second user U2 is located (right in this example). The replicated object 102r may also be displayed with a marking information m2 representing a shared user gaze object. Thus, the first user U1 can confirm not only the target object of "A" but also the full picture of the target object of "B" of the second user U2.

Similarly, in the case of (b), the HMD 1B, as in (d), changes the display mode. The HMD 1B generates a duplicate object 102r (which differs in appearance from the duplicate object 102r of (c)) for the target object of "B" which is partially shielded and displays it in an empty location. Alternatively, as an alternative method, the HMD 1B may leave the target object of "B" intact, and the object of "A", which is the interfering object, may be changed in the display position or the like as described above.

(e), and (f) are other display examples. (e) is a state from the viewpoint of the first user U1. From the point of view of the first user U1, the object of "B" that the second user U2 is viewing is partially shielded. The HMD 1A changes the display mode of the object of "B" of the shared users in the same manner as described above. On the other hand, (f) is the state from the viewpoint of the second user U2. From the point of view of the second user U2, the target object of "B" is not shielded by the object of "A" and the full picture are visible. Therefore, the HMD 1B does not perform the display mode change.

[Display Example (3-3)]

Figure 29:
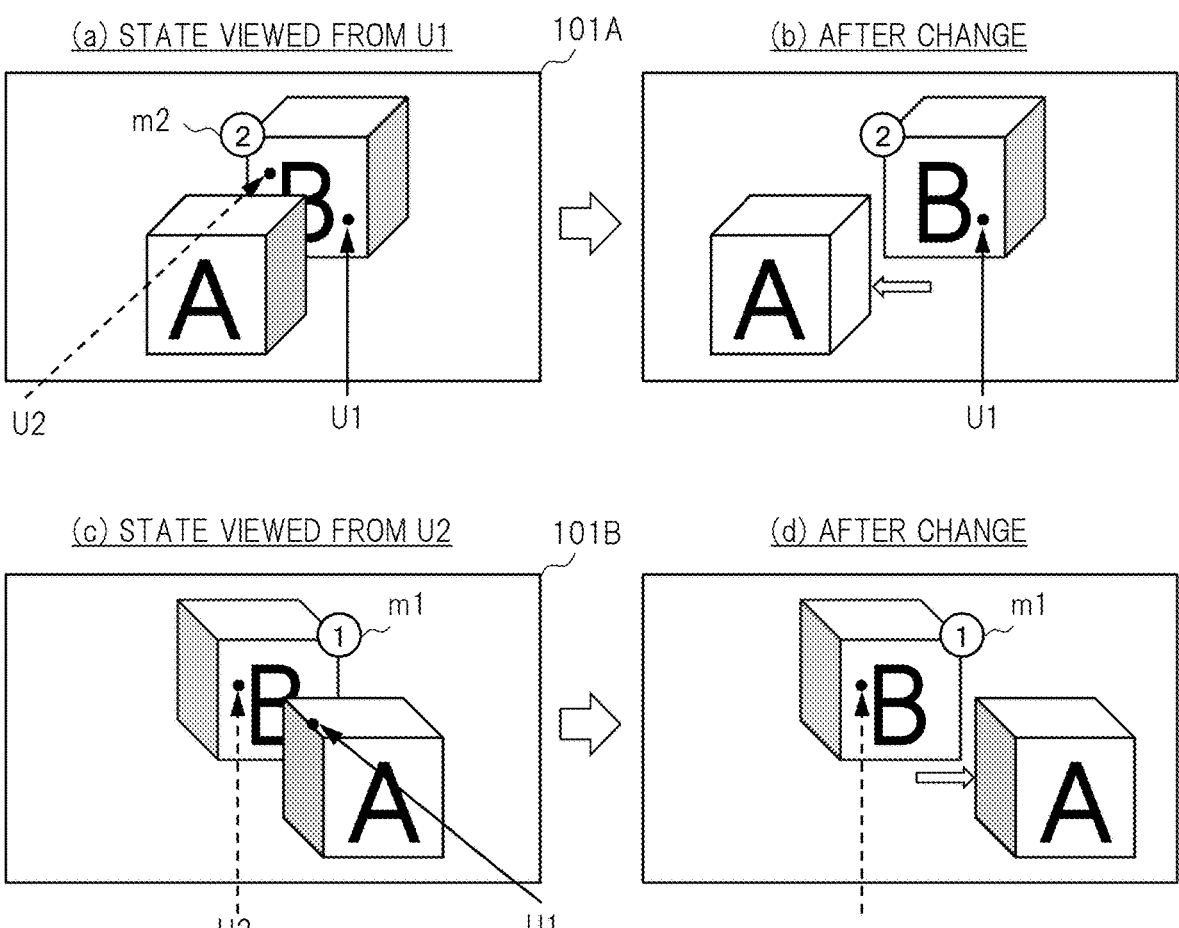
FIG. 29 shows a display example in the third embodiment.

FIG. 29 shows an example of a display mode change when the shared users (U1, U2) are viewing the same shared object (for example, an object 102 of "B") as another display example. (a) is a state viewed from the first user U1, and (c) is a state viewed from the second user U2. In the state of (a), the first user U1 now views the rear side object "B" from the right side of the object "A". The target object of "B" is partially shielded by the object of "A". In (c), the second user U2 now views the rear side object "B" from the left side of the object "A". The target object of "B" is partially shielded by the object of "A". In the status of (a), the HMD 1A displays a mark information m2 indicating that the second user U2 is also viewing on the object of "B". In the status of (c), the HMD 1B displays a mark information m1 indicating that the first user U1 is also viewing on the object of "B". (b) and (d) are examples after respective display mode change. (b) is an example of changing the display position of the object "A", which is an interfering object, to the position on the left, for example. (d) is an example of changing the display position of the object "A", which is an interfering object, to the position on the right, for example.

As described above, in the third embodiment, when each shared user is a visual recognition state to monitor the same shared object, the mark information representing the visual recognition state is displayed. This allows the shared users to view the shared objects that each shared user is viewing and viewing.

In the above example, the shield-interference relation has been the fourth pattern of the above-described (FIG. 2), not limited thereto, it is possible to perform similar control in other patterns. The above display of the mark information is also possible when the individual real object is a shared object. For object other than the optical see-through type real body, change of the display mode is possible. The limitations and viewing values mentioned above are also applicable to shared objects.

[Effect, etc. (3)]

As described above, according to the third embodiment, the shared objects of the shared users are displayed with appropriate display mode changes for each user's HMD 1. Thus, each user can reliably view the shared objects without causing any confusion in the viewing, while eliminating or reducing the visual interfering due to the shielding between the objects, respectively. In the third embodiment, at least one of the HMD 1 between the shared users, display mode change is performed according to the relation between the viewing and the shielding and interfering together with display of the marking representing the gaze object viewed by the shared user. At the time of this display mode change, not only the aforementioned shield-interference relation, the degree of limitation or the viewing value, but also the viewing relation of which shared object the shared users are viewing is considered, and the system and details are determined. For example, in the example of FIG. 27, when considering the HMD 1A side of the first user U1, in relation to the target object of the front side "A" viewed by the first user U1 and the object of the rear side "B" viewed by the second user U2, the first priority should be given to the display of the full picture of the target object of "A". In the state of (a), since the full picture can be visually recognized, in the case of the first embodiment described above, the display mode change is not required. The object "B" is not an interfering object, but it is a target object which the shared users are viewing. Therefore, in the case of the third embodiment, change of the display mode is possible so that the full picture of the object of "B" can be confirmed. When the change is made, for example, the method and details are chosen so that the full picture of both objects of "A" and "B" can be viewed. For example, in the case of the method of the permeability rate adjustment of (e), since a part of the target object of "A" becomes temporarily transparent and becomes slightly difficult to view, as a more suitable method, the method of the display position movement of (c) or the method of the duplicate display of (c) in FIG. 28 may be selected.

[Modification (3-1)]

In the third embodiment, the mark information representing the shared users gaze object is different from the gaze point. The mark information is displayed in an area other than the area shielded by other objects in the target viewing range of the object to be viewed by the shared users. When it is displayed in the area to be shielded, it becomes unknown which object the gaze destination is before or after, so it can be clarified by such a display. Further, between the HMD 1 of the shared users, it may update the display state (including mark information) in near real time by always performing mutual communication, or may update periodically the display state by performing communication.

Figure 30:
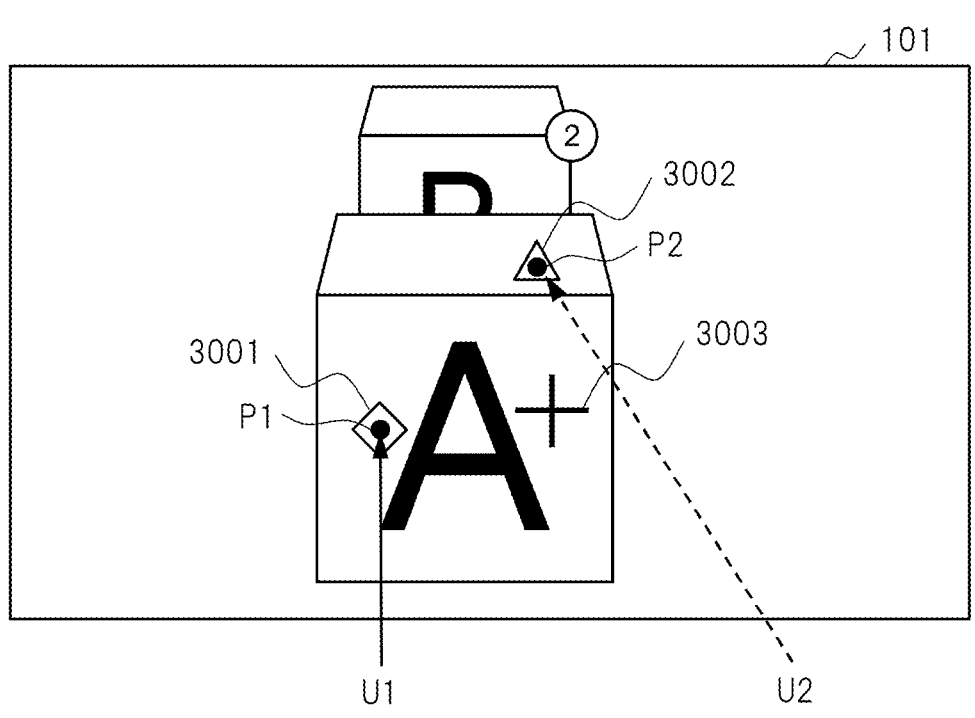
FIG. 30 shows a display example in the third embodiment.

As a modification, the display position of the mark information representing the shared users gaze object may be a position that matches the gaze point. Further, as another modification, in the viewing range, a mark representing the gaze point may be displayed in the position corresponding to the gaze point. In the viewing range, a pointer for a selection operation by a remote controller or the like may be displayed. FIG. 30 shows a modification example, in which a mark 3001 representing a gaze point and a pointer 3003 are displayed in a viewing range 101, other than a mark representing the shared users gaze object. In the position of the gaze point P1 of the first user U1, for example, a diamond-shaped symbol 3001 is displayed. In the position of the gaze point P2 of the second user U2, for example, a triangular symbol 3002 is displayed. Further, as a pointer for operating by the first user U1, for example, a cross-shaped pointer 3003 is displayed.

[Modification (3-2)]

Figure 31:
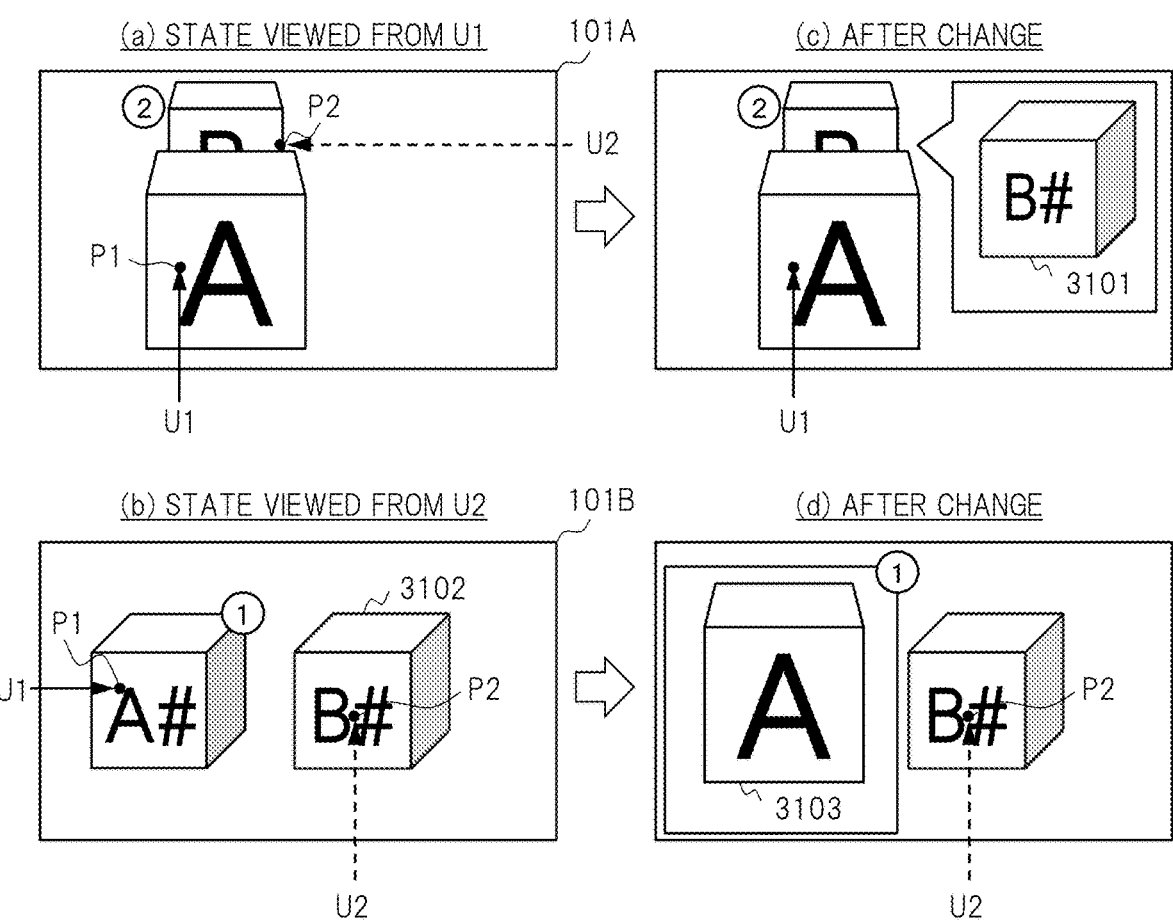
FIG. 31 shows a display example in the third embodiment.

FIG. 31 shows a display example in another modification. (a) is a state viewed from the first user U1, and is the same as (a) in FIG. 27 described above. The first user U1 views the target object "A" on the front side. (b) is a state viewed from the second user U2. The second user U2 views the object of "B" on the rear side from a direction of a line of sight different from the line of sight direction of the first user U1, for example, a direction different by 90 degrees. Here, relating to the shared object of "B", the shape and location viewed from the first user U1 is different from the shape and location viewed from the second user U2. In (b), the side of the objects of "A" and "B" viewed from the second user U2 are illustrated as "A #" and "B #".

(c) and (d) show the states after the display mode change. In (c), the HMD 1A displays, the target object of "A" as it is, and the display mode is changed, for confirmation, on the partially shielded object of "B" viewed by the shared users. At this time, the HMD 1A displays the object of "B" as a display mode change so that the object becomes the state of the shape or the position viewed from the second user U2 as shown in (b). In this example, the HMD 1A leaves the object "B" as it is, and creates and displays a duplicate object 3101 of the object "B" with a bubble in an empty location. The duplicate object 3101 is created as a duplicate object of the same appearance as the object 3102 in (b). Thus, the first user U1 can confirm the status, in particular, viewed from the point of view of the second user U2, as the full picture of the shared object of "B". As for the state viewed from the second user U2 in (b), since there is no shield-interference relation, it may be displayed as it is, or the following. As shown in (d), the HMD 1B changes the display mode so that the shapes and places viewed by the first user U1 can be viewed for the objects of "A" viewed by the first user U1 in the same manner as described above. In this example, an object 3103 of "A" in the view of (a) is created and displayed by superimposing it in front of the object of "A".

Fourth Embodiment

Referring to FIG. 32 and the like, a description will be given of a fourth embodiment. In the fourth embodiment, a modification of the target object decision method is shown. In the above-described embodiment, the target object is judged and determined by detecting the gaze point from the user's line of sight. In a modification example, the selected input operation from the user for the tag displayed on each object is received. Thus, the HMD determines the target object.

FIG. 32 shows a display example in the fourth embodiment. In the viewing range 101 of the HMD 1 of the user U1, as described above, a tower 508 which is an individual real object, an interpretive panel 503 which is a virtual object, and a guide map 504 are displayed. The HMD 1 displays by attaching a tag for each object in the viewing range 101. This tag is an image for identifying and making selectable the objects. In this example, the tags 701, 702, 703 have rectangles connected by each lead line from the object and each number identifying the object.

The user U1 performs object selection input operations using predetermined operating means provided in the HMD 1. The predetermined operating means may use, for example, voice input, but is not limited thereto, and various means such as a pointer by a remote controller, gaze point detection by a line of sight, recognition of a gesture by a hand, and the like can be applied. In the case of object selection by voice input, for example, it is performed as follows. If the user U1 wants to select, for example, tower 508 as an object, it inputs in voice the number ("3") of tag 703 attached to the object. The HMD 1 recognizes the number of the input voice and grasps the object associated with the tag of the number.

For example, in a situation where multiple objects are congested, it may be difficult to determine the target object even if only a gaze point is used. In such a case, by using together the tag selection input acceptance in the fourth embodiment, it is possible to increase the accuracy of the determination of the target object. Further, by using the tag selection method according to the fourth embodiment, even in a device which does not have a gaze point detecting function as an HMD 1, functions such as the above-described display mode change can be applied.

In the state before the change of (a) in FIG. 32, the guide map 504 overlaps on the front side of the tower 508. Gaze point 507 of the user U1 overlaps on the tower 508 and the guide map 504, and it may be difficult to judge the target object. Even in this case, it is possible to easily determine the target object by using the tag. For example, tower 508 is selected as a target object. (b) shows the state after change. The HMD 1 performs, for example, permeability rate up-adjustment on the guide maps 504 shielding the selected tower 508. This results in a state in which the full picture of the tower 508 is visible.

Incidentally, the HMD 1 may always perform the tag display, may perform when it is judged that the determination of the target object is difficult only by the gaze point, or may perform in response to the tag display instruction input by the user U1.

[Modification]

Figure 33:
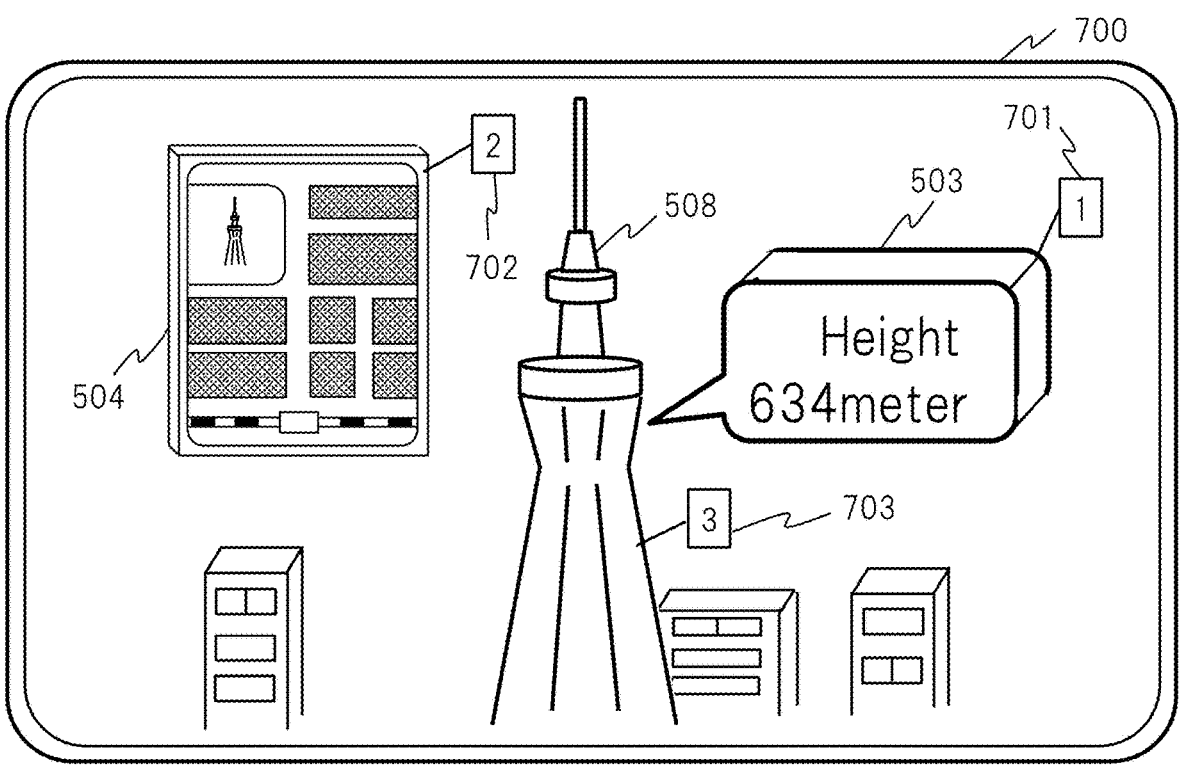
FIG. 33 shows a display example in a modification of the fourth embodiment.

FIG. 33 shows an example of the application to a smartphone as a display apparatus or an information processing device according to a modification of the fourth embodiment. FIG. 33 shows an example in which each object is displayed with a tag as a display example on the display plane of the smartphone 700. Even in the case of the smartphone 700, the shield-interference relation between objects is considered on the assumption of three-dimensional arrangement considering the position in the depth direction. Therefore, it is possible to similarly apply the scheme such as display mode change of the embodiments described above. The functional block configuration of the smartphone 700 is basically the same as that illustrated in FIG. 10, although not illustrated. In the smartphone 700, the gaze detection and the gaze point detection are not performed, but other operation input means is used. In the smartphone 700, detection of line of sight or detection of gaze point may be realized using other means (for example, the camera unit 431). In the smartphone 700, the real body (corresponding individual real object) is displayed as a captured image by the mounted camera (the camera unit 431). As the tag selection input acceptance method or other operation input in the case of the smartphone 700, other than the voice input or the like, a selection input by a tap or the like to a touch panel of the display plane is also possible.

Fifth Embodiment

Figure 34:
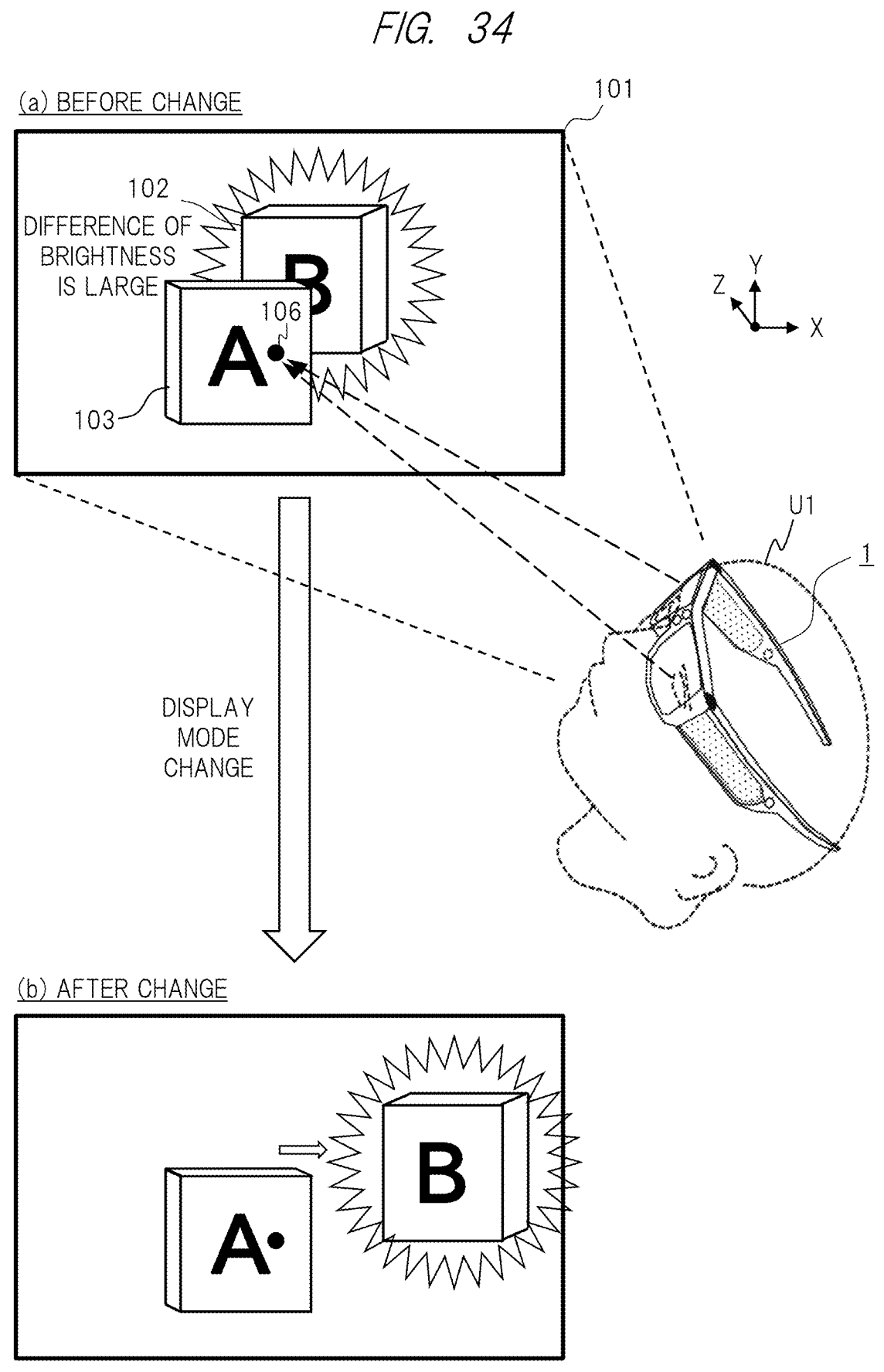

Referring to FIG. 34, a description will be given of a fifth embodiment. In the above-described embodiment, the case in which the object in the front side shields and obstructs the object in the rear side as the shield-interference relation of two objects in the depth direction was shown. Then, this paper shows an example of changing a display mode so that at least a target object is easy to be visually recognized in the case of such a shielding-interference relation. The relation of the object which is a target for the change of display mode exists other than the above-described shield-interference relation.

In the fifth embodiment, the relation according to the difference in brightness is used as the relation between the objects when the user views a plurality of objects. It is considered a situation in which two objects (individual real objects or virtual objects) are arranged in front and rear, or are arranged in the vicinity of the left and right, etc., even if they are not arranged front or rear. If there is a large difference in the brightness (in other words, brightness) of those objects, one object may interfere with the visibility of the other object. The HMD of the fifth embodiment performs a display mode change in this instance.

FIG. 34 shows a display example. In the viewing range 101, an object 102 of "A" on the front side and an object 103 of "B" on the rear side are arranged. The gaze point 106 of the user U1 is located at an object 102 of the front "A" and the object of "A" is the target object. In this instance, the user U1 would basically be able to view the full picture of the "A" object 102 with no previous shield-interference relation. Here, when the difference between the brightness of the object of "A" and the brightness of the object of "B" is large, for example, when the brightness of "B" is large, there is a case where the object of "B" may interfere with the visual recognition of the target object of "A". This may also interfere with nearby objects, even in the case of unshielded relations with objects not only on the front and the rear, but also close to the left and right.

The HMD 1 judges the difference of the brightness between the objects, and from the difference, judges the interfering objects in terms of the brightness. The HMD 1 changes the display mode for the determined interfering object, for example, the object of "B". The HMD 1 moves the display position so that, for example, the object of "B" is separated from the object of "A", as the after change of (b). Alternatively, when the display mode change of the object of "B" is not desirable, the HMD 1 may be changed by moving the target object of "A" or the like.

In particular, in the fifth embodiment, as another method of changing the display mode, the HMD 1 may use a method of temporarily changing the brightness of the object. For example, the HMD 1 temporarily reduces the brightness of the object of "B". This reduces difference in brightness and allows the user U1 to easily view the target object of "A".

Although the present invention has been specifically described on the basis of the embodiments, the present invention is not limited to the above-described embodiments, and can be variously changed without departing from the gist. It is also possible to make a form of combination of the embodiments, or to make a form addition or deletion or replacement of components.

EXPLANATION OF REFERENCE CHARACTERS

1 . . . HMD (Head-mounted information processing device), 11 . . . Display plane, U1 . . . User, 101 . . . Viewing range, 102, 103 . . . Objects, 104, 105 . . . Line of sight, 106 . . . Gaze point, 107 . . . Target viewing range, 120 . . . Information server.

The invention claimed is:
1. A display apparatus comprising:
a display device for displaying images; and
a processor for controlling the display of the images, wherein the display apparatus displays, as an object, at least a virtual object among individual real objects cut out from an external real body and the virtual object arranged in three dimensions, the object for which a user wants to view is determined as a target object;

the object which interferes with the viewing of the target object when the user views the target object is detected as an interfering object;

when the interfering object is present, the display mode of at least one of the target object and the interfering object is changed so as to eliminate or reduce the interference caused by the interfering object for the viewing of the target object;

detecting a gaze point of the user in a three-dimensional space, determining the object which overlaps or is close to the position of the gaze point of the user as the target object, a target viewing range is set for an image area of the target object, detecting the object shielding at least a portion of the target viewing range as the interfering object, the object having high relation in display with the target object are set as a related object for the target object, an image area in which an image area of the target object and an image area of the related object are combined in one is set as the target viewing range, and detecting the object shielding at least a portion of the target viewing range as the interfering object.

2. The display apparatus according to claim 1, wherein, in the target object and the interfering object, comparing an attribute representing the degree of limitation or tolerance relating to the change of the display mode of the object, to determine at least an object to be a target of change of the display mode.

3. The display apparatus according to claim 1, wherein, the change of the display mode is movement of display position, adjustment of permeability rate, reduction or enlargement, or display of replicated object.

4. The display apparatus according to claim 1, wherein, when a plurality of objects overlap as the objects in the direction of line of sight of the user, the object with the highest viewing value among those objects is determined as the target object.

5. The display apparatus according to claim 1, wherein, when there is a plurality of objects as the object within a viewing range associated with the display device, determining an object specified by an input operation by the user as the target object.

6. The display apparatus according to claim 1, wherein, when a plurality of objects overlap as the object in the direction of line of sight of the user, and the object on the rear side is shielded and hidden and cannot be viewed by the object on the front side, the display mode is changed so that at least a portion of the object on the rear side can be viewed without being shielded as making the object on the rear side as a target candidate object.

7. The display apparatus according to claim 6, wherein, the change of the display mode is movement of display position, adjustment of permeability rate, reduction or enlargement, or display of replicated object.

8. A display method in a display apparatus comprising a display device for displaying an image, and a processor for controlling the display of the image, the display method comprising, a step of displaying on the display device as an object, at least a virtual object among the individual real objects cut out from an external real object and the virtual object arranged in three dimensions, a step of determining the object for which a user wants to view as a target object, a step of detecting the object which interferes when the user views the target object as an interfering object, a step of changing the display mode of at least one of the target object and the interfering object so as to eliminate or reduce the interference caused by the interfering object for the viewing of the target object when the interfering object is present, wherein detecting a gaze point of the user in a three-dimensional space, and determining the object which overlaps or is close to the position of the gaze point of the user as the target object, a target viewing range is set for an image area of the target object, detecting the object shielding at least a portion of the target viewing range as the interfering object, the object having high relation in display with the target object are set as a related object for the target object, an image area in which an image area of the target object and an image area of the related object are combined in one is set as the target viewing range, and detecting the object shielding at least a portion of the target viewing range as the interfering object.

\* \* \* \* \*